United States Patent
Ebaugh et al.

(10) Patent No.: US 11,361,006 B2
(45) Date of Patent: Jun. 14, 2022

(54) SYSTEMS AND METHODS FOR DOCUMENT SORTING

(71) Applicant: Indxit Systems, Inc., Addison, TX (US)

(72) Inventors: Michael J. Ebaugh, Dallas, TX (US); Matthew J. Morvant, Carrollton, TX (US)

(73) Assignee: Indxit Systems, Inc., Addison, TX (US)

(*) Notice: Subject to any disclaimer, the term of this patent is extended or adjusted under 35 U.S.C. 154(b) by 302 days.

(21) Appl. No.: 16/656,545

(22) Filed: Oct. 17, 2019

(65) Prior Publication Data

US 2020/0050615 A1 Feb. 13, 2020

Related U.S. Application Data

(60) Continuation of application No. 15/688,578, filed on Aug. 28, 2017, now Pat. No. 10,474,701, which is a
(Continued)

(51) Int. Cl.
*G06F 16/20* (2019.01)
*G06F 16/31* (2019.01)
(Continued)

(52) U.S. Cl.
CPC ........ *G06F 16/313* (2019.01); *G06F 16/2228* (2019.01); *G06F 16/31* (2019.01);
(Continued)

(58) Field of Classification Search
None
See application file for complete search history.

(56) References Cited

U.S. PATENT DOCUMENTS

| 6,635,088 B1* | 10/2003 | Hind | H03M 7/30 |
| | | | 707/999.101 |
| 2007/0013967 A1* | 1/2007 | Ebaugh | G06F 16/2228 |
| | | | 358/448 |
| 2014/0122479 A1* | 5/2014 | Panferov | G06F 3/0643 |
| | | | 707/736 |

OTHER PUBLICATIONS

Examiner's Requisition dated Nov. 7, 2019, in the related Canadian Application No. 2,975,694. (3 pgs).
(Continued)

*Primary Examiner* — Belix M Ortiz Ditren
(74) *Attorney, Agent, or Firm* — North Weber & Baugh LLP

(57) ABSTRACT

Systems and methods are disclosed that allow for indexing, processing, or both of information from physical media or electronic media, which may be received from a plurality of sources. In embodiments, a document file may be matched using pattern matching methods and may include comparisons with a comparison reference database to improve or accelerate the indexing process. In embodiments, information may be presented to a user as potential matches thereby improving manual indexing processes. In embodiments, one or more additional actions may occur as part of the processing, including without limitation, association additional data with a document file, making observations from the document file, notifying individuals, creating composite messages, and billing events. In an embodiment, data from a document file may be associated with a key word, key phrase, or word frequency value that enables adaptive learning so that unindexed data may be automatically indexed based on user interaction history.

20 Claims, 32 Drawing Sheets

Related U.S. Application Data continuation of application No. 14/614,318, filed on Feb. 4, 2015, now Pat. No. 9,754,017, which is a continuation of application No. 13/718,822, filed on Dec. 18, 2012, now Pat. No. 8,954,470, which is a division of application No. 13/335,597, filed on Dec. 22, 2011, now Pat. No. 8,370,387, which is a continuation of application No. 11/486,475, filed on Jul. 14, 2006, now Pat. No. 8,112,441.

(60) Provisional application No. 60/699,893, filed on Jul. 15, 2005.

(51) Int. Cl.
*G06F 16/22* (2019.01)
*G06F 16/33* (2019.01)
*G06Q 10/10* (2012.01)
*G06Q 30/04* (2012.01)
*G06V 30/414* (2022.01)
*G06V 30/418* (2022.01)

(52) U.S. Cl.
CPC ......... *G06F 16/3331* (2019.01); *G06Q 10/10* (2013.01); *G06Q 30/04* (2013.01); *G06V 30/414* (2022.01); *G06V 30/418* (2022.01); *Y02A 90/10* (2018.01)

(56) References Cited

OTHER PUBLICATIONS

Examiner's Requisition dated Apr. 14, 2021, in the related Canadian Application No. 3,074,633. (3 pgs).

* cited by examiner

| | 405A | 405B | 405C | 405D | 405E | | 405X |
|---|---|---|---|---|---|---|---|
| | First Name | Last Name | DOB | Account No. | Field A | ... | Field x |
| 410-1 | Mikele | Bella | 08/08/1983 | 1001 | A1 | | x1 |
| 410-2 | Marin | Makinnon | 01/02/1970 | 1002 | A2 | | x2 |
| 410-3 | Amy | Smith | 05/05/1975 | 1003 | A3 | | - |
| 410-4 | Violet | William | 11/28/1940 | 1004 | A4 | | x4 |

| 410-n | Mary | Alamb | 7/20/1963 | 99999 | An | | xn |

PATHOLOGY LAB, PAP SMEAR CYTOLOGY REPORT HOSPITAL/CLINIC REF.
NUMBER: ACCESSION NO.: XX00105252 P06-02641 FEMALE: MARY H. ALAMB
ANYWHEREVILLE MEDICAL ASSOCIATES COLLECTED: 03/01/2006 DOB: 7/20/1963
PHYSICIAN DOCTOR, MD JOSEPH 123 STREET ST. RECEIVED: 03/01/2006 AGE:
42 Yr., 7 Mo. ANYWHERE, CA 93254 REPORTED: 03/02/2006 LMP: 2/21/2006
SPECIMEN TYPE: LIQUID SOURCE(METHOD): Endocervical(cervex-brush)
SPECIMEN ADEQUACY: Transition Zone Components: Present SATISFACTORY for
evaluation. DESCRIPTIVE INTERPRETATION: NEGATIVE FOR INTRAEPITHELIAL
LESION OR MALIGNANCY NON-NEOPLASTIC FINDINGS: No significant
inflammation. Moderate estrogen effect. Hormonal compatible with age and history.
(.,~l:;,ln p l_1-lcir A;-, ,?_ k;. i Ms. Jane Technician ~o~ S~{ t 11 i~` t l S Cytotechnologist
Signatures are electronically applied. XYZ Laboratories, Inc. 111 Main St., Town, ST

1PATHOLOGY 2LAB, 3PAP 4SMEAR 5CYTOLOGY 6REPORT 7HOSPITAL/CLINIC
8REF. 9NUMBER: 10ACCESSION 11NO.: 12XX00105252 13P06-1402641
15FEMALE: 16MARY 17H. 18ALAMB 19ANYWHEREVILLE 20MEDICAL
21ASSOCIATES 22COLLECTED: 2303/01/2006 24DOB: 257/20/1963
26PHYSICIAN 27DOCTOR, 28MD 29JOSEPH 30123 31STREET 32RECEIVED:
3303/01/2006 34AGE: 3542 36Yr., 377 Mo. 38ANYWHERE, 39CA 4093254
41REPORTED: 4203/02/2006 43LMP: 442/21/2006 45SPECIMEN 46TYPE:
47LIQUID 48SOURCE(METHOD): 49Endocervical(cervex-brush) 50SPECIMEN
51ADEQUACY: 52Transition 53Zone 54Components: 55Present 56SATISFACTORY
57or 58evaluation. 59DESCRIPTIVE 60INTERPRETATION: 61NEGATIVE 62FOR
63INTRAEPITHELIAL 64LESION 65OR 66MALIGNANCY 67NON-NEOPLASTIC
68FINDINGS: 69No 70significant 71inflammation. 72Moderate 73estrogen effect.
74Hormonal 75compatible 76with 77age 78and 79history. 80(.,~l:;,In p l_1-lcir A;-,
,?_ k;. i 81Jane 82Technician ~o~ S~{ t 11 i~` t l S 83Cytotechnologist 84Signatures
85are 86electronically 87applied. 88 XYZ 89Laboratories, 90Inc. 91111 92Main
93St., 94Town, 95ST

1210

1215-1   1220-1

| 1PATHOLOGY<br>2LAB,<br>3PAP<br>4SMEAR<br>5CYTOLOGY<br>6REPORT<br>7HOSPITAL/CLINIC<br>8REF.<br>9NUMBER:<br>10ACCESSION<br>11NO.:<br>12XX00105252<br>13P06<br>1402641<br>15FEMALE:<br>16MARY<br>17H.<br>18ALAMB<br>19ANYWHEREVILLE<br>20MEDICAL<br>21ASSOCIATES<br>22COLLECTED:<br>2303/01/2006<br>24DOB:<br>257/20/1963<br>26PHYSICIAN<br>27DOCTOR,<br>28MD<br>29JOSEPH<br>30123<br>31STREET<br>32RECEIVED: | 34AGE:<br>3542<br>36Yr.,<br>377 Mo.<br>38ANYWHERE,<br>39CA<br>4093254<br>41REPORTED:<br>4203/02/2006<br>43LMP:<br>44 2/21/2006<br>45SPECIMEN<br>46TYPE:<br>47LIQUID<br>48SOURCE(METHOD):<br>49Endocervical(cervix-brush)<br>50SPECIMEN<br>51ADEQUACY:<br>52Transition<br>53Zone<br>54Components:<br>55Present<br>56SATISFACTORY<br>57or<br>58evaluation.<br>59DESCRIPTIVE<br>60INTERPRETATION:<br>61NEGATIVE<br>62FOR<br>63INTRAEPITHELIAL<br>64LESION | 66MALIGNANCY<br>67NON NEOPLASTIC<br>68FINDINGS:<br>69No<br>70significant<br>71inflammation.<br>72Moderate<br>73estrogen effect.<br>74Hormonal<br>75compatible<br>76with<br>77age<br>78and<br>79history.<br>80 (.,~l:;,In p l_1 lcir A; ,<br>,?_ k;. i<br>81Jane<br>82Technician ~o~ S~{ t<br>11 i~`t l S<br>83Cytotechnologist<br>84Signatures<br>85are<br>86electronically<br>87applied.<br>88XYZ<br>89Laboratories,<br>90Inc.<br>91111<br>92Main<br>93St.,<br>94Town,<br>95ST |
|---|---|---|

| From: | Dr_JDoctor@example.com | Received: Mon 03/27/2006 |
| To: | MaryHAlamb@example.com | |
| Subject: | Lab Results | |

Hello Mary,

We received your test results. The results can be obtained by clicking on the following link:

<Lab Report Link> — 2705

Sincerely,
Dr. Joseph Doctor

FIGURE 27

SYSTEMS AND METHODS FOR DOCUMENT SORTING

CROSS-REFERENCE TO RELATED APPLICATIONS

This application is a continuation application of and claims priority benefit of co-pending and commonly-owned to U.S. patent application Ser. No. 15/688,578, entitled "SYSTEMS AND METHODS FOR DOCUMENT SORTING," filed on Aug. 28, 2017, and listing Michael J. Ebaugh and Matthew J. Morvant as inventors, which is issued as U.S. Pat. No. 10,474,701 on Nov. 12, 2019, which is a continuation application of and claims priority to U.S. patent application Ser. No. 14/614,318, entitled "USING ANCHOR POINTS IN DOCUMENT IDENTIFICATION," filed on Feb. 4, 2015, and listing Michael J. Ebaugh and Matthew J. Morvant as inventors, which issued as U.S. Pat. No. 9,754,017 on Sep. 5, 2017, which is a continuation application of and claims priority to U.S. patent application Ser. No. 13/718,822, entitled "DOCUMENT INDEXING," filed on Dec. 18, 2012, and listing Michael J. Ebaugh and Matthew J. Morvant as inventors, which issued as U.S. Pat. No. 8,954,470 on Feb. 10, 2015, which is a divisional of and claims priority to U.S. patent application Ser. No. 13/335,597, entitled "SYSTEMS AND METHODS FOR DATA INDEXING AND PROCESSING," filed on Dec. 22, 2011, and listing Michael J. Ebaugh and Matthew J. Morvant as inventors, which issued as U.S. Pat. No. 8,370,387 on Feb. 5, 2013, which is a continuation application of and claims priority to U.S. patent application Ser. No. 11/486,475, entitled "SYSTEMS AND METHODS FOR DATA INDEXING AND PROCESSING," filed on Jul. 14, 2006, listing Michael J. Ebaugh and Matthew J. Morvant as inventors, which issued as U.S. Pat. No. 8,112,441 on Feb. 7, 2012, which claimed priority under 35 USC § 119(e) to U.S. Provisional Application Ser. No. 60/699,893, entitled "SYSTEM, COMPUTER SOFTWARE PRODUCT AND METHOD OF PROCESSING DATA CONTAINED IN PHYSICAL OR ELECTRONIC MEDIA," filed Jul. 15, 2005. The contents of each patent document are incorporated in their entirety herein by reference.

This application is related to commonly assigned U.S. patent application Ser. No. 11/487,021, filed on Jul. 14, 2006, entitled "SYSTEMS AND METHODS FOR DATA INDEXING AND PROCESSING," listing Michael J. Ebaugh and Matthew J. Morvant as inventors, which issued as U.S. Pat. No. 7,860,844 on Dec. 28, 2010, the contents of which are incorporated herein by reference.

BACKGROUND

Field of the Invention

The present invention relates generally to the field of data processing, and more particularly to systems and methods for data processing and data indexing.

Background of the Invention

Many individuals and business entities have to process documents and electronic files. For example, medical facilities are continually inundated with lab reports, medical transcriptions, test results, insurance forms, and the like. Stores and other business must maintain information related to products, inventory, customers, vendors, employees, and so forth.

Traditionally, much of the processing of this information, whether contained in physical media, such as paper, or electronic files stored on electronic media, such as magnetic disks, optical disks, flash memory, network servers, storage devices, and the like, is done manually. That is, the information contained on physical or electronic media is manually reviewed and manually indexed or processed.

The amount of time required to review the data contained in physical or electronic media and to catalogue the information contained therein often consumes a large portion of the time. Increasing the accuracy of cataloguing of these records and documents generally results in increasing the time spent reviewing and processing.

Some prior methods attempt to increase accuracy but decrease time involved in processing data used automated systems. One such system involves entry of information, at least in part, by using barcodes, predefined fields, or optical marks indicia imprinted or placed on a paper-based form. The barcode or marks are scanned to enter information into a database. However, such systems are not without problems. These methods are heavily dependent on the direct activities of the professional staff or organization providing services. To be effective, these methods require consistent and accurate usage by the staff or organization. In some instances, barcodes, predefined fields, or optical marks systems still required manual, labor-intensive processes. Furthermore, barcode or optical mark systems often do not work across different entities, as it requires consistent adoption of uniform procedures and infrastructure by all the entities. That is, the markings of one entity are often not useful to another entity.

Currently, no systems or methods allow for the automated input and processing of information from various documents received from a plurality of sources. Accordingly, systems and methods are needed that allow indicia contained within data, which may be originally embodied in physical or electronic media, to be identified and processed without extensive professional staff assistance.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it shall be understood that the scope of the invention is not limited to these particular embodiments.

FIG. 4B depicts an exemplary reference database according to an embodiment of the present invention.

FIG. 12A depicts an exemplary plurality of characters obtained from a document file according to an embodiment of the present invention.

FIG. 12B depicts exemplary arrays of strings obtained from a document file according to an embodiment of the present invention.

FIG. 27 illustrates an exemplary composite message according to an embodiment of the present invention.

DETAILED DESCRIPTION OF THE INVENTION

According to an aspect of the present invention, systems and methods are disclosed that allow for the automated indexing and/or processing of information from a variety of documents, both from physical media and electronic media, which may be received from a plurality of sources. Although the features and advantages of the invention are generally described in this section in the context of embodiments, it shall be understood that the scope of the invention should not be limited to these particular embodiments. Many additional features and advantages will be apparent to one of ordinary skill in the art in view of the drawings, specification, and claims hereof.

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means and should not be construed as limited to the embodiments set forth herein. Rather, these embodiments are provided so that this disclosure will convey the scope of the invention to those skilled in the art. Those skilled in the art will also recognize additional modifications, applications, and embodiments are within the scope thereof, as are additional fields in which the invention may provide utility.

The embodiments of the present invention may be present in software, hardware, firmware, or combinations thereof. Structures and devices shown in block diagram are illustrative of exemplary embodiments and are meant to avoid obscuring the invention. Furthermore, connections between systems, services, components, and/or modules within the figures are not intended to be limited to direct connections. Rather, data between these systems, services, components, and/or modules may be modified, re-formatted, or otherwise changed by intermediary systems, services, components, and/or modules.

Reference in the specification to "one embodiment" or "an embodiment" means that a particular feature, structure, characteristic, or function described in connection with the embodiment is included in at least one embodiment of the invention. Furthermore, the appearance of the phrase "in one embodiment," "in an embodiment," or the like in various places in the specification are not necessarily all referring to the same embodiment.

A. Exemplary System in which Embodiments of the Present Invention May Operate

Figure 1:
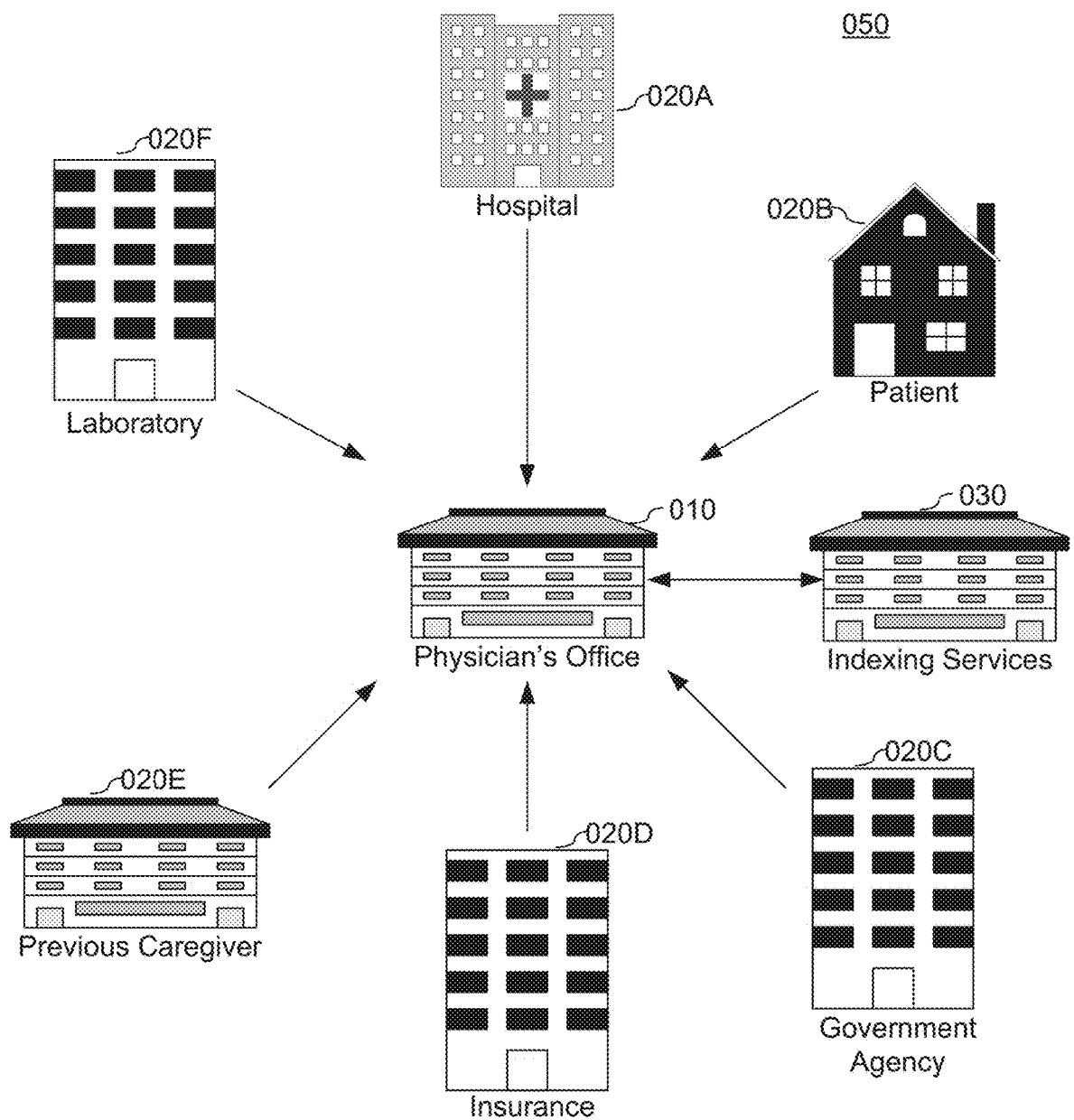
FIG. 1 illustrates an exemplary environment in which embodiments of systems and methods of the present invention may operate.

FIG. 1 graphically depicts an exemplary environment in which systems and methods of the present invention may operate. FIG. 1 depicts a medical environment 050 in which a physician's office 010 receives information, in the form of electronic or physical files, from a plurality of sources 020. Those sources 020 may include, but are not limited to, hospitals 020A, patients 020B, government agencies 020C, insurance companies 020D, previous caregivers 020E, and laboratories 020F. It shall be noted that the present invention is not limited to use within medical systems, but may be employed in other settings, including without limitation, governmental, business, non-profit, and educational environments.

As noted previously, a physician's office may receive a number of files from a number of sources 020. The physician's office 010 must process all of these files received from the multiple sources. Processing these files has typically been performed by hand, or at least principally by hand, which requires huge amounts of time and expense.

As illustrated in FIG. 1, an indexing service provider 030, communicatively connected with the physician's office 010, may be employed to automate the processing of the plurality of files received by the physician's office according to embodiments of the present invention. In the embodiment depicted in FIG. 1, the indexing service provider 030 may be functionally and/or physically located in another location separate from the physician's office 010; alternatively, the indexing service provider may be functionally and/or physically located at the physician's office 010.

Figure 2:
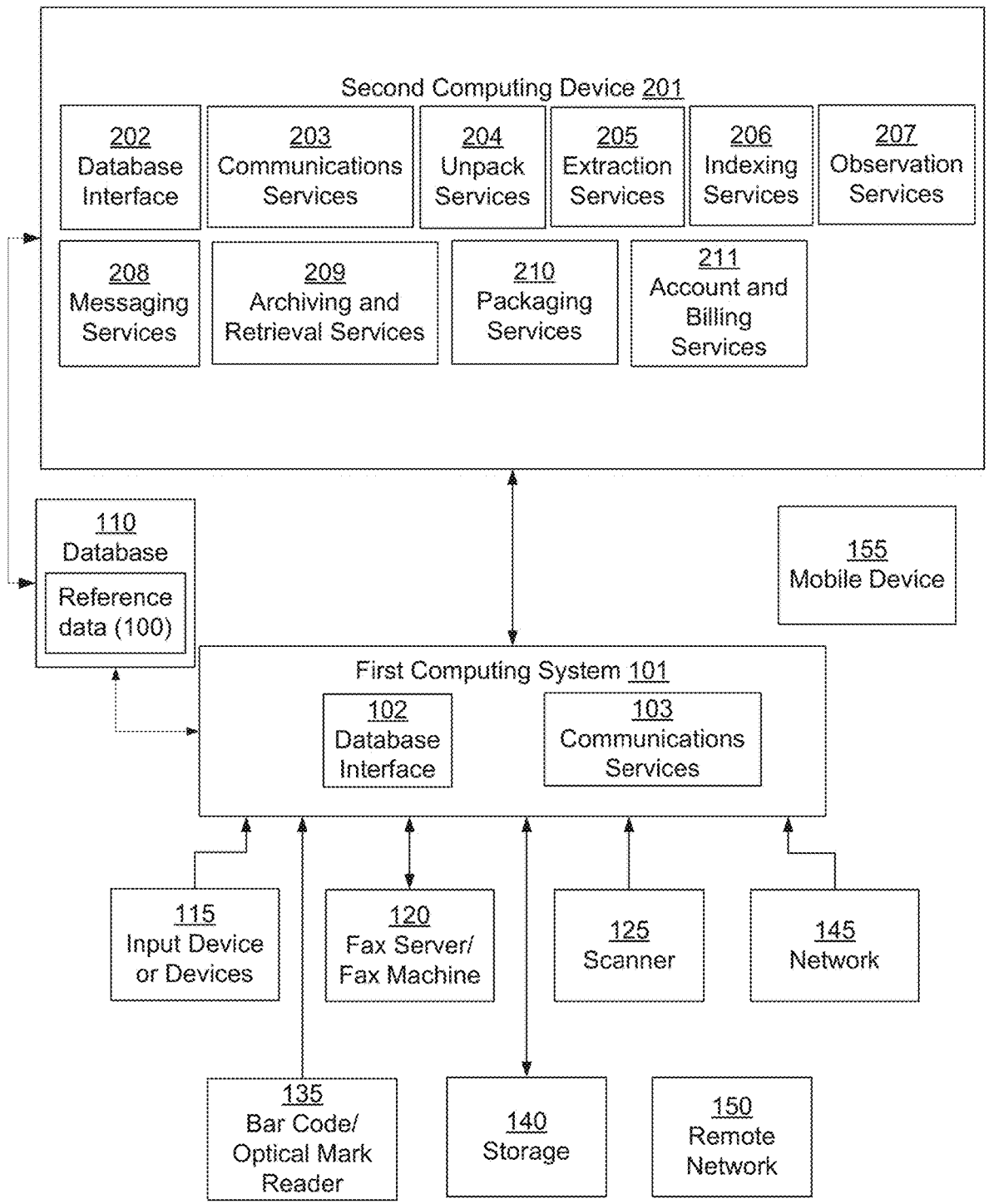
FIG. 2 is a functional block diagram illustrating an exemplary multi-computing-device system in which exemplary embodiments of the present invention may operate.

FIG. 2 is a functional block diagram illustrating an exemplary multi-computing-device system 200 in which exemplary embodiments of the present invention may operate. It shall be noted that the present invention may operate, and be embodied in, other systems as well.

Depicted in FIG. 2 is a first computer system or device 101 and a second computing device or system 201 communicatively connected to the first computer system 101. As will be apparent to those skilled in the art, first and second computing systems may be configured to communicate directly or may communicate indirectly via one or more intermediate computing devices. In an embodiment, in addition to being capable of being coupled in a variety of different manners, the first and second computing devices may communicate by any of a number of different communications protocols, including, but not limited to, standard networking and Internet communication protocols.

In an embodiment, first computing device 101 and second computing device 201 may be owned or operated by a single entity or may be housed within a single facility. Alternatively, first computing devices 101 and second computing device 201 may be owned or operated by separate entities or may be housed in separate facilities. For example, first computing device 101 may be located at a physician's office 010, such as the one depicted in FIG. 1, and the second computing device 201 may be operated by a service provider 030.

In an embodiment, first computing system 101 and second computing device 201 may comprise one or more services, or modules, to perform operations. These modules may be communicatively coupled together to perform the described operations or achieve the described results. It shall be noted that the terms "coupled" or "communicatively coupled," whether used in connection with modules, devices, or systems, shall be understood to include direct connections, indirect connections through one or more intermediary devices, and wireless connections. It shall also be understood that throughout this discussion that services or modules may be described as separate functional units, but those skilled in the art will recognize that the various services, or portions thereof, may be divided into separate services or modules or may be integrated together, including integrating within a single computing system. One skilled in the art will also recognize that a service or module may be implemented in software, hardware, firmware, or a combination thereof. The term "services" may also be used interchangeably herein with "utilities" or "modules."

The embodiment of first computing system 101 depicted in the FIG. 2 may comprises a database interface 102 for interfacing with one or more databases 100 or database systems 110, and a communication services module 103. First computing system 101 may comprise fewer or additional services or modules to accomplish tasks illustrated by the embodiments described herein.

Second computing system 201 may comprise a database interface 202 for interfacing with one or more databases or database systems; a communications services module 203, which may communicate with other devices, systems, and/or applications and may include messaging services, encryption/decryption, compression/extracting services, and/or packaging services; unpack services 204, which may include unpacking batch files received from the first computing system; extraction services 205, which may include optical and/or voice recognition services, rotation utilities, and text verification services; indexing services 206, which may include one or more matching/filtering algorithms and may also include manual indexing functionality; observation services 207, which may take certain actions based upon observation made within a document file; messaging service 208, which may be part of or separate from communications services 203, for providing messages to indexing recipients, clients, and/or third parties; archiving and retrieval services 209 for providing data back-up for an indexing recipient; packaging services 210, which also may be part of communications services 203, for preparing files for transmission to an indexing recipient; and account and billing services 211, which may monitor indexing recipient's account(s) and provide billing when billing events have transpired. Additional information about these services is provided herein with description of the various embodiments.

One skilled in the art will recognize that these services may be integrated into a single computer system. One skilled in the art will also recognize that some services, such as packaging and unpacking services may not be needed in single computing system embodiments. It shall also be noted that other systems and services may be configured and fall within the scope of the present invention.

First and/or second computing devices 101, 201 may be a general computing device, including, without limitation, a workstation, server, personal computer, and the like, or may be a specifically designed computing device. It shall be noted that employing one or more second computing systems 201 may be beneficial to reduce the processing and bandwidth loading on first computing system 101. In an embodiment, second computing system 201 may be communicatively coupled to database system 110. Alternatively, second computing system 201 may receive access to or receive files from database system 110 via first computing system 101. Although not depicted in FIG. 2, one skilled in the art will recognize that second computing system 201 may be communicatively coupled to the same or similar devices, inputs, and networks that are communicatively coupled to first computing device 101, which are described in more detail below. It shall be noted that the present invention may operate, and be embodied in, other systems as well.

In an embodiment, an aspect of the present invention is indexing and/or processing of data received by first computing device 101. At one or more instances of time, first computing system 101 may receive data from one or more of the sources of data. The data in files received by first computing system 101 may be originally embodied in electronic files or in physical media, such as paper reports and the like. Examples of received document files include, but are not limited to, faxes, papers, letters, email messages, instant messages, data files, text files, document files, HL-7 messages, ASTM message, mark-up language files, image files, audio files, and the like. In some instances, a received document file directly representative of the data contained in the physical or electronic media. For example, the data representing an HL-7 file directly represents the data of interest. In embodiments, the received document file indirectly represents the data contained in physical or electronic media. For example, the document file may represent an image of a report rather than the report data itself. As explained in more detail with reference to extraction services, data extraction may assist in extracting at least some of the plurality of characters for such received document files. For example, optical character recognition operations may assist in extracting some or all of the plurality of characters from a file. In either event, the document file may be associated with a plurality of characters. For the purposes of explanation, a file received by first computing system 101 for processing may be referred to herein as a document file. It shall be understood that the term "document file" refers to any file, regardless of the contents or type of data contained within or associated with the file, which is to be processed according to one or more embodiments of the present invention. That is, the file may not contain data associated with a "document," but for the purposes of explanation herein, it may be referred to as a "document file."

Regardless of its original form, a file may contain a plurality of characters, which may form identifying indicia that are useful for indexing and/processing a document file. Identifying indicia may include, but are not limited to, first name, last name, account number, social security number, date of birth, document title, document type, document contents, identification number, product number, stock keeping unit (SKU) number, file type, file structure, file source, file name, document identification number, document source, transmission information, encryption information (such as key encryption, hash, and the like), hash number, metadata, and any other information useful for identifying, categorizing, or processing a document file.

Figure 4A:
FIG. 4A depicts an exemplary laboratory report which may be embodied in a document file according to an embodiment of the invention.

Consider, by way of example, the report 400 illustrated in FIG. 4A. The report 400 may be represented in an electronic file. Report 400 comprises a plurality of characters, which one or more portions of the plurality of characters may be used for processing the report 400. It should be noted that the plurality of characters are not limited to the data appearing on the face of a report or form. Rather, the plurality of characters shall be construed to include any information associated with the document file, which also includes any data or information useful for identifying, categorizing, or processing the file. Examples of the plurality of characters, in addition to the information included upon the face of the document, that may be associated with the file may also include, but are not limited to, file type, file source, file structure, file name, transmission information, encryption information (such as key encryption, hash, and the like), hash number, metadata, and the like.

Returning to FIG. 2, in an embodiment, first computer system 101 is adapted to receive document files for processing. As depicted in the embodiment illustrated in FIG. 2, first computing system 101 may be communicatively coupled to receive data in a variety of manners and from a variety of sources. In an embodiment, first computing device 101 may communicate according to any of a variety of communications protocols, including, but not limited to, standard networking and Internet communications protocols.

In an embodiment, first computing device 101 may communicate wirelessly, such as by means of a wireless local area network (LAN) or a wireless wide area network (WAN), with one or more networks or devices, such as remote network 150 and mobile device 155. Mobile device may comprise one or more mobile or wireless computing device, including, but not limited to, a laptop computer, a mobile phone, a PDA, a wireless communication device, and the like. Alternatively, or in addition to the wireless connections, first computing system 101 may be connected via a wired LAN, wired WAN, or by any other wired connection, including but not limited to universal serial bus (USB), firewire, serial, and parallel port connections, to one or more devices or networks, such as to network 145 or to one or more storage devices 140. Storage devices include, but are not limited to, optical drives, disk drives, tape drives, flash memory drives, RAID arrays, and the like. Data may be received from a network 145, 150, and/or storage device 140. In an embodiment, network 145, 150 may provide access one or more of the following: intranets, extranets, portals, the Internet, and one or more information servers. Examples of information servers include, but are not limited to, a transcription information server, a medical information server, a laboratory information server, an email server, databases, or any other data source known to those skilled in the art.

In an embodiment, first computing system 101 may be connected to one or more input devices 115. For example, first computing system 101 may receive data via a keyboard, touchpad, mouse, or the like. First computing system may also receive data via an audio/video input. An audio input may be recorded and manually transcribed or may be transcribed using speech recognition software or hardware, which may be resident within system 101 or system 201.

In an embodiment, first computing system 101 may also be communicatively coupled to other input devices. In one embodiment, a scanner 125 may provide data to first computing system 101, which data may be a digital representation of physical media, such as handwritten, typed, or printed documents. First computing system 101 may also be communicatively coupled to a fax machine and/or fax server 120 to receive facsimile data. In an embodiment, the scanned or faxed file may be an image of the physical media. In an alternative embodiment, the scanned or faxed data may include text and/or graphical data. Embodiments of the present invention may include a bar code reader and/or optical mark reader 135. A barcode or optical mark indicia imprinted or placed on an item, when scanned, may provide data to first computing system 101.

First computing system 101 may include a directory interface 102 for communicating with a directory or database system 110. In one embodiment, database system 110 may be implemented using Centricity EMR® (formerly Logician®), an electronic medical record system marketed by GE Healthcare. In an embodiment, database system 110 may be located on a local storage device, such as a hard drive. In an alternative embodiment, database system 110 may be stored remotely and accessed by first computing system 101 via a direct or networked connection.

In an embodiment, database system 110 may include one or more databases. In an embodiment, database system 110 stores data that has been received by first computing system 101. In one embodiment, database system 110 possesses a database 100, which includes a plurality of records comprising one or more sets of data, such as identifying indicia, that may be used as a comparison reference database, as explained in more detail below. FIG. 4B depicts an exemplary database comprising a plurality of records 410, which comprise a plurality of data fields 405. Database 100 or database system 110 may also include one or more of the following: additional identifying indicia, instructions for processing certain data, composite data, or other data. In an embodiment, any database stored in database system 110 may be selectively queried. For example, reference database 100 may be queried using one or more key terms or identifying indicia, which may include but is not limited to, an account number, an individual's name, data of birth (DOB), social security number, item number, stock keeping unit (SKU) number, report data, associated provider, and the like.

Exemplary Computing Systems

Figure 3:
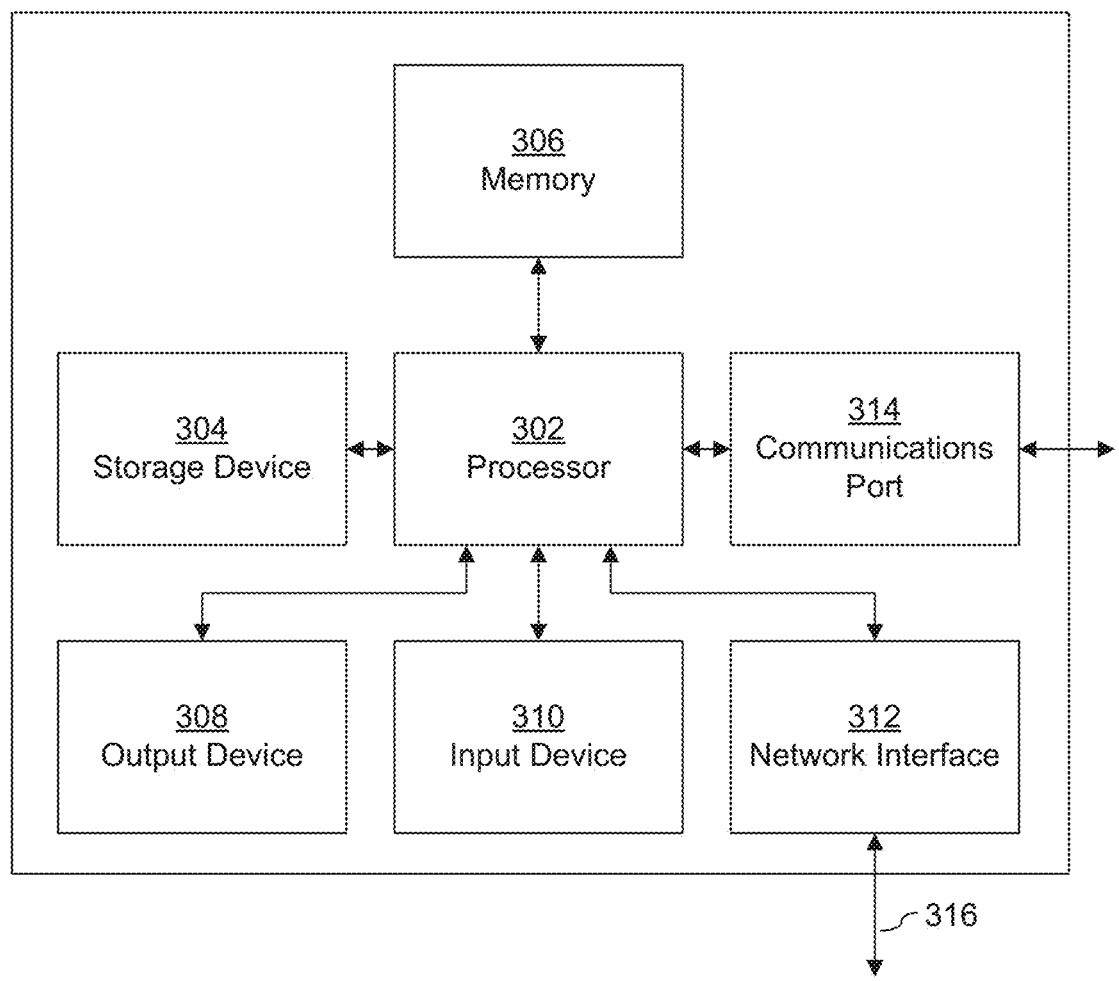
FIG. 3 depicts an exemplary computing system according to an embodiment of the present invention.

In an embodiment, first computer system 101, second computing system 201, or both may be implemented using a conventional computing device, such as a personal computer, a workstation, a server, a portable computing device, such as a laptop computer or a PDA-type (personal data assistant) device, or the like. Alternatively, first computing device 101, second computing device 201, or both may be a specifically designed or configured computing device. FIG. 3 is a functional block diagram of an embodiment of a computing system 300 that may be used for first computing device 101, second computing device 201, or both.

As illustrated in FIG. 3, a processor 302 executes software instructions and interacts with other system components. In an embodiment, processor 302 may be a general purpose processor such as an AMD processor, an INTEL x86 processor, a SUN MICROSYSTEMS SPARC, or a POWERPC compatible-CPU, or the processor may be an application specific processor or processors. A storage device 304, coupled to processor 302, provides long-term storage of data and software programs. Storage device 304 may be a hard disk drive and/or another device capable of storing data, such as a computer-readable media (e.g., diskettes, tapes, compact disk, DVD, and the like) drive or a solid-state memory device. Storage device 304 may hold programs, instructions, and/or data for use with processor 302. In an embodiment, programs or instructions stored on or loaded from storage device 304 may be loaded into memory 306 and executed by processor 302. In an embodiment, storage device 304 holds programs or instructions for implementing an operating system on processor 302. In one embodiment, possible operating systems include, but are not limited to, UNIX, AIX, LINUX, Microsoft Windows, and the Apple MAC OS. The operating system executes on, and controls the operation of, the computing system 300.

An addressable memory 306, coupled to processor 302, may be used to store data and software instructions to be executed by processor 302. Memory 306 may be, for example, firmware, read only memory (ROM), flash memory, non-volatile random access memory (NVRAM), random access memory (RAM), or any combination thereof. In one embodiment, memory 306 stores a number of software objects, otherwise known as services, utilities, or modules. One skilled in the art will also recognize that storage 204 and memory 206 may be the same items and function in both capacities.

In an embodiment, computing system 300 provides the ability to communicate with other devices, other networks, or both. Computing system 300 may include one or more network interfaces or adapters 312, 314 to communicatively couple computing system 300 to other networks and devices. For example, computing system 300 may include a network interface 312, a communications port 314, or both, each of which are communicatively coupled to processor 302, and which may be used to couple computer system 300 to other computer systems, networks, and devices.

In an embodiment, computing system 300 may include one or more output devices 308, coupled to processor 302, to facilitate displaying graphics and text. Output devices 308 may include, but are not limited to, a display, LCD screen, CRT monitor, printer, touch screen, or other device for displaying information. Computing system 300 may also include a graphics adapter (not shown) to assist in displaying information or images on output device 308.

One or more input devices 310, coupled to processor 302, may be used to facilitate user input. Input device 310 may include, but are not limited to, a pointing device, such as a mouse, trackball, or touchpad, and may also include a keyboard or keypad to input data or instructions into computing system 300. In an embodiment, one or more of the input devices 210 may be the same as input device 115 (FIG. 2).

One skilled in the art will recognize no computing system is critical to the practice of the present invention. One skilled in the art will also recognize that a number of the elements described above may be physical and/or functionally separated into sub-modules or combined together.

Embodiments of File Acquisition Services and Account Validation

Figure 5:
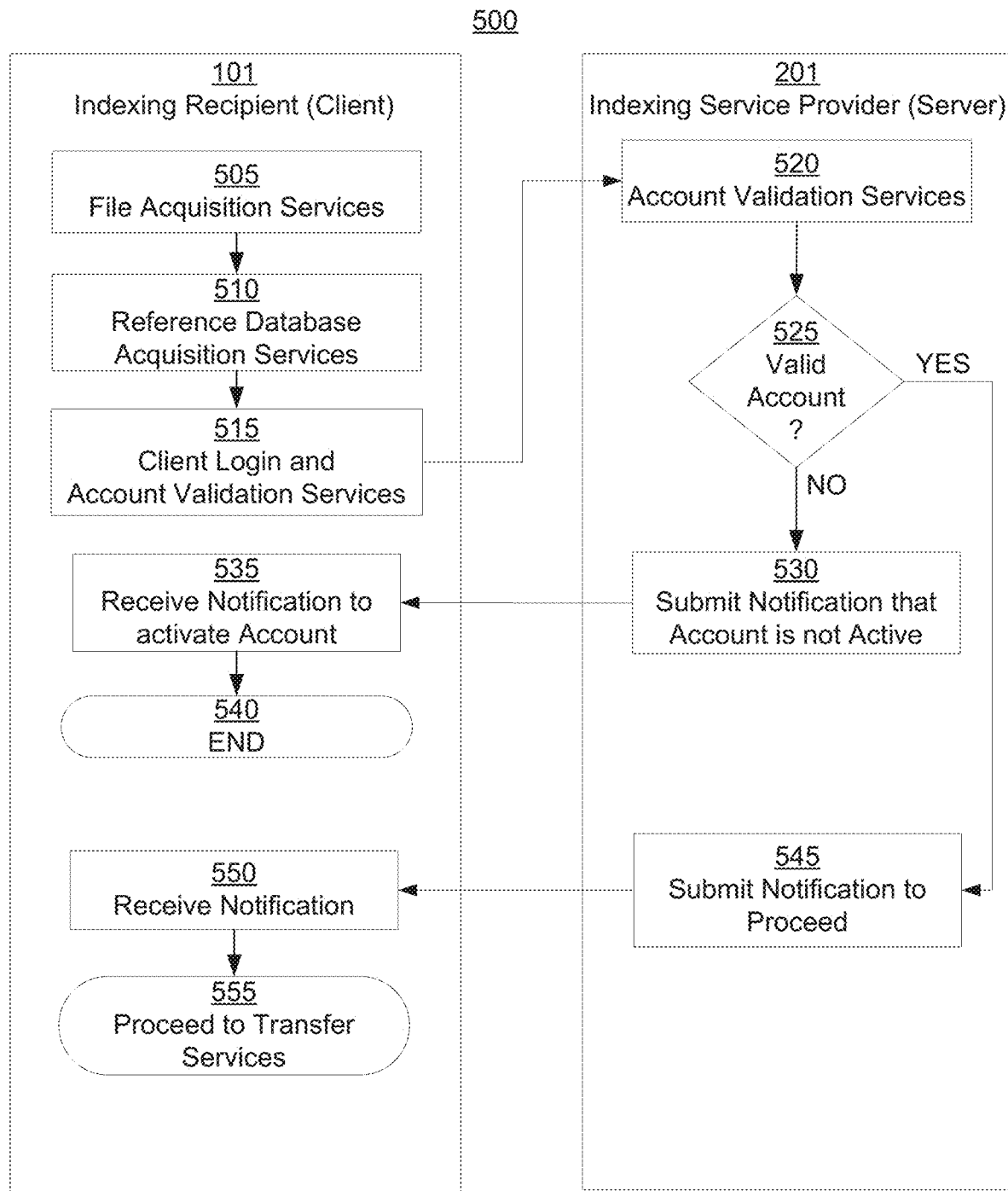
FIG. 5 depicts an exemplary method for initially accessing an indexing service provider system according to an embodiment of the invention.

In an embodiment, the present invention may include file acquisition services and/or account validation services. FIG. 5 depicts an exemplary method for file acquisition services (505) and account login (515) for a client system, which may be first computing system 101, according to an embodiment of the present invention. In an embodiment, the file acquisition services may comprise a program or function that monitors the receipt of document files received by the client system 101 from one or more sources. These documents files may be received in multiple formats including, but not limited to, e-mails, instant messages, HL-7 files, scanned documents, text documents, audio files, transcription files, image files, ASTM message files, mark-up language files, and the like. In an embodiment, all document files may be stored in a specific folder or folders and the file acquisition services (505) monitors the specific folder or folders.

In an embodiment, the client system 101 may also include reference database acquisition services (510). In one embodiment, reference database acquisition services obtains from the client system 101 a reference database that may be used to index or match document files to records in the reference database. For example, a reference database in the physician's office 010 may comprise a database of records for patients. Consider the exemplary reference database 100A depicted in FIG. 4B. Reference database 100A includes a plurality of records 410-1 to 410-n containing one or more data fields 405A-D. In an embodiment, reference database 100A may include one or more fields 405E-x for including additional identifying indicia, additional data, links to files, notes, instructions for processing document files, and other data. As noted above, the fields of reference database 100A may be populated using one or more methods for including or entering data into a database. For example, assuming the database is used by a medical center and the entries represent patients of the medical center, the entries may be entered by a receptionist, imported from other databases, and/or obtained from previously indexed/processed files.

In one embodiment, during an initial setup, the entire reference database may be transmitted to the indexing service provider 201 for use for indexing and/or processing files according to embodiments of the present invention. In an embodiment of the invention, changes to the client system's database may be monitored by the reference database acquisition services so that only the differential changes need be sent to the indexing service provider 201. Alternatively, the entire reference database may be transmitted to the indexing service provider at periodic intervals or at the occurrence of certain events. In another alternative embodiment, the reference database 100 may be accessible by the indexing service provider.

In an embodiment, the client system 101 may login to access the indexing service provider system 201. In one embodiment, when a client logs (515) into the indexing service provider system 201, the client account may be validated to determine if the account is valid (525). If the account is valid, a notification (545) may be sent to the indexing recipient 101, and it may proceed with transferring of any files and reference database or reference database updates as part of the transfer services (555). If the account is not valid, the indexing service provider 201 may submit a notification (530) to the client system 101 that the account is not active. In an embodiment, the client system 101 may receive (535) a notification to activate the account and the process may end (540). In an embodiment, the notification may indicate what steps may need to be taken to activate the account, including without limitation, paying past due bills, subscribing to services, or updating other information, fees, or software.

Embodiments of Indexing System Overview

Figure 6:
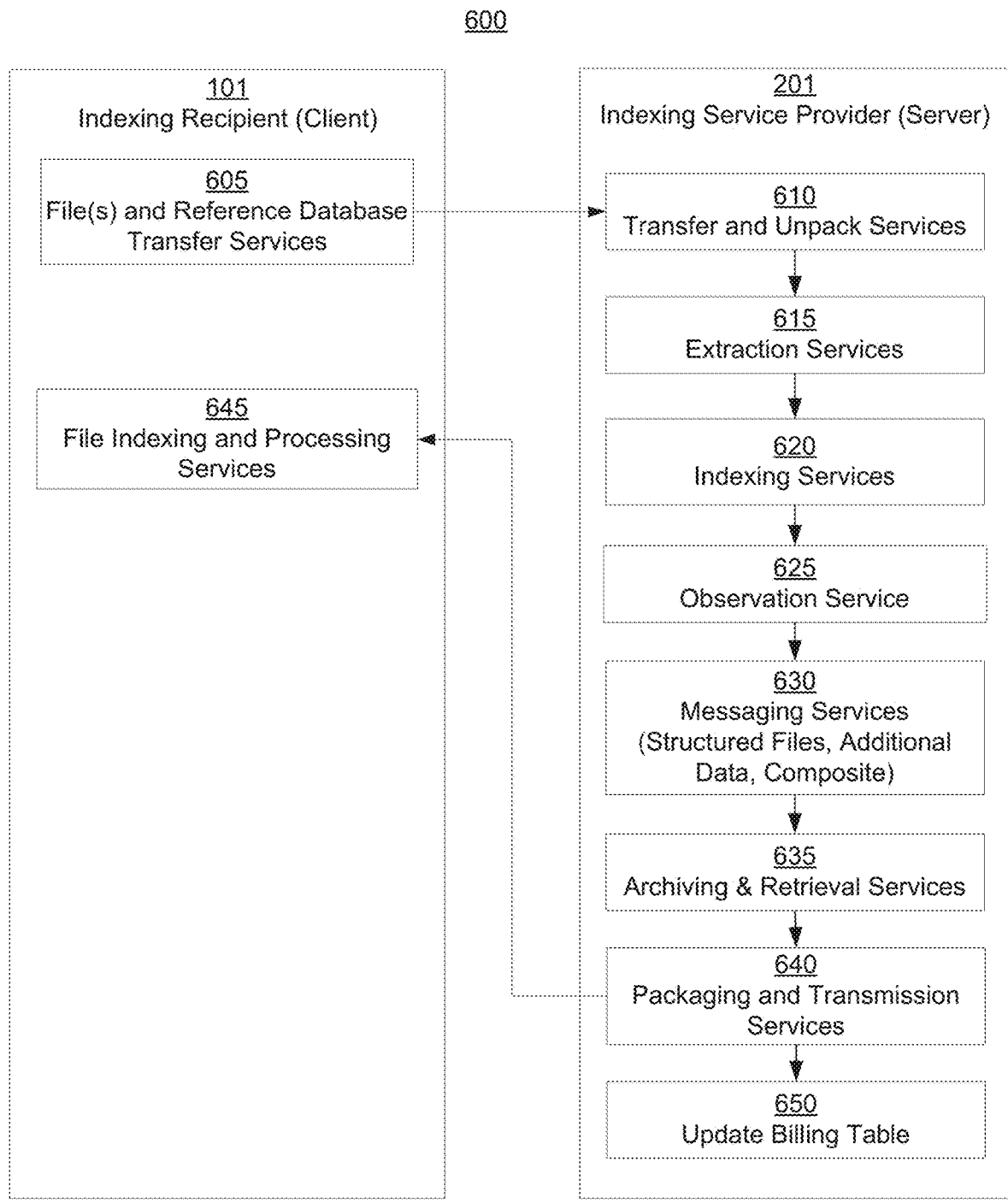
FIG. 6 depicts an exemplary method for processing a document file or files according to an embodiment of the present invention.

FIG. 6 depicts an exemplary method for providing indexing services and additional processing services to a client according to an embodiment of the present invention. Illustrated in FIG. 6 is an indexing recipient, or client, system 101 and an indexing service provider system 201. In an embodiment, the method for providing indexing and data processing services may include file(s) and reference database transfer services (605) in which received document files and a reference database may be transferred to the indexing service provider, as mentioned in the prior section. In an embodiment, the indexing service provider 201 may receive the document file or files and reference database or databases through its transfer and unpacking services (610). In an embodiment, the document file(s) and/or reference database(s) may be encrypted and/or may also be compressed. Accordingly, indexing service provider 201 may employ extraction services (615) to decrypt and decompress the data, if necessary.

The files received from the client system 101 may be processed by the indexing services (620) of the indexing service provider, which may also include the processing of document files that do not yield matches by manual indexing.

In an embodiment, observation services may also be performed (625) related to the document files. In an embodiment, observation services may include, but are not limited to, noting the occurrence of certain key characters or strings within a document file. For example, in a medical report certain terminology found to occur within a document file may trigger specified actions. In an embodiment, a specified action may be indicating to the client system 101, a recipient, or a third party that a certain terminology has been found. For example, the presence of certain terms, numbers, phrases, etc. being found in a document file may be used to alert a client. In an embodiment, additional data may be conditionally associated with data associated with the document file. For example, identification within the document file of testing positive for some marker may be associated with a selected action or actions, such as, indicating that a follow-up appointment should be scheduled. In an embodiment, first computing system 101 or indexing service provider 201 may interface with one or more programs to initiate an action. For example, first or second computing systems 101, 201 may interface with a calendaring program to suggest or schedule appointments and may interface with a messaging program to notify a patient.

In an embodiment, indexing service provider 201 may comprise messaging services (630) in which notifications and transmissions of data may be sent to the client system 101, a recipient, and/or third parties. As explained in more detail below, the messaging services may create and transmit a structured message, a message with additional data that may be associated with a matched document file or structured message, and/or a composite message that combines items into a message.

In embodiments, the indexing service provider 201 may additionally provide archiving and retrieval services (635) for the indexing recipient 101. For example, the indexing service provider 201 may provide data back-up functionality for document files, reference databases, and other files, which files may be accessed by the indexing recipient 101.

In an embodiment, indexing service provider 201 may include packaging and transmission services (640) for transmitting data to the indexing recipient 101. In embodiments, the packaging and transmission services may include encryption and compression features or algorithms. In embodiments, the packaging and transmission services may be part of the messaging services; or alternatively, the messaging services may be part of the packaging and transmission services.

In an embodiment, one or more steps or event occurrences may be linked (650) to a billing event and noted in billing records or in a billing table for billing to an indexing recipient or third party.

One skilled in the art shall recognize that the above-described are embodiments and that other configurations, including with fewer or additional steps or services, fall within the scope of the present inventions. Aspects of the steps mentioned above shall be described in more detail below.

Embodiments of Transfer Services

Figure 7:
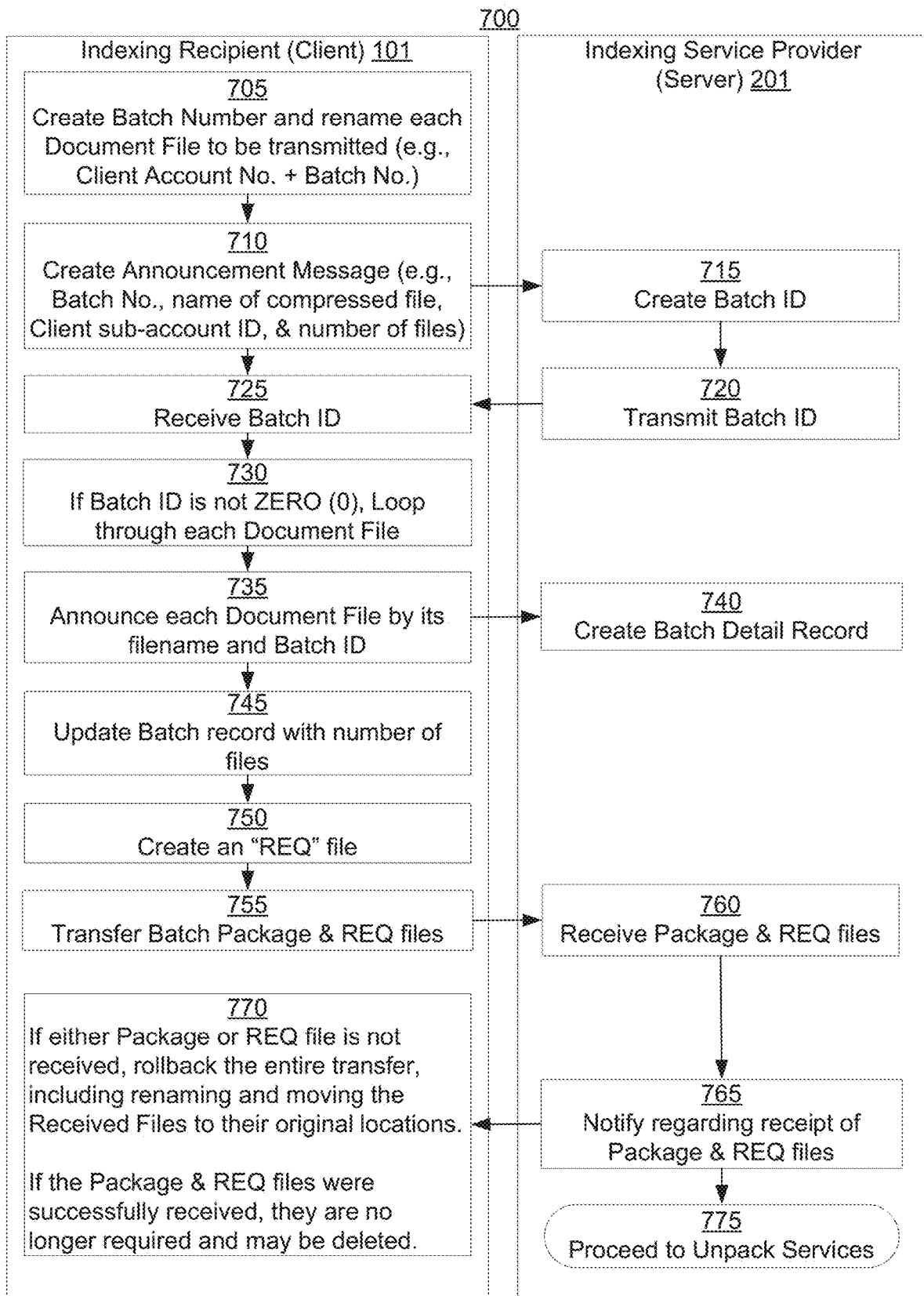
FIG. 7 depicts an exemplary method for transferring a document file or set of document files from a client system to an indexing service provider system according to an embodiment of the present invention.

FIG. 7 depicts an embodiment of transfer services performed in a client-server embodiment. As illustrated in the embodiment depicted in FIG. 7, an indexing recipient (or client) system 101 creates (705) a batch number and renames each file that is to be transmitted to an indexing service provider 201. In one embodiment, the client system 101 may generate a unique batch number by using a client account number plus a sequential number and/or a date/time number. In an embodiment, client system 101 may loop through each file to be processed to ensure that it has exclusive system access to the file. Client system 101 may not have exclusive access to a file if, for example, the file is still being received by client system 101 or is being used by another application on the client system. In an embodiment, the files may be renamed with a client account number or code, batch number, and a unique file name, and move/copy each renamed file into a "transit" folder. One skilled in the art will recognize that the renaming and moving/copying of the files to the transit folder may occur as part of the same step.

In an embodiment, the client system 101 may create an empty compression file with a file name comprising the batch number and a client account number or code. Each renamed file in the transit folder may be moved to the compression file. In one embodiment, the compression file may be a "Zip" file format. The compressed file may also be encrypted. In one embodiment, the encrypted file may be identified by adding an extension, such as ".enc" to the file name used for the compressed file.

In the depicted embodiment, the client system 101 announces (710) the batch to the indexing service provider (server) 201, and may also transmit a number that represents the number of files that are in the batch, the name of the batch file, and a client account and/or sub-account identification. If the batch information is received in total by the server, a batch ID may be generated (715) and transmitted (720) to the client system 101. In an embodiment, the batch ID may be a sequential number representing the total number of batches received to date by the service provider. In an embodiment, the batch number may be related to the batch ID. For example, it may contain a time-date stamp and may be generated during the same transaction of transmitting files to the server.

As illustrated in FIG. 7, the batch ID is received (725) by the client system 101. If the batch ID is zero (0), an error has occurred. In an embodiment, any error information may be logged and the transmit procedure may restart at the beginning or at any intermediate step to the point of re-announcing the batch.

If the batch ID is not zero, then the announcement was successful. That is, the client system 101 has successfully informed the server system 201 that a batch is about to be transmitted. In an embodiment, the client system 101 may loop through each file in the transit file and announce (735) the file name and batch ID to the server system 201. The announcement of the file registers a filename and batch ID to later identify the file on the server. In an embodiment, a batch detail record may be created (740) on the server system 201. The batch detail record may be used to define a document file on the server side 201. In an embodiment, the batch detail record may be used to eventually contain all details about a document file. The batch record may then be updated (745) with the number of files.

For the server system to begin indexing, it must be able to determine when files are ready. In an embodiment, the server system may employ a file watcher service or monitor service to monitor or look for files. To prevent the watcher service from inadvertently finding files that are not yet completely transferred, the service system 201 may also look for a request file, or REQ file. In an embodiment, an REQ file is created (750), which file may be a blank file with the same file name as the encrypted batch package file name with an additional extension, such as ".req."

In the depicted embodiment, the client system 101 transfers (755) the batch package, which in this illustrated embodiment is a compressed and encrypted file containing the document files, and its associated REQ file. By transmitting the batch package first followed by the REQ, when the file watcher service finds the REQ file, the server system is assured that the batch package file has already been received.

In an embodiment, the server system 210 may notify (765) the client system 101 that it has received the files. In one embodiment, if either file is not received, the client system 101 may repeat all or part of the entire transfer. This may include renaming and moving the image files to their original locations. In an embodiment, if the batch package and REQ files were successfully received by the server system 201, the files in the transit folder may be moved to a "pending" folder, and the client system 101 may be deleted batch package and REQ files from its system.

In an embodiment, after unpacking the batch package, the server system 201 may check the number of files that were announced to it. If the number of document files in the batch do not equal the number of files that were announced to the server system, an alert notification may be made by the server system and sent to an individual, a system administrator, and/or to the client system. In an embodiment, an automated process may be initiated to rollback the erroneous transmission and reinitiate the transfer.

Embodiments of Unpack Services

Figure 8:
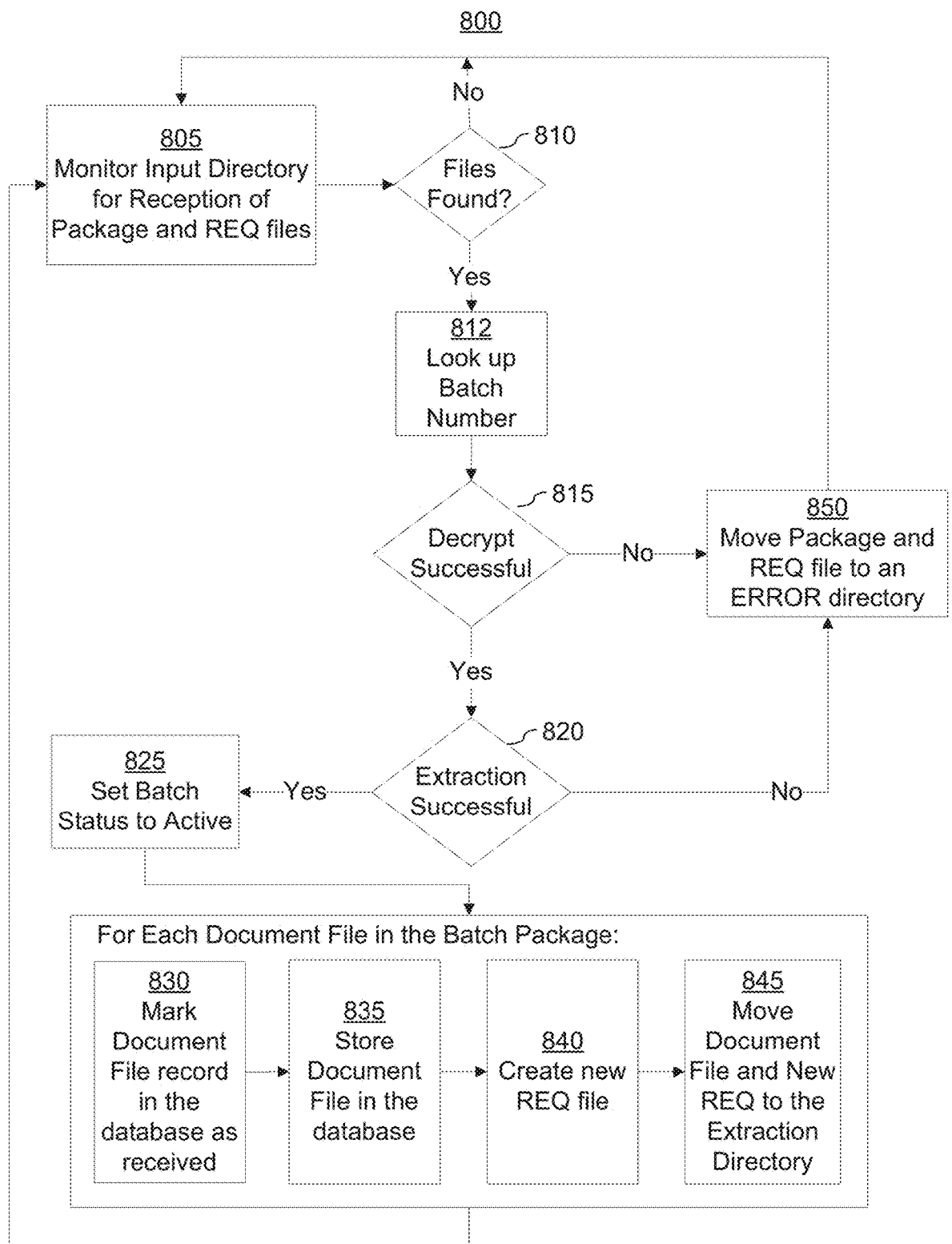
FIG. 8 depicts an exemplary method for decrypting and extracting/decompressing a received batch of document files according to an embodiment of the present invention.

Turning to FIG. 8, an exemplary method for unpacking files from the indexing recipient 101 according to an embodiment of the present invention is depicted. FIG. 8 may represent an embodiment of the unpack services (610) mentioned in FIG. 6. As depicted in the embodiment of FIG. 8, the indexing service provider 201 may monitor (805) an input directory for receipt of files from an indexing recipient or client system 101. In an embodiment, when files have been received or found (810) to be present in an input directory, the indexing service provider 201 may look up (812) the batch number that has been received.

As mentioned previously, embodiments of the present invention may include encrypting files to provide security. Embodiments of the present invention may also include utilizing compression algorithms to help reduce bandwidth requirements of transmitting data between the indexing client system 101 and the indexing service provider 201. The embodiment depicted in FIG. 8 is directed toward embodiments in which compression and encryption have been performed as part of the transmission process. Alternative embodiments may not include encrypting, compression, or both.

Returning now to FIG. 8, if the batch package is properly decrypted (815), the batch package may be extracted or uncompressed. If the decryption or extraction is not successful (820), the received batch package and its associated REQ file may be moved (850) to an error directory for additional processing. In an embodiment, the additional processing may include requesting the indexing recipient system 101 to retransmit the files or to change encryption or compression algorithms.

In an embodiment, following successful decryption and extraction, the indexing service provider system 201 may set (825) the batch status to "active" and for each document file in the batch package, perform additional processing. In an embodiment, this additional processing may include marking (830) a document file in a database as being received, storing (835) each document file in a database, creating (840) an REQ file for the document file, and moving or otherwise noting that the document file is ready for further processing. In an embodiment, the noting that the document file is ready for further processing may be accomplished by moving (845) the document file or copying the document file and the new REQ file to an extraction directory. In an embodiment, a monitoring service may begin the extraction processes for a document file when its REQ file is present.

Embodiments of Extraction Services

Figure 9:
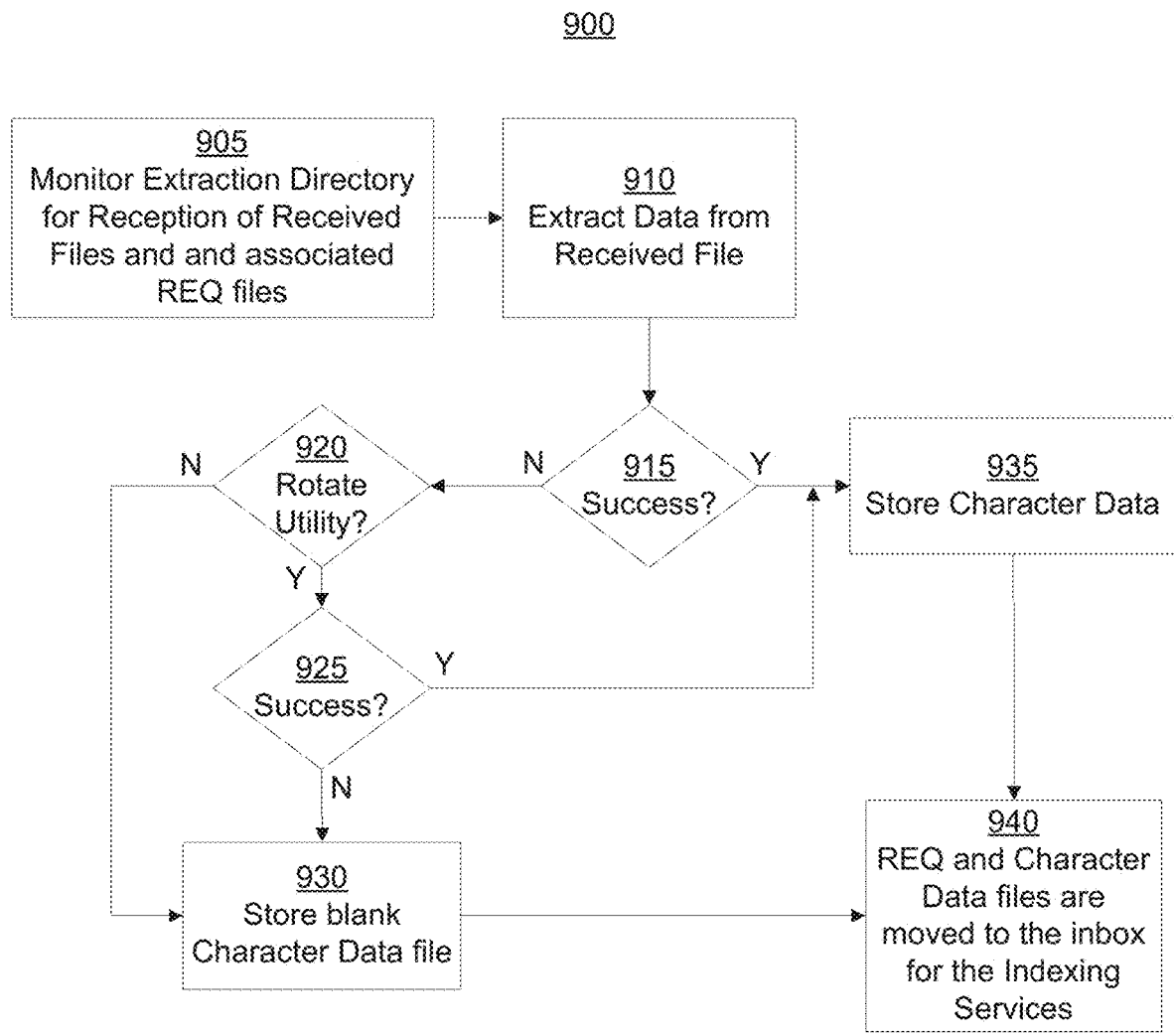
FIG. 9 depicts an exemplary method for extracting data from a document file according to an embodiment of the present invention.

FIG. 9 depicts an embodiment of a method for extracting characters from a document file according to an embodiment of the present invention. In some instances, a document file may directly representative of the data contained in a physical or electronic media. For example, a document file that is an HL-7 file directly represents the data contained therein. In some embodiments, a document file may indirectly represent the data contained in a physical or electronic media. For example, a document file of a scanned image indirectly represents the data contained within the scanned document. Data extraction may be beneficial in such cases to extract at least some of the plurality of characters that is related to the data of interest. For example, optical character recognition or voice character recognition operations may assist in extracting the data. In either event, the document file comprises data that comprises a plurality of characters.

In an embodiment, indexing service provider system 201 monitors (905) an extraction directory for receipt of a document file and its associated REQ file. When those files are received, a document file may have data extracted (910) from the document file.

In an embodiment, the extraction type performed by the indexing service provider system 201 may be determined by one or more characteristics such as, for example, file type or extension, client or account, or may be indicated in the REQ file. For example, an image file that is a portable document format (PDF), or some image file type such as a TIFF, GIF, JPEG, or the like, may be sent for optical character recognition. If the document file is an image file, the data contained within the document that the document file represents may be converted from the image file. In one embodiment, optical character recognition operations may be performed to convert the document file to obtain at least some of the plurality of characters, which characters may include alphanumeric text or graphics. In an embodiment, the optical character recognition may be performed on machine-generated documents and/or on handwritten documents.

Assume, by way of example, that the report 400 in FIG. 4A is scanned to create a document file that is an image file of the report 400. By performing optical character recognition operations on the document file, at least some of the plurality of characters representing information on report 400 may be obtained. This data may include the alphanumeric text on report 400, for example, the patient's name, age, date of birth, account number, test results, and the like. This data may be used for indexing or processing of the document file.

Audio files, which may be denoted by having an audio extension such as, for example, .wav or .mp3, or the like, may be processed using voice recognition methods. In an embodiment, an audio file may be converted by using speech recognition software or hardware.

In an embodiment, extraction services may also be used for documents that are already in an electronic format that is character-based by extracting or parsing characters from structured fields. One skilled in the art will also recognize that certain file types may possess one or more fields which makes identifying strings and indexing files easier and more accurate. Consider, by way of illustration, an HL-7 data file or message. An HL-7 message is a structured ASCII file with delimiting characters, or pipes, that divide the file into segments or fields, which correspond to or can be used as identifying indicia. For example, the first line of data in an HL-7 message is typically the message header segment which identifies the file producer and date the file was created. The file may also identify additional information including, but not limited to, to whom the message refers, internal account numbers, external account numbers, various patient information, and the provider of services.

In one embodiment, the file type is RTF, TXT, or other similar text-based file containing a plurality of characters that may be used for indexing or processing the file. Consider, by way of illustration, a transcription file or message containing the transcript of an audio file. One skilled in the art will also recognize that text-based file types are inherently less prone to matching error based on individual match strings and thus may provide a high degree of resolution and computation.

Second and/or first computing system 201/101 may be configured to index a structured document file based upon one or more of the identifying indicia strings contained within known fields in the file. In an embodiment, a set of one or more strings from the document file may be compared against a comparison reference database in the same or similar manner as described below with reference to indexing services for validation and/or error correction. Because these document files may contain errors, by comparing these files against the reference database, these errors may be identified and corrected, thereby improving the accuracy of the indexing process. For example, a provider of laboratory services that manually enters data by reading a specimen label may inherently produce erroneous structured message document files. This structured message document file may be reconciled against a reference database and corrected, thereby improving the accuracy of a previous manual process.

One skilled in the art will also recognize that other forms of data conversion may be performed on a document file wherein at least some of the plurality of characters may be obtained, regardless of the type of data originally received.

In an embodiment, when data has been extracted from a document file, indexing service provider system 201 may check (915) if the process has been successful. In one embodiment, if the process has been successful, the characters may be stored (935) in a file and that file and an REQ file may be moved (940) to the input of a matching/indexing utility.

In an embodiment, if the extraction process has not been successful, the document file may be subjected to a rotation utility (920) for rotating the image. An exemplary rotation utility is described below with reference to FIG. 10. A rotation utility may or may not be performed depending on the file type. For example, if the document file is an audio file, TXT, RTF, XML, or HL-7 file, rotation would not be performed. If the rotation algorithm is successful (925), then the extracted character data may be stored (935) in a data file and associated with that document file from which it was extracted. In an embodiment, if the rotation utility is not successful or if no rotation utility is performed, then no characters may be stored (930) in the database data file associated with that document file.

Figure 10:
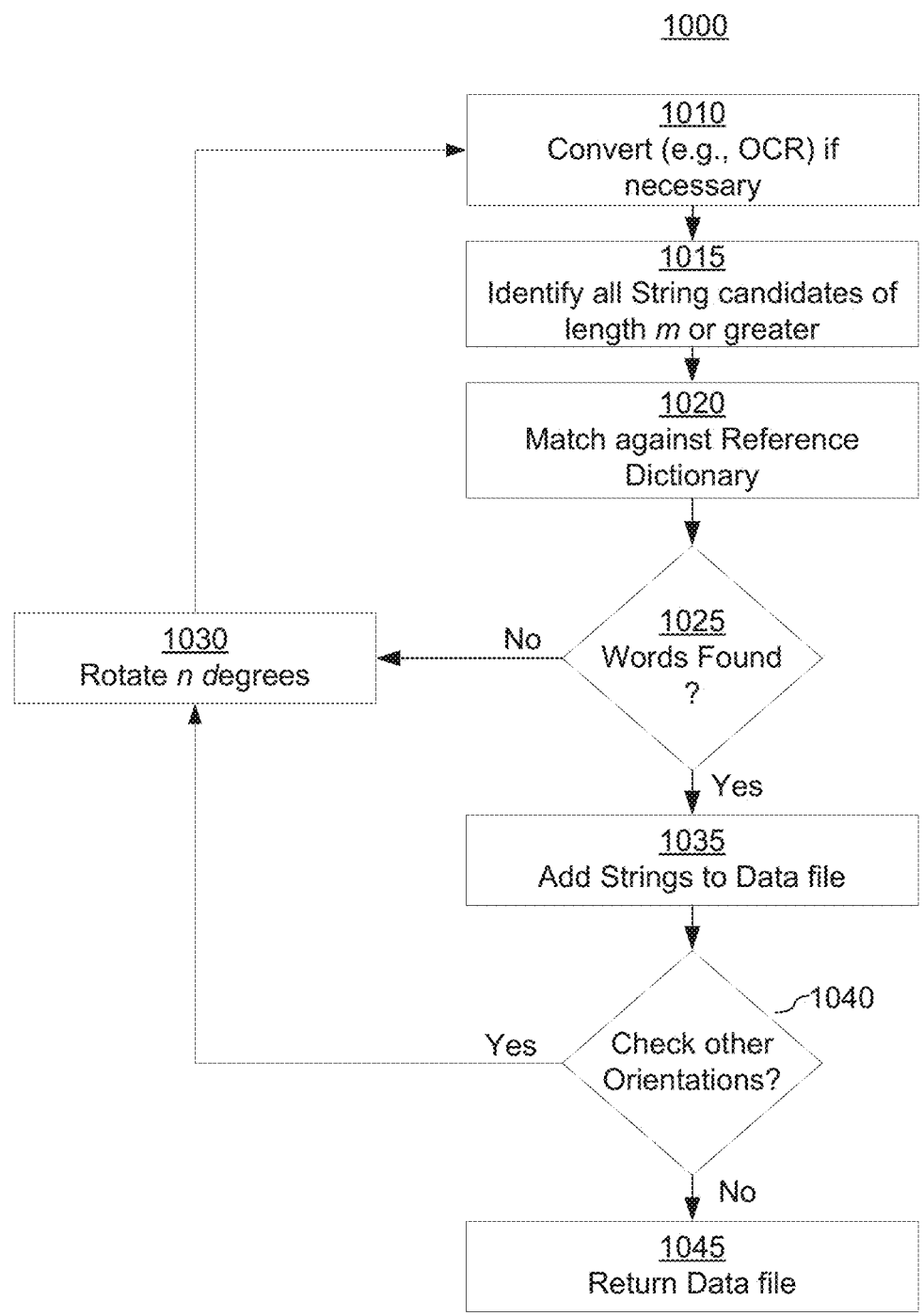
FIG. 10 depicts an exemplary method for extracting characters from a document file according to an embodiment of the present invention.

FIG. 10 depicts an exemplary method for extracting character data from a document file according to an embodiment of the present invention. In the depicted embodiment, the image data may be converted (1010), for example, through the use of an optical character recognition algorithm or algorithms, if necessary. The resulting character data obtained from the optical character recognition process may be used to identify all string candidates of length m or greater, where m may be preset or user selected. In one embodiment, m may be three or more characters; that is, each string composed of three or more characters is identified. These strings may then be compared (1020) against a reference dictionary or dictionaries. In an embodiment, a reference dictionary may be a dictionary of common words, or may be words specific to a client, account, or sub-account. For example, if the client is a medical profession, the reference dictionary may have words that commonly occur within that client's practice. In an embodiment, the reference dictionary may contain words specific to an industry and common words not specific to any industry.

The comparison of the string candidates with the reference dictionary determines if any words are found (1025) from the character data obtained from the extraction process. If no words are found, the data obtained from the extraction process is likely to be nonsensical and it is also likely that an error or problem occurred during the extraction process. An example of an error may be that the document file contained an image that when scanned or otherwise produced was in a layout that is different than the layout assumed by the extraction process. For example, the image may be in landscape view or somewhat skewed and the extraction process assumes a portrait layout. According to an embodiment of the present invention, the image may be rotated some n degrees (1030) and have the steps repeated again to see if the alignment is such that character data that yields words has been extracted. This process may be repeated a set number of times, until words are found, a user-selected number of times, or until all orientations have been checked.

In an embodiment, it may be set such that if the process has repeated steps (1010) through (1030) a number of times and no words are found, the process may end and return an alert that the process failed—that no data was found and store a blank character data file as mentioned in FIG. 9 (step 930). If words are found, the character data may be added (1035) to the character data file.

In an embodiment, additional orientations may be checked (1040). For example, in some reports, the textual data may exist in different orientations. For example, some characters may be in landscape layout and some characters may be in portrait layout. In the embodiment depicted in FIG. 10, additional orientations may be checked (1040) to capture that character data. If it is desired that additional orientations are checked, the image may be rotated a certain number of degrees, n, which may be preset or user selected, and the process repeated. If checking additional orientations (1040) is not desired, the character data obtained from the process may proceed (1045) to the next stage. As noted previously, if no character data was found, the character data file would be blank.

Figure 11:
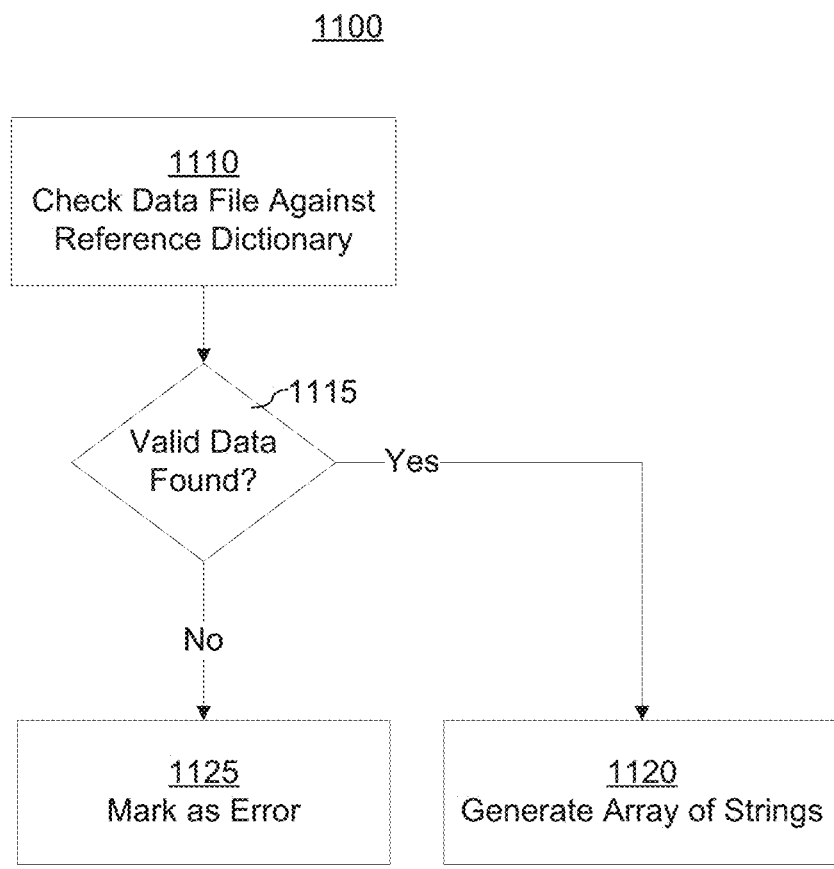
FIG. 11 depicts an exemplary method for checking the extraction of characters from a document file according to an embodiment of the present invention.

Turning to FIG. 11, in an embodiment, the character data file obtained from the extraction services may be checked against a reference dictionary to determine if valid data was extracted. FIG. 11 depicts an exemplary method for determining if valid data was obtained from the extraction services according to an embodiment of the invention. Similar to what was depicted with reference to FIG. 10, the character data may be checked (1110) against one or more dictionaries. In embodiments, the reference directory may be specific to a client, may be a general dictionary, or may be some combination thereof. By checking strings against a reference dictionary, it may be determined (1115) whether valid words occur within the extracted character data file. In an embodiment, if no valid words are found, the file may be marked as "error" in a database of the indexing service provider 201. In one embodiment, a blank character data file may indicate that an error has occurred.

In an embodiment, if valid data is found, the process may proceed to generating (1120) an array of strings from character data file, which comprises a plurality of characters.

Exemplary Character Data File and Exemplary Array of Strings

FIG. 12A depicts an exemplary character data file 1200 comprising a plurality of characters that might be obtained from extraction services performed on the document file 400. In an embodiment, the plurality of characters may be organized into an array of strings 1205 or 1210 as depicted in FIG. 12B. In one embodiment, a string may be defined as a set of characters bounded by delimiters, such as space, tabs, punctuation, and the like. In the depicted embodiment in FIG. 12B, the strings are selected by space delimiters, and a string (e.g., 1220-1) may be assigned a position within the array (e.g., 1215-1).

Embodiments of Indexing Services

It should be noted, however, that difficulties may arise in processing a document file if the character data associated with it contain errors. For example, one or more of the character data, whether through data entry error or misidentification of a character or word by recognition operations, may be incorrect. Accordingly, in an embodiment, a comparison reference database may be employed to improve the accuracy of identifying, indexing, and/or processing of a document file.

In embodiments of the present invention, the array of strings obtained from a document file may be compared against a comparison reference database to help index and/or process the document file. The comparison reference database may be the full reference database obtained from the indexing recipient system 101, or alternatively, the comparison reference database may be the database resulting from one or more filtering operations performed upon the full reference database or on an already filtered reference database. It shall be noted that in some instances even after performing filtering, the comparison reference database may be equivalent to the reference database. Some embodiments of the present invention may utilize filters on the array of strings obtained from a document file, on the reference database, or both in attempts to reduce either or both files. Reducing either or both the array of strings and the reference database speeds the indexing. It shall be noted that the terms "filter" and "filtering" may be construed to mean one or more filtering/matching operations.

As noted previously, the information contained in or converted from a document file includes a plurality of character elements. These character data elements may be used as identifying indicia for categorizing the document file. In an embodiment, the character data may match information in a comparison reference database with varying levels of accuracy. The data string elements are generally arranged in proximity between respective pairs of data string elements that comprise identifying indicia. As such, the data may define identifying indicia to varying degrees of accuracy.

In order to improve the accuracy of the identifying indicia, second computing system 201 may analyze the data elements associated with the document file, in particular by utilizing approximate matching algorithms and comparing a reference database to data string elements at a plurality of points along the length of the data element.

Absent comparison with one or more known reference databases, the values of the data string elements derived from the document files may have errors since the document files may contain erroneous information from the primary data source, such as from missing, incorrect, or misspelled information, or from the extraction process, such as optical character recognition, speech recognition, or optical mark recognition.

In embodiments, second computing system 201 may interpret a value for data string elements contained within document file derived from physical or electronic media. In one embodiment, one or more comparison reference databases may be applied to a data string element to obtain a value for that data string element. The value for a data string element may be the result of applying a comparison reference database to the original data string element. By repeating this process at a plurality of points consisting of data string elements, the identifying indicia contained within the document file may be extracted such that a resulting array of strings, a structured file comprising data from the document file, a composite, or a message representing the data contained within the document file is precise relative to the reference database. In the present embodiment, the resultant data file, which may be an array of strings or set of strings, may be utilized in automated indexing processes.

In an embodiment, in order to improve at least some of the plurality of data elements associated with the document file, second computing system 201 may be configured to automatically correct information associated with the document file according to a reference database or databases. In an embodiment, second computing system 201 may apply a Levenshtein algorithm to correct the information associated with the document file. In one embodiment, second computing system 201 may apply a Levenshtein-distance algorithm, which is known to those skilled in the art and is disclosed in *Algorithms and Theory of Computation Handbook*, CRC Press LLC, 1999, "Levenshtein distance", in Dictionary of Algorithms and Data Structures, Paul E. Black, ed., U.S. National Institute of Standards and Technology (10 Nov. 2005), and which is also available at <http://www.nist.gov/dads/HTML/Levenshtein.html>, the contents of each are incorporated herein by reference. One skilled in the art will recognize that a variety of approximate matching and correction techniques may be utilized to correct information, such as the plurality of data elements associated with a document file, and such techniques are within the scope of the present invention.

In addition to the foregoing or as an alternative, as part of the extraction process and/or as part of the indexing/matching process(es), one or more techniques may be employed, including associative memory techniques that rely on learned coupling constraints or objective set definition procedures, such as, for example, bigrams. Other approaches to error-tolerant searching, which include but are not limited to, deterministic finite automation, hash tables, associative memory, bipartite matching, longest-common-subsequence (LCS), glob style matching, regular expressions matching, and other approaches known to those skilled in the art may be also employed. Searching methods are further described by Gonzalo Navarro and Mathieu Raffinot in *Flexible Pattern Matching in Strings* (Cambridge University Press, 2002); by Maxime Crochemore and Wojciech Rytter in *Jewels of Stringology* (World Scientific, 2002); and by Vladimir I. Levenshtein in *Binary codes capable of correcting deletions, insertions, and reversals*, Doklady Akademii Nauk SSSR, 163(4):845-848, 1965 (Russian) (English translation in Soviet Physics Doklady, 10(8):707-710, 1966), the contents of each of the above is incorporated herein by reference.

One or more matching algorithms may be employed as part of or in combination with an indexing/processing method; exemplary indexing/processing methods are provided below for purposes of illustration.

Figure 13:
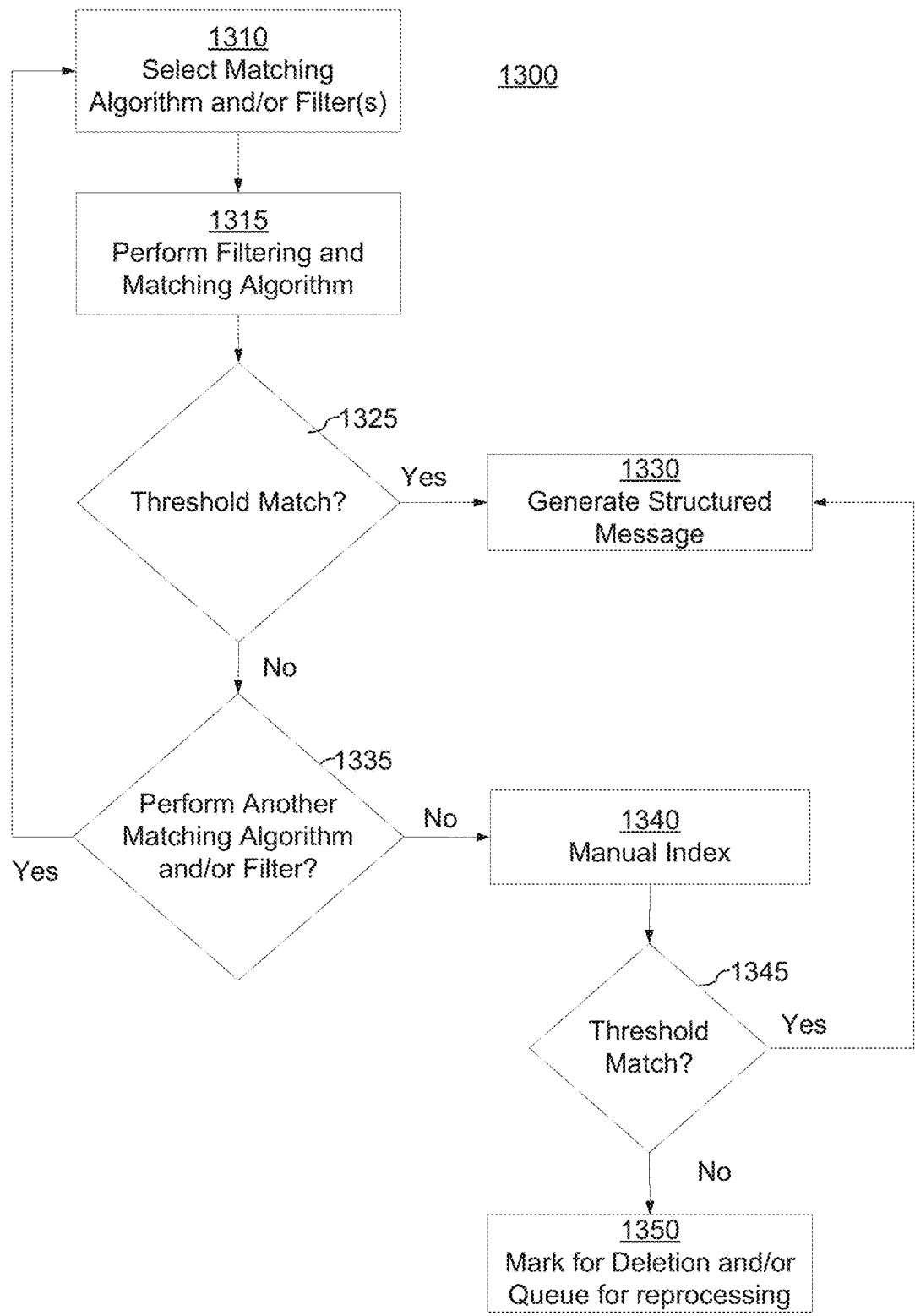
FIG. 13 depicts an exemplary method for indexing a document file according to an embodiment of the present invention.

FIG. 13 depicts an exemplary method 1300 for indexing a document file according to an embodiment of the present invention. In an embodiment, a matching algorithm and/or one or more filters may be selected (1310). The matching algorithm, filters, or both may be preset or may be user selected. One skilled in the art shall recognize that a matching algorithm may be a filter and a filter may be a matching algorithm. For example, filtering the reference database based on a characteristic or characteristics may filter the reference database to a single matching record. Alternatively, a matching algorithm may return two or more records that satisfying the matching criteria, thus effectively filtering the reference database, and this filtered reference database may be used in subsequent filtering and/or subsequent matching algorithms.

The filtering (if applicable) and matching algorithm is performed (1315), and the results obtained. If a sufficient threshold match has been found (1325), the document file may indexed. In an embodiment, the threshold match value may be preset or user selected and may be based upon one or more factors including, but not limited to, the number of matching strings in the array of strings, the uniqueness of the matching strings, the degree of fuzziness allowed in the extraction and/or matching processes, the type of filters and/or matching algorithms used, the degree of matching with the next closest match or matches, and the like. In an embodiment, the indexing service provider system 201 may index a document file by associating the document file with a matching record by generating (1330) a structured message that links the document file to the matching record. In embodiments, the structured message may be an HL-7 message, a mark-up language file, a file in a database, a text file with associated information, some other file type, or a combination thereof.

If a threshold match has not been achieved, another match algorithm and/or filtering operation may be selected (1335) and the process repeated. In an embodiment, the process may be repeated until a match has been determined or until all the filters and/or algorithms have been utilized.

If a threshold match still has not been found, the document file may be sent or loaded into a manual indexer (1340). The manual indexing services will be described in more detail below, but in an embodiment, the manual indexer may present the document file to an individual for manual matching. In an embodiment, one or more of the highest ranking matches (if any) may be associated with the document file and loaded into the manual indexer to provide matching suggestions to the user. In an embodiment, if a match is made via the manual indexer, the document may be associated with a record via a structured message (1330), as discussed previously.

In an embodiment, if, after manual review, an indexing match has not been made, the document file may be marked for deletion (1350) and/or it may be put into a queue for reprocessing. Reprocessing may be beneficial in certain instances. Consider, for example, if the comparison database does not yet contain a record to which the document file should be indexed. By waiting and reprocessing, the reference database may be updated and a match found.

Figure 14:
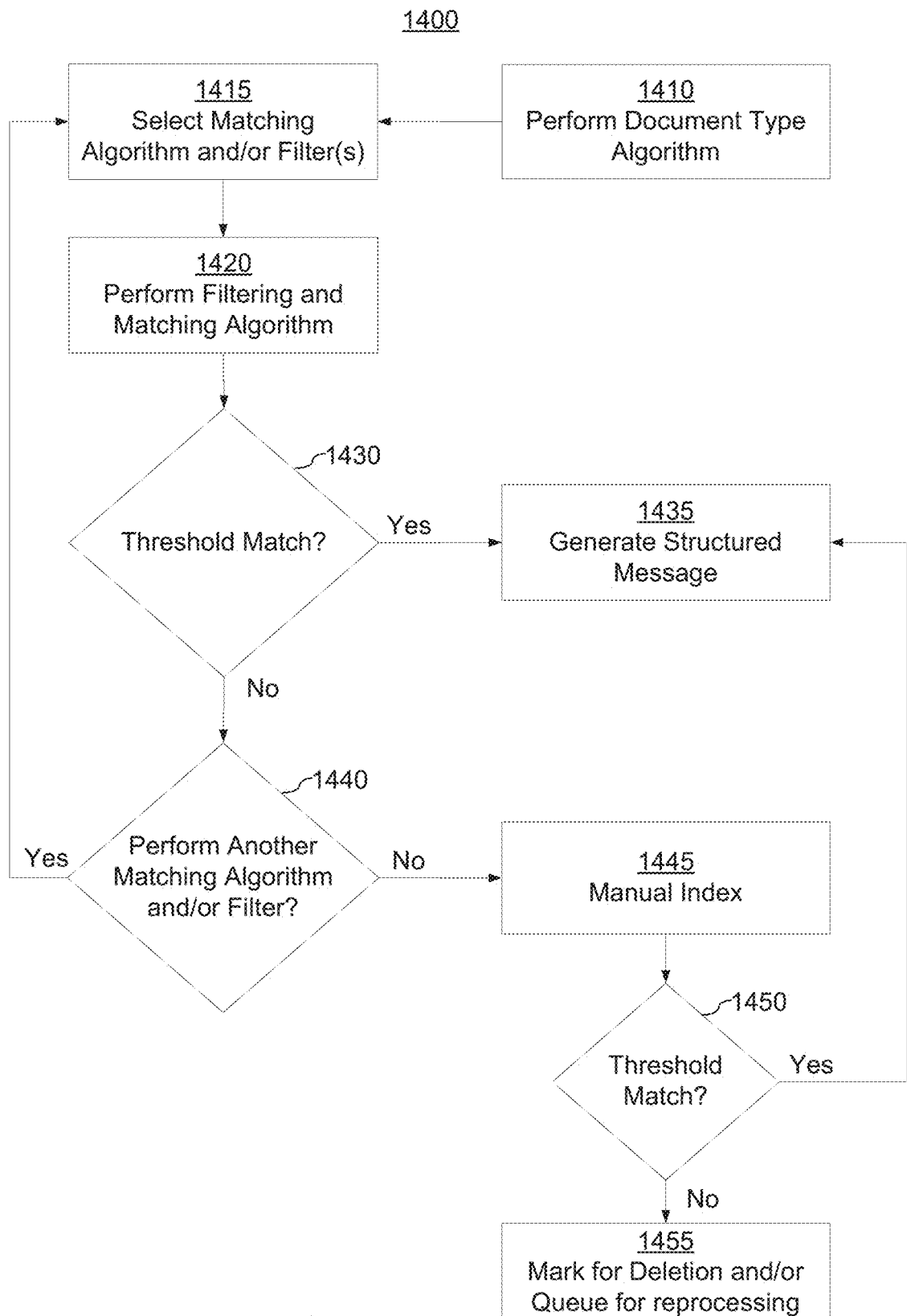
FIG. 14 depicts an alternative embodiment of a method for indexing a document file according to an embodiment of the present invention.
Figure 15:
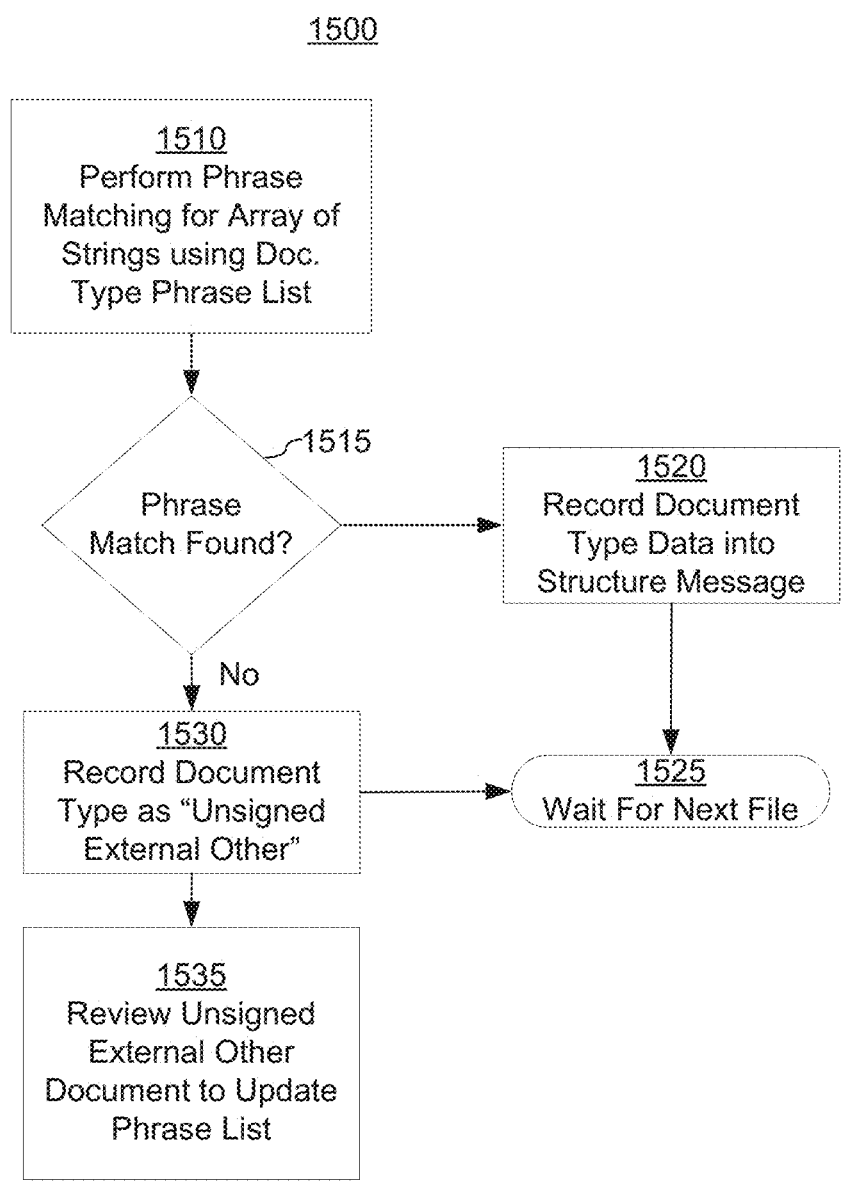
FIG. 15 depicts an exemplary method for determining a document type of a document file according to an embodiment of the present invention.

FIG. 14 represent an alternative embodiment of a method for indexing a document file. The method depicted in FIG. 14 is the same as that disclosed with respect to FIG. 13 with the exception of an additional step (1410). In an embodiment, the indexing services may attempt to determine the document type that the document file represents. FIG. 15 depicts an embodiment of a method for determining the document type of a document file.

FIG. 15 depicts an exemplary method for determining a document type of a document file according to an embodiment of the present invention. In an embodiment, the array of strings for a document file may be compared (1510) against a phrase list or lists of document types. The phrase list may be specific to a client or industry or may be general. For example, a specific phrase list for medical office may include a list of medical lab reports and the like. If a phrase match is found (1515) the document type may be associated with the document file. In an embodiment, the document type may be associated with the document file by storing (1520) the document type in a structured file for the document file.

If a phrase match is not found, the document type may be recorded (1530) that it is not known. In an embodiment, the document type may store (1530) the document type in a structured file as "Unsigned External Other," which means that it is not currently known. In an embodiment, if the document type is not known, a user may be alerted and requested (1635) to review the document file and input the document type, if any, and update the document type list. By updating the document type phrase list, more document types may be identified in subsequent document file processing. In an embodiment, the alert and review to determine document type may be performed via the manual indexer utility.

In one embodiment, an array of strings or set of strings may be associated with document types. The frequency of words, key words, or key word phrases may be calculated and tabulated. The association of word frequencies, key words, or key word phrases with the document type may be stored in a relational database. Subsequent string arrays from unknown document types may then be compared to previously stored associations and an estimation of document type may be obtained. In one embodiment, when a threshold of certainty for document match is reached, then the unknown document may be assigned a document type.

In one embodiment, system 201 may learn by experience to suggest the most likely document type match, and this suggestion may be associated with document file submitted to a manual indexer. Based on a user's response, a match association is made. That match association may be stored for use in other automated document type matches.

In an embodiment, the array of strings for a document file may be analyzed for word frequency and/or word associations and compared against known word frequencies, key words, or key word phrases contained in or associated with a phrase list or list of document types. The phrase list or list of document types may be specific to a client or industry or may be general. For example, a phrase list or list of document types for medical office may include word frequency, key words, key word phrases, word/phrase associates, word/phrase proximity, and the like to help identify document types, such radiology reports, pathology reports, medical lab reports, and the like. For example, a phrase list or list of document types may indicate that multiple instances of the key word "X-ray" or a few instance of the key word "X-ray" in connection with at least on instance of "Radiology" in an array of strings may result in a conclusion that a threshold match (1515) has been reached. If a threshold match is found (1515), the document type may be associated with the document file.

In one embodiment, an examination of the array of strings using input from the phrase list may result in some matches but none that exceed a threshold match. One or more of the document type matches may be provided to a user as suggestions. In an embodiment, the phrase list may be updated by identifying new document types associations. In an embodiment, the alert and review to determine document type and document type associations may be performed via the manual indexer utility. In an embodiment, the system may record the matching configurations for future associations and matching, or utilize other adaptive learning techniques known to those skilled in the art to improve the matching processes.

One skilled in the art shall recognize that adaptive learning by the system helps increase indexing and processing and may be applied to other aspects of the system, including but not limited to embodiments of matching/filtering not limited to document type. One skilled in the art shall also recognize that the phrase lists or dictionaries utilized as part of the matching/filtering may comprise not only key words and/or key phrases querying, but also utilize word frequencies, word proximities, conditional relationships, word associations, and the like and may be utilized in other matching/filtering applications described herein or known to those skilled in the art. It shall also be noted that a "word," such as in "key word," is a string.

Embodiment of the present invention may utilize one or more match/filter operations on the array or strings and/or on the comparison reference database to aid in the indexing. Consider the following exemplary methods for indexing a document file.

Let A be the input alphabet, a finite set of symbols. Elements of A are called the characters, which may be text or symbols. Examples of alphabets may include, but are not limited to, the set of all ordinary letters, the set of binary digits, and the set of 256 8-bit ASCII symbols. In an embodiment, words or strings over A are finite sequences of elements of A. The length (size) of a string may be the number of its elements, which may include repetitions. Thus, the length of "aba" is 3. The length of a string may be denoted by $|x|$. The input data for an embodiment of a matching function may be a string, which may be the array of strings from a document file or a portion thereof.

The i-th element of string h is denoted by h[i] and i is its position on h. We denote by h[i . . . j] the factor h[i], h[i+1], . . . , h[j] of h. If i is greater than j, by convention, the string s[i . . . j] is an empty string (a sequence of length 0), which may be denoted by E. In an embodiment, the string h of length m may be referred to as a factor (also called a substring or subword) of the string y if h=y[$i_1$]y[$i_2$] . . . y[$i_m$], where $i_1, i_2, \ldots i_n$ is an increasing sequence of indices on y.

Instead of just one pattern, one can consider a finite set of patterns and ask whether a given string contains a pattern from each set. Information related to string matching has been discussed by Maxime Crochemore and Wojciech Rytter in *Jewels of Stringology* (World Scientific, 2002) at pp 10-11, which is incorporated herein by reference in its entirety.

Assume for purpose of explanation, that an array of strings comprises strings $h_1 \ldots h_n$ of the same or varying lengths $|x|$, and also assume that an array of strings that contain at least one capitalized character, CAPSTRING, comprises strings $H_1 \ldots H_n$. In an embodiment, the CAPSTRING strings, $H_1 \ldots H_n$, may be a subset of the array of strings $h_1 \ldots h_n$.

An embodiment of a matching function may comprise the following steps. In an embodiment, a filtering operation may be performed, which may comprise apply one or more filters, to reduce the size of the reference database and/or of the array of strings. For example, an array of strings obtained from a document file may be filtered to obtain all strings $H_n$ of length $|x|$ that contain a capital letter. In an embodiment, after identifying all strings $H_n$, strings surrounding these strings may also be included in the filtered result. That is, embodiment of the present invention may use identified strings as anchor points for including or excluding additional strings in the set of strings used for matching. In an embodiment, the inclusion or exclusion of strings may be symmetrically or asymmetrically disposed about the anchor points. In an embodiment, the filtered result may select strings within a selected location, p, of the an identified string Hn, such that the filtered set of strings comprises the strings $H_{n-p} \ldots H_n, \ldots H_{n+p}$. Assume, for the purposes of illustration, that p=1, then the set of strings would be $H_{n-1}$, $H_n$, and $H_{n+1}$. In an embodiment, the filtered set of strings may contain a plurality of set of strings comprising strings within the same or different proximities of identified strings.

In an embodiment, a sequence list comprising sequences of length m that corresponds to first m characters in each string from a set of strings may be generated. If m=3 and if the set of strings comprises the strings with at least one capital letter, Hn, then the sequence list would comprise the sequence ($H_n[1], H_n[2], H_n[3]$) for each string Hn in the set of strings. In an embodiment, a sequence may be generated from a substring portion of the string, and in an embodiment, the sequence list may comprise one or more sequences from strings in the set of strings. It should be noted that these sequence lists may be used for matching/filtering purposes. One skilled in the art shall recognize that one benefit of using sequence lists, or substrings, is that if there exists some errors, such as from entry errors or as a result of the extraction process, matches may still be obtained by matching substring portions.

Consider now a comparison reference database, which may be a full reference database, a subset of a full reference database, or one or more subsets of a comparison reference database. Let the comparison reference database be composed of rows $|\alpha|$, where $\alpha_1, \alpha_2, \ldots, \alpha_n$ represent the set of possible comparison reference database rows in the comparison reference database. In an embodiment, each row may correspond to a record, wherein each record comprises one or more data field elements. Examples of data field elements may include, but are not limited to, the fields 405 depicted in FIG. 4B (i.e., name, date of birth, account number, service provider, provider, etc.). In an embodiment, a data field element may comprise a set of elements.

In an embodiment, a set of strings, which may comprise a list of sequences, may be compared to the comparison reference database to reduce the α (row) candidates by matching the sequences against $\alpha_1, \alpha_2, \ldots, \alpha_n$. In an embodiment, search functions or algorithms may be employed, such as, for example, using the search engine marketed by dtSearch, Corp. of Bethesda, Md. In an embodiment, the row candidates (α) may be ranked by number of matches per row.

If only one row candidate is returned (has a match or matches), then the document file may be associated with that record. Alternatively, if additional verification is desired, additional matching may be performed, include without limitation, checking some or all of the array of strings against the row or rows to determine if more matches are found.

In an embodiment, if more than one row candidate has a match or matches, each such row candidate may be searched against the entire array of strings, or a subset thereof, to identify matches. In an embodiment, the matches may be grouped by row ($\alpha_n$) to derive a new function or pattern, denoted INDXMATCH. In an embodiment, INDXMATCH for a row $\alpha_n$ may be denoted INDXMATCH_$\alpha_n$ and equals the set of matches, $MATCH_1, MATCH_2, \ldots, MATCH\varphi$ occurring in row $\alpha_n$. The number of matches found in row $\alpha_n$ is φ. In an embodiment, the INDXMATCH results may be ranked by φ, which ranking may be used to indexing the document file. In an embodiment, certain values of matches in a row, MATCHφ, may be given different weights for ranking purposes.

It shall be noted that each INDXMATCH_$\alpha_n$ forms a pattern that may be searched against the reference database, or subset portion thereof. Let the number of instances that the pattern INDXMATCH_$\alpha_n$ occurs in the reference database equal ρ. In an embodiment, the document file with an INDXMATCH_$\alpha_n$ that yields a value of ρ=1 may be defined as a threshold match. In an embodiment, if INDXMATCH_$\alpha_n$ occurs in the reference database such that the value of ρ>1, then those reference database rows containing the INDXMATCH_$\alpha_n$ pattern may undergo additional filtering/matching operations or may be submitted to a manual indexer. In an embodiment, the frequency of an INDXMATCH_$\alpha_n$ pattern may be defined as $\rho/\Sigma\alpha_j$, where j is the number of rows in the reference database in which the pattern is searched. The probability of the match, $P_m$, may be defined as $1-(\rho/\Sigma\alpha_j)$. In an embodiment, the probability, $P_m$, may be associated with the document file, such as in a structured message file. In an embodiment, the probability that a randomly selected identifying indicia unrelated to the INDXMATCH_$\alpha_n$ would coincidentally share the observed pattern profile is the product of the individual match frequencies.

One skilled in the art will recognize that additional filtering/matching operations may be performed with the above described embodiments. For example, as discussed above matching/filtering the array of strings based upon capital letters, using strings within a proximity of identified strings, using sequences lists, using INDXMATCH pattern matching, and the like may be employed in combinations. Additional examples of filtering/matching operations include, but are not limited, to filtering by string size, filtering by dictionary/phrase list or lists, filtering by recently matched records, etc. One skilled in the art shall also recognize that steps performed above may be rearranged, excluded, or repeated. For example, in an embodiment, one or more anchor points may be selected strings in the array of strings that have matched something in the reference database. It should be noted that one benefit of using anchor points is to improve the searching/matching by introducing proximity weighting.

Consider, by way of illustration, the following example. An array of strings may be filtered to obtain strings that may correspond to a birth date. This set of strings may be searched against a comparison reference database. If a string or a plurality of strings matches data field elements in the comparison reference database, one or more of those strings may be used as anchor points to form a set of strings. In embodiments, other identifying indicia, such as name, account number, social security number, etc., are likely to be in proximity in the array of strings to the date of birth. In an embodiment, the set of strings obtained from proximity weighting may be used with INDXMATCH pattern matching or other filtering/matching algorithms.

Figure 16:
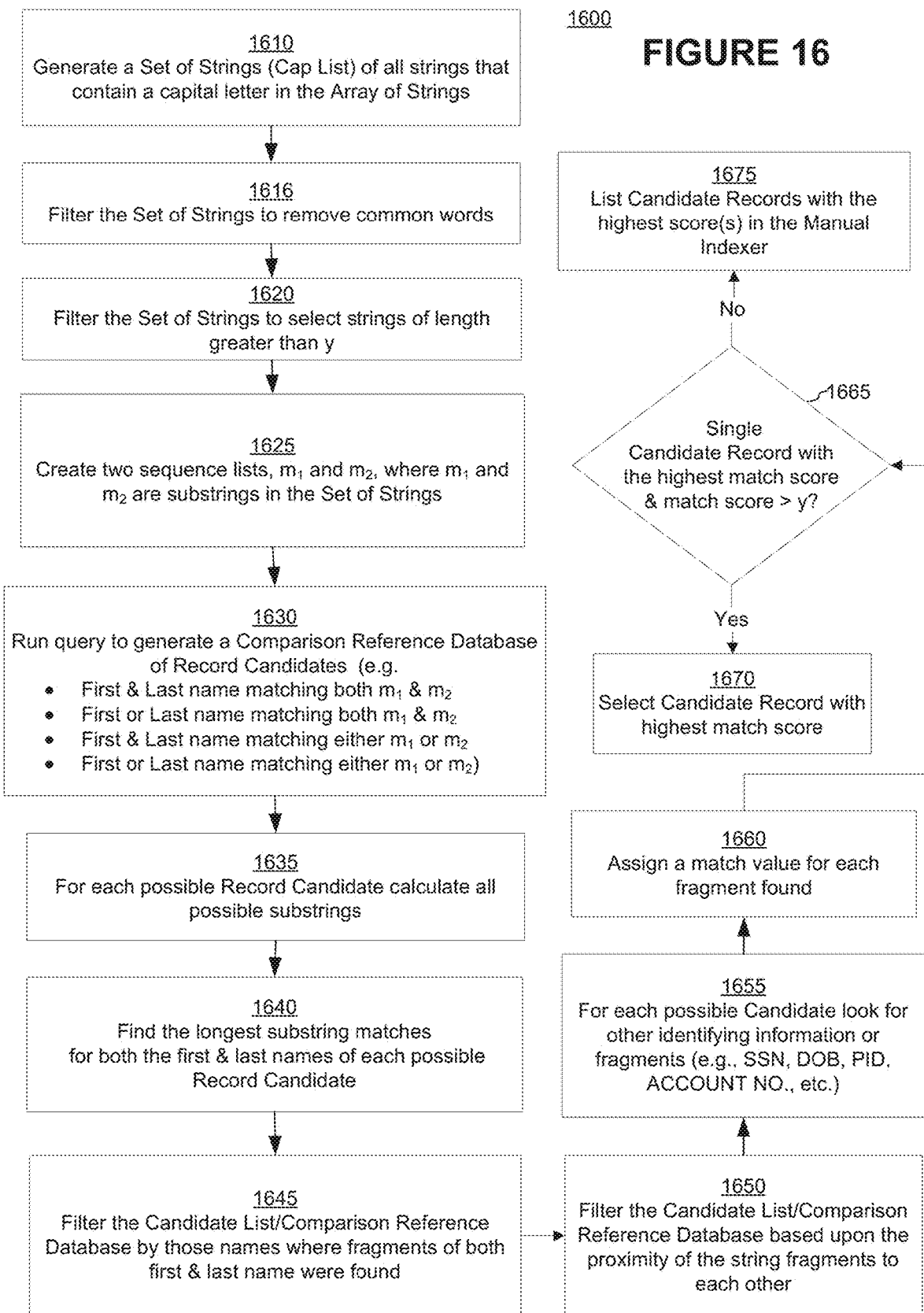
FIG. 16 depicts an alternative embodiment of a method for indexing a document file according to an embodiment of the present invention.

FIG. 16 depicts an alternative embodiment of a method for indexing a document file according to an embodiment of the present invention. In an embodiment, the array of strings obtained from the document file may be filtered (1610) to obtain all strings that included at least one capitalized letter. In an embodiment, additional filtering may be part of the filtering operation. As depicted in FIG. 16, the set of strings attain from the capital list filter may be filtered to remove (1615) common words, and may be filtered to select (1620) only strings that are greater than y characters in length.

In an embodiment, one or more sequence lists may be created. In the depicted embodiment, two sequence lists was may be populated, $m_1$ and $m_2$. The first sequence list, $m_1$, may be defined as a substring of length r starting at a first character position for each string in the set of strings obtained after the filtering operation, and the second sequence list, $m_2$, may be defined as a substring of length s that starts at a second character position. In an embodiment, the first and second character positions may be the same and the character lengths r and s may be the same. For purposes of illustration, assume that r=s=3 and that $m_1$ starts at character position 1 and $m_2$ starts a character position 2. The sequence lists for the string "test" would be $m_1$=tes and $m_2$=est. Returning to FIG. 16, in an embodiment, the reference database may be filtered to generate a comparison reference database of just first name and last name data fields. Matching may be performed between the set of strings comprising the sequence lists, $m_1$ and $m_2$, and the comparison reference database. In an embodiment, one or more Boolean operators may be used in the searching procedure. For example, Boolean searching may comprise searching (1630) for first and last name matching both $m_1$ and $m_2$; first or last name matching both $m_1$ and $m_2$; first and last name matching either $m_1$ or $m_2$; first or last name matching either $m_1$ or $m_2$; or any combination thereof. The results obtained from this search may be considered a comparison reference database comprising a list of potential matching candidates, and one skilled in the art will recognize this as a filtering operation. In an embodiment, for each candidate data field, all possible substrings may be calculated (1635), and starting with the longest fragment, the array of strings, or a filtered subset thereof, may be searched to find the longest fragment that matches. In an embodiment, one or more of the matching strings within the array of strings may become an anchor point for their matching candidates. In an embodiment, the comparison reference database comprising the candidate list may be filtered (1645) to those rows or records where fragments of both the first and last name were found in the array of strings or subset thereof. In an embodiment, the comparison reference database obtained from step 1645 may be filtered (1650) based upon the proximity of the string fragments to each other. For example, in an embodiment, a filter may select only those candidates from the comparison reference database wherein the first name fragment match and the last name fragment match are within a set number of positions within the array.

In an embodiment, each candidate within the comparison reference database obtained from step 1650 may be compared against the array of strings or a portion thereof (such as a set of strings obtained from one or more of the filtering steps 1610-1620) to look (1655) for other matching strings of identifying indicia. In an embodiment, a match value or score may be assigned (1660) to each string from a record found within the array of strings or portion thereof. In embodiments, the match value may be the same value per match (e.g., each match regardless of what is matched receives the same value) or may be different values (e.g., longer string matches or matches to certain data fields may have higher point values). In an embodiment, one point may be assigned (1660) to each string or substring from a record found within the array of strings or portion thereof. In an embodiment, if a single record has the highest match score and that score exceeds (1665) a threshold match value z, that record may be selected (1670) as the matching record and the document file may be associated with that record. If more than one record has yielded the highest match score or if the highest scoring record does not have a match score that exceeds a threshold match value z, then in an embodiment, the candidates with the highest score(s) may be listed in a manual indexer. In an embodiment, these candidates may be ranked according to their match scores and displayed with the ranks or in ranking order. In an embodiment, the matching string or string fragments for each of these candidates may also be displayed as part of the manual indexing process. One skilled in the art shall recognize that embodiments the methods presented above may end if, following a filtering/matching step, one candidate is returned.

One skilled in the art shall recognize the assignment of match values may be applied to any matching task or operation, including without limitation, document type, service provider, service recipient, recording events, observations, or other indexing tasks not specifically listed.

Consider the following exemplary embodiments of methods for matching a document file with a record or records. For purpose of illustration, assume that the document file is an image that has undergone an extraction process to yield the following array of strings:

TABLE 1

SAMPLE ARRAY OF STRINGS

Acme Women's Medical Associates, Inc Board Certified Specialists
in Women's Fiealth Care John J. Doe, MD, PhD, FACOG
Michael D. Gelring, MD, FACOG Jane Smith, RN, CNM
111 N. Crestwood PO Box 2222 Porterville, CA 93258 559 555 5555
Fax: 559 555 6666
May 11, 2006 Page 1
Patient Information
For: Dreda J Schmidlkobbler DOB: 0 911 511 94 0 Account #: 6463
Patient Consent for Use and Disclosure o Health Information
I Dreda J Schmidlkobbler hereby give my consent for Acme Womens
edical Associates, Inc to use and disclose protected health information
about me to carry out treatment, pyment, and health care operations.

In an embodiment, a filtering operation may be performed upon the array of strings to obtain a filtered set of strings. In an embodiment, the filtering operation may comprise one or more filters. An example of a filter may be a client/indexing recipient address filter that searches for and removes, if present, the address of the indexing recipient. For example, if the client were Acme Women's Medical Association with an address of 111 N. Crestwood, PO Box 222, Porterville, Calif. 93258, the filter may look for these strings. In an embodiment, variants the client's address and contact information may also be included.

Another example of a filter may be a size filter that removes all strings that do not exceed a set number of characters in length y. For example, if y=4, all strings with three or fewer characters may be filtered out of the set of strings, such as, for example, Inc, in, MD, PhD, DO, RN, CNM, for, Use, and, o, #:, I, J, my, and so forth.

Another example of a filter may be an exclusion list filter comprised of strings to be excluded, which may include general words and/or client specific words. For example, client employee names, such as John J. Doe and Jane Smith may be excluded from the array of strings.

Yet another example of a filter may be a dictionary filter comprised of strings to be excluded, which may include general words and/or client specific words. Examples of words that may be excluded from the above array of strings may include such word as Board, Certified, Specialists, Women's, Patient, Information, hereby, give, consent, disclose, protected, health, information, about and the like.

Another example of a filter may be a duplication filter, in which duplicate strings may be removed.

In an embodiment, after the filtering operation, the resulting set of strings filtered from the array of strings may be that listed in Table 2.

TABLE 2

| SET OF STRINGS |
| --- |
| Fiealth |
| 2006 |
| 6463 |
| Michael |
| Gelring |
| FACOG |
| Dreda |
| Schmidlkobbler |
| edical |
| yment |

In an embodiment, one or more sequence lists for each of the strings from the set of strings that contain a capital letter may be generated. For illustration purposes, assume each string with a capital letter (e.g., Michael, Gelring, Dreda, and Schmidlkobbler) has two sequences created, $m_1$ and $m_2$, where $m_1$=the first three characters of the string and $m_2$=the three character of the string starting at the second character in the string. Thus, the resulting sequences would be:

$m_1$=FIE, MIC, GEL, FAC, DRE, and SCH
$m_2$=IEA, ICH, ELR, ACO, RED, and CHM

In an embodiment, relational pairs may be generated based upon proximity to each other in the set of strings. Table 3 shows relational pairs for the illustrated example:

TABLE 3

| RELATIONAL PAIRS | | |
| --- | --- | --- |
| | $m_1$ | $m_2$ |
| r1 | FIE, MIC | IEA, ICH |
| r2 | MIC, GEL | ICH, ELR |
| r3 | GEL, FAC | ELR, ACO |
| r4 | FAC, DRE | ACO, RED |
| r5 | DRE, SCH | RED, CHM |

In an embodiment, the set of strings in Table 3 may be compared against a comparison reference database trying to find records in the comparison reference database where the first name and last name data field elements match both $m_1$, $r_x$ and $m_2$, $r_x$. For purposes of illustration, assume the records from the comparison reference database that satisfy the above-stated conditions are:

TABLE 4

| QUERY RESULTS | | | | | | |
| --- | --- | --- | --- | --- | --- | --- |
| PID | DOB | EXT ID | SSN | FIRST NAME | M. NAME | LAST NAME |
| 108130 | Dec. 27, 1968 | 2162 | ABC-11-9999 | DREDRAM | K | SCHMIDT |
| 285050 | Sep. 15, 1940 | 6463 | DEF-00-8888 | DREDA | J | SCHMIDLKOBBLER |

In an embodiment, the comparison reference database in Table 4 may be further reduced by taking the FIRST NAME and/or LAST NAME data file elements for each of the candidate records and creating a string fragment table. For example, the substring fragment list for DREDRAM may comprise: DREDRAM, DREDRA, REDRAM, EDRAM, EDRA, DRAM, DRE, RAM, and EDR; and the substring fragment list for DREDA may comprise: DREDA, DRED, REDA, DRE, RED, and EDA. It shall be noted that the size of the substring may be varied.

In an embodiment, starting with the longest fragment, the set of strings, which represents a filtered portion of the array of strings, may be searched to find the longest fragment present in the set of strings that matches this fragment. In an embodiment, a matched string within the set of strings may become an anchor point for this record candidate, and a search may be performed for the longest FIRST NAME and/or LAST NAME substring within p string positions of the anchor point. In one embodiment, p may equal 2.

In an embodiment, if no match exists, this anchor point may be ignored and a search may be performed to find a new anchor point, wherein the process of searching the strings surrounding the anchor point is repeated.

In an embodiment, if a match for a substring exists for both FIRST NAME and LAST NAME, then a match score of 2 points may be assigned to that record.

In an embodiment, an INDXMATCH pattern comprising the matching sequences $MATCH_1$, $MATCH_2$, ..., and $MATCH\varphi_n$, for a record may be generated, where a substring match is $MATCH\varphi_n$. In the illustrated example, $INDXMATCH_2$ is Dreda Schmidlkobbler or Schmidlkobbler, Dreda and $INDXMATCH_1$ is Dredram, Schmidt.

In an embodiment, let the number of instances (i.e., frequency) of $INDXMATCH_n$ in the comparison reference database equal $\rho_n$. If a values or values of $\rho_n=1$, then the records with the INDXMATCH patterns that produced that frequency may be associated or matched with the document file.

In an embodiment, if the records' INDXMATCH patterns generate frequency values $\rho_n>1$, then it may be considered inconclusive whether such a record matches. In an embodiment, some or all of these records may form a comparison reference database and additional criteria or operations may be used to reduce the number of record candidates. In an embodiment, a document file may be associated with more than one record.

In an embodiment, the proximity of search strings surrounding anchor points may be increased or iteratively increased. For example, searches may be performed for the longest FIRST NAME and/or LAST NAME substring within 15 string positions of an anchor point. If no match exists, the candidate records from the comparison database may be sent to a manual indexer as suggestion from which a user may select.

In an embodiment, if additional match sequences are identified, an additional point may be assigned to a record for each such additional match sequence, wherein the points may be used to match a record to a document file and/or to rank the records. In one embodiment, let the number of match sequences that comprises INDXMATCH be $\varphi$, where $\varphi=1, 2, 3, \ldots,$ or z. The candidate record with the highest $\varphi$ value may be matched with the document file.

Figure 17:
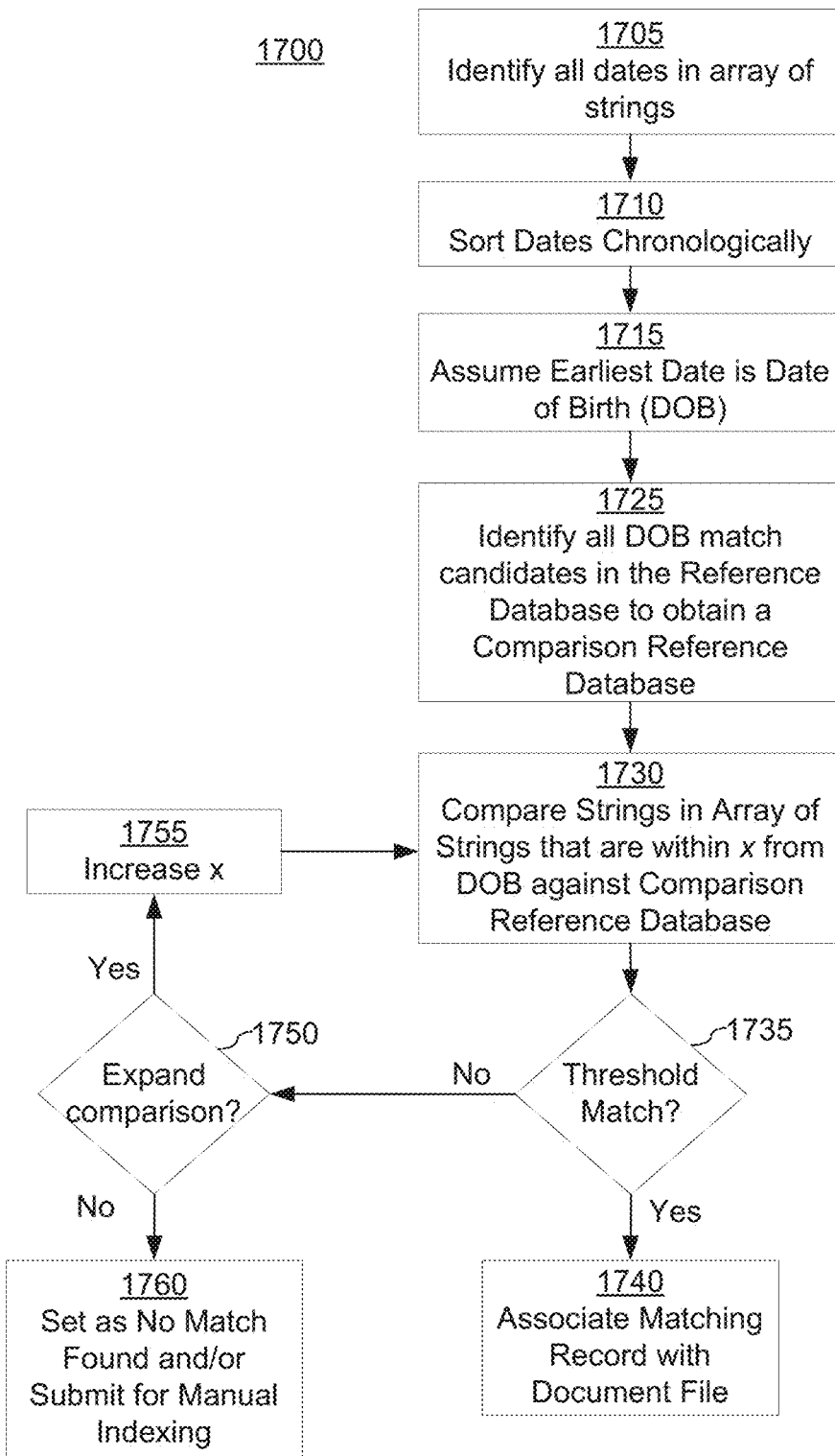
FIG. 17 depicts an alternative embodiment of a method for indexing a document file according to an embodiment of the present invention.

Turning to FIG. 17, an alternative embodiment of a method for indexing a document file according to an embodiment of the present invention is depicted. In the embodiment depicted in FIG. 17, the reference database may be filtered using dates obtained from the array of strings. The array of strings may be searched to identify (1705) all strings or sets of strings that may conform to a date format, and these may be sorted (1710) chronologically. The earliest date may be assumed (1715) to be the date of birth of a patient, and that date may be compared against the date of birth fields to identify (1725) all candidate records that have the same date of birth. In embodiments, if the date field for a record is empty, that record may be included or excluded as a candidate record. The resulting candidate records form a comparison reference database. In an embodiment, if a single candidate record is returned, the document file may be associated with that record.

As depicted in FIG. 17, the string in the array of strings that is assumed to be the date of birth may form an anchor point. Strings within x places from the anchor point may be searched (1730) against the comparison reference database. If a threshold match is found (1735), that record may be associated (1740) with the document file. As noted previously, a document file may be associated with a record by storing information to a structured message.

If a threshold match is not found (1735), the proximity filter may be expanded (1750). If the proximity filter is expanded (1755), the newly added strings may be compared against the comparison reference database. This process may be repeated until a match is found, a set number of times, until all the strings and the array of strings have been included, and/or until a user indicates to stop.

If, after the above steps, a threshold match has not been exceeded, it may be recorded (1760) that no match was found. In an embodiment, the candidate records may be submitted to a manual indexer.

Figure 18:
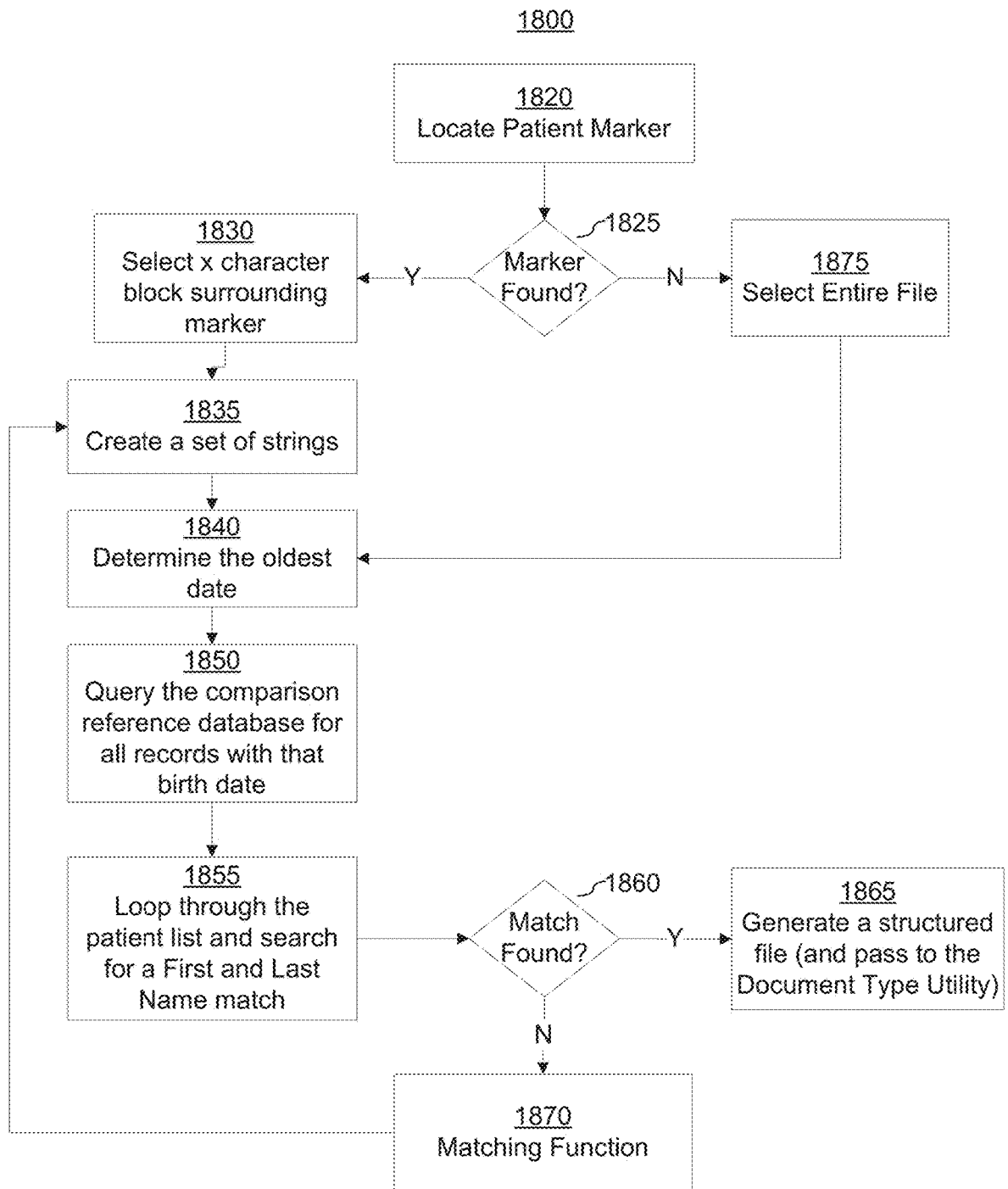
FIG. 18 depicts an alternative embodiment of a method for indexing a document file according to an embodiment of the present invention.

Turning to FIG. 18, an alternative embodiment of a method for indexing a document file according to an embodiment of the present invention is depicted. In the embodiment depicted in FIG. 18, a record data field element or elements, such as a patient identifier, may be used to filter a document file. One or more record data elements, such as patient name, account number, social security number, date of birth, etc. may be used to search the array of strings of a document file, or a set of strings obtained from the array of strings, to locate (1820) a matching marker/identifying indicia. If a marker is found (1825), the marker may be used as an anchor point. In an embodiment, a set number of strings may be selected surrounding the anchor point. In an alternative embodiment, a set number of characters surrounding the marker may be selected (1830), and those characters may be placed into a set of strings (1835).

In an embodiment, the array of strings or the set of strings may be searched to obtain (1840) the oldest date, which may be assumed to be a birth date. The comparison reference database may be queried to obtain (1850) a listing of all records in which a person has a matching birth date, which may form a new comparison reference database. One or more data fields from this comparison reference database, such as first and last name (1855), maybe checked against the set of strings. If a match is found (1860), the document file may be associated with the matching record. In an embodiment, the document file may be associated with the matching record by storing (1865) information in a structured message. If more than one match was found or if no matches were found, one or more additional matching/ filtering operations may be performed. In one embodiment, an matching algorithm or method, such is the one described with reference to FIG. 16, may be employed (1870) and the results returned to generate a set of strings (1835) wherein the method may be repeated.

In an embodiment, if an initial marker is not located within the array of strings, the entire array of strings may be selected (1875) and the process may continue from step 1840 in like manner as described above.

Figure 19:
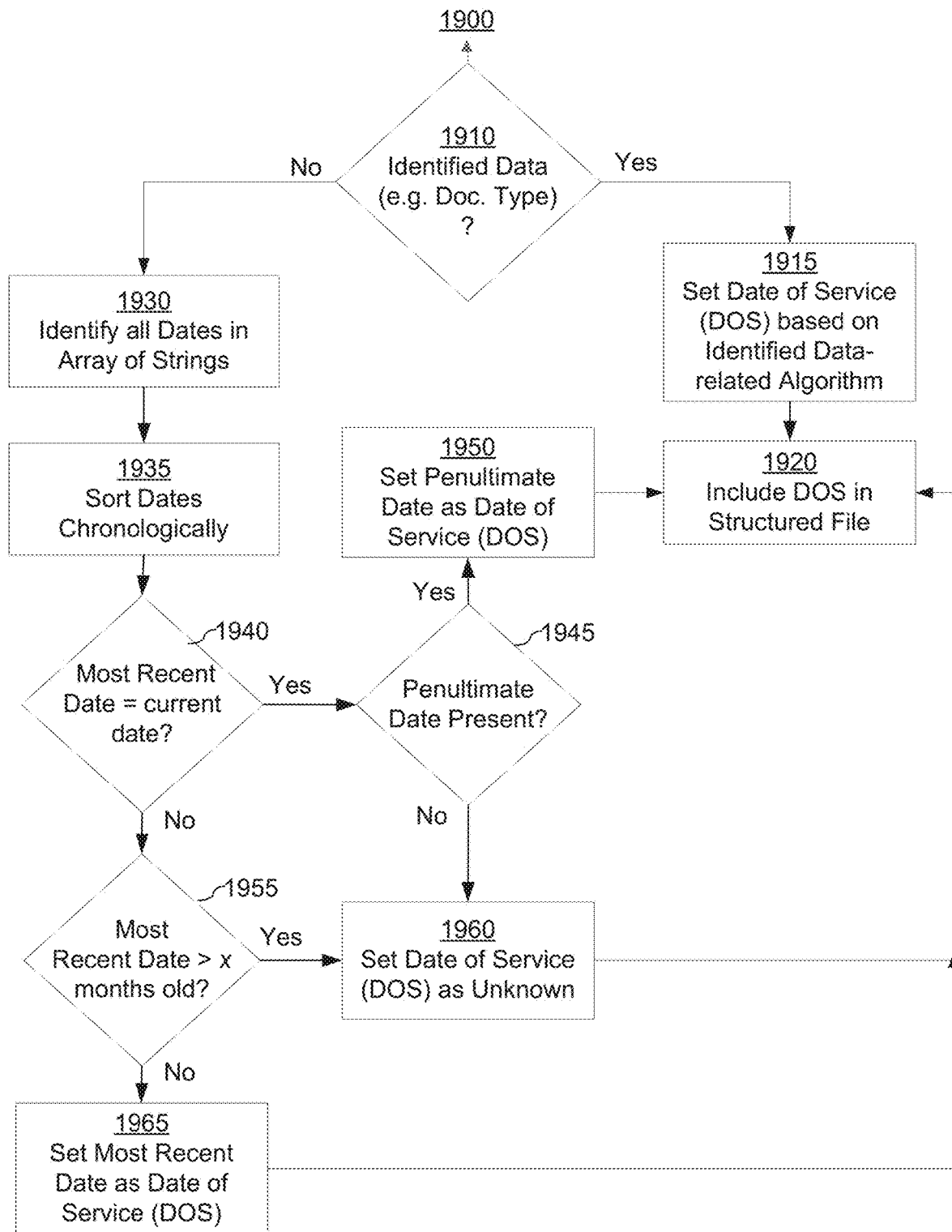
FIG. 19 depicts an exemplary method for determining a date of service of a document file according to an embodiment of the present invention.

FIG. 19 depicts an exemplary method for determining a date of service of a document file according to an embodiment of the present invention. An embodiment of the date of service utility may begin by searching (1910) the array of strings, or a filtered version thereof, to identify specific data. In an embodiment, a dictionary list may be used to search for specific words. For example, a list of document types may be compared against the strings.

Figure 20:
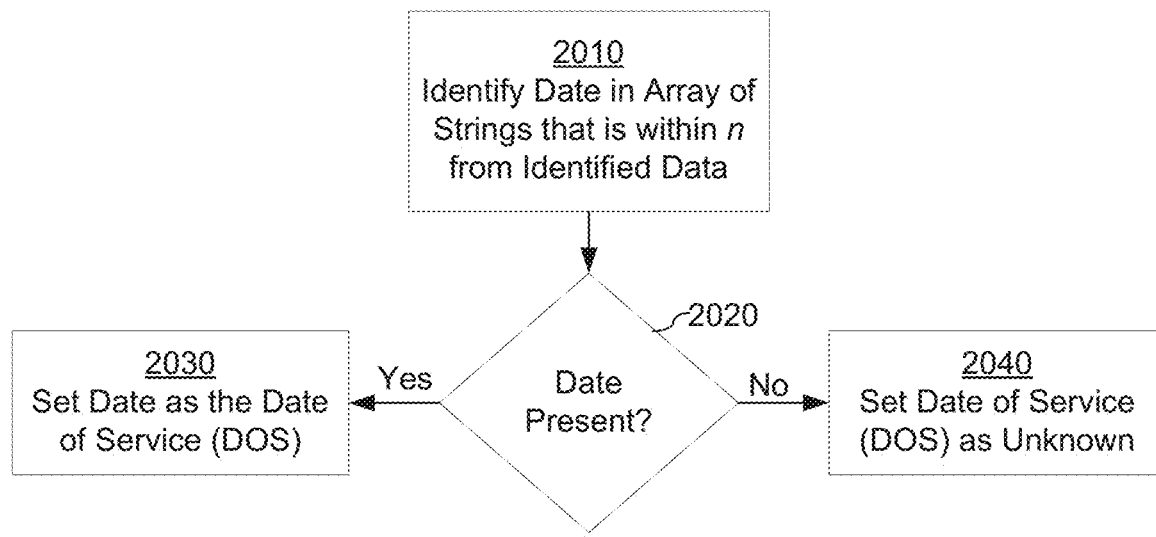
FIG. 20 depicts an embodiment of a method for determining a date of service for a document file according to an embodiment of the present invention.

If identified data is found, a date of service may be found (1915) based on a specific algorithm related to that identified data. Consider, for example, the exemplary embodiment depicted in FIG. 20. The identified data may help indicate where the information may be located within the document file. For example, if the phrase "pathology lab report" is found within the array of strings, it may be known that the date of service will be within a set distance (2010) from that phrase. Accordingly, the data service may be easily identified. In such cases, the date of service information may be associated (1920/2030) with the document file. In an alternative embodiment, the date of service algorithm may look for a date relative to the dates within the report. Consider for example the following example—assume that the report type is known and it is known that that report type contains three date fields: a birth date of a patient, a date service, and the date the report was submitted to a client. The date-of-service algorithm may be identified by finding the three dates within the set of strings and locating the middle date since it will be after the birth date but before the date the report was submitted to the indexing recipient system.

In one embodiment, the date of service information may be stored in a structured message for the document file. One skilled in the art shall recognize that other algorithms may be used to determine information once another piece of identifying data has been found.

Returning to FIG. 19, if no data has been identified within the array of strings that is beneficial for identifying the date of service, the array of strings may be searched (1930) to identify all strings corresponding to a date format. The selected dates may be sorted (1935) chronologically, and a check (1940) made to see if the most recent date is the current date. If the most recent date is the current date, it may be that the date found is referencing the date the document file was submitted. Thus, in an embodiment, if a penultimate date is present (1945), that date may be set (1950) as the date of service and associated (1920) with the document file as discussed previously.

If the most recent date is not the current date (1940), then a check may be performed (1955) to determine whether that date is greater a set time interval old. In an embodiment, it may be assumed that a document file has been received because of some recent activity; therefore, if a recent date appears within the array of strings and that date is relatively recent, then that date may be set (1965) as the data service and associated (1920) with the document file, as discussed previously.

If the most recent date is not the current date (1940) and the most recent date is greater than a set amount of time old, the date of service may be set (1960) as "Unknown" and that information may be associated (1920) with the document file. In an embodiment, if no date strings were located within the array of strings, the date of service may similarly be set as "Unknown." In one embodiment, date candidates may be sent to the manual indexer as match information comprising date suggestions.

Figure 21:
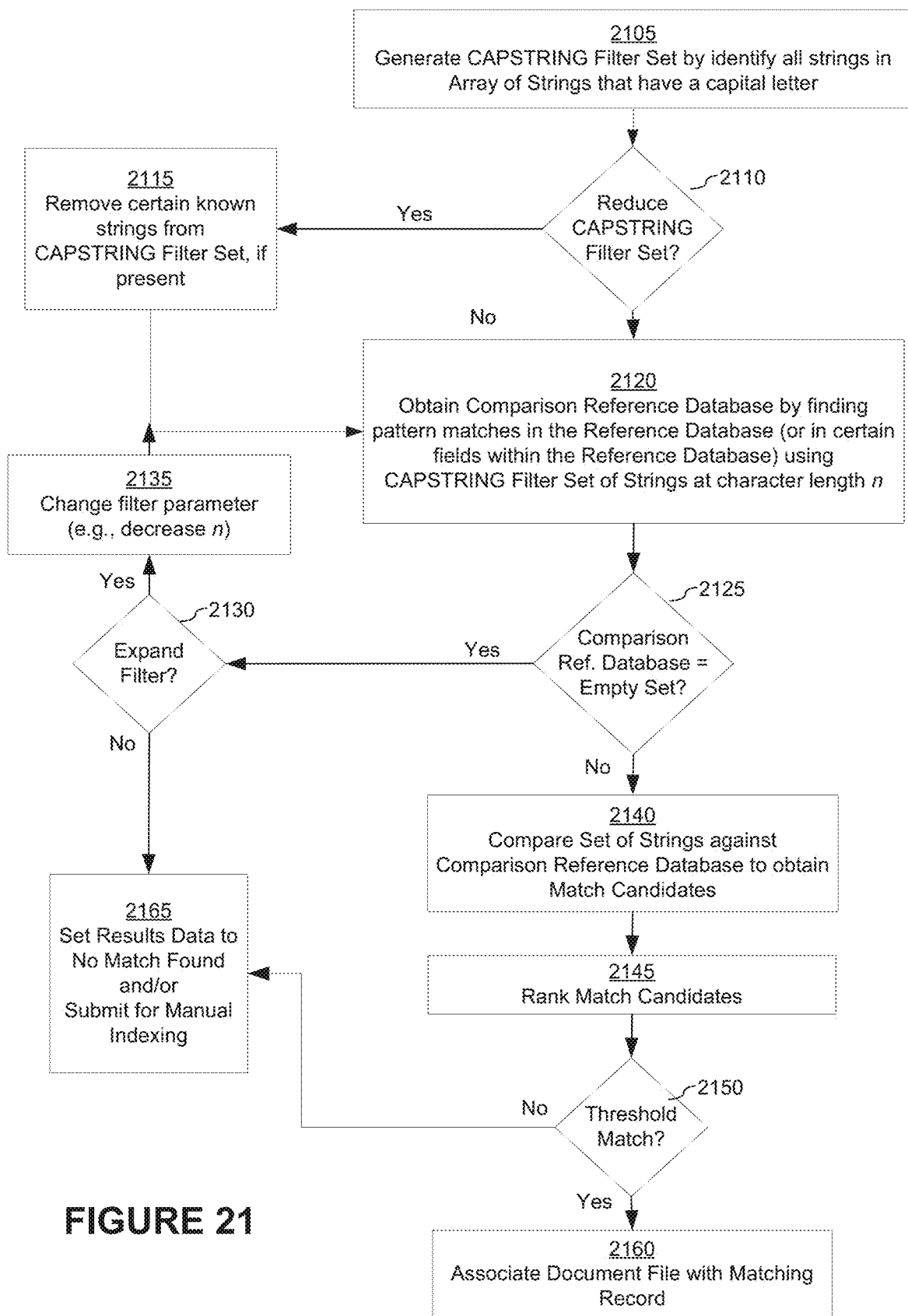
FIG. 21 depicts an alternative embodiment of a method for indexing a document file according to an embodiment of the present invention.

Turning to FIG. 21, an embodiment of a method for indexing a document file is depicted. The method begins by generating (2105) a filtered set of the array of strings by selecting every string that has at least one capital letter, CAPSTRING. In an embodiment, this set of strings may optionally be further reduced (2110). In one embodiment, additional filtering may be performed to the set of strings by removing (2115) any strings from the set of strings that match strings in a list of strings, such as a dictionary list, client address/contact information list, or the like. One skilled and the art will recognize that other filtering steps may be performed as part of this initial filtering operation.

The set of strings obtained from the filtering operation may be used to find pattern matches in the reference database, or in certain fields within the reference database, such as, for example, first name, last name, and the like. In an embodiment, substrings from the set of strings may be used to find matches within the reference database. For example, substrings n characters in length may be used. The records that results in a match from the comparison (2120) may be considered a comparison reference database.

In an embodiment, if the pattern match process returns no record (i.e., the comparison reference database is the empty set), the filtering operation used to obtain the comparison reference database may be expanded (2130). If it is desired to change the filtering, one or more filtering parameters may be changed (2135). For example, the size of the substrings, n, may be decreased to obtain smaller substrings sizes, and the process may be repeated of comparing the substrings to the reference database to obtain a comparison reference database. If expanding the filter is not desired (2130), it may be indicated (2165) that no record match was found for the document file. In an embodiment, the document file may be sent to a manual indexer for manual indexing of the document file.

If the comparison reference database is not the empty set, the array of strings, or a filtered array of strings such as the set of strings from step 2105, may be compared (2140) against the comparison reference database to identify additional matches. The records within the comparison reference database that yielded matches may be ranked (2145) according to ranking criteria. In an embodiment of ranking criteria may be based on the number of matches within the record and may include weighting the ranks based upon which fields within the record were matched. If a record exceeds (2150) a threshold matched level, the document file may be associated (2160) with the matching record. In an embodiment, the file may be associated with the record by storing information to a structured message file, which may include the information that was matched.

If no record exceeds a threshold match, the records with at least one match, or alternatively, only the top ranked records, may be sent (2165) to a manual indexer for manual indexing by a user. There may also be an indication (2165) that no record match was found for the document file. In an embodiment, the indication that no record match was found may be stored in a structured message for the document file.

Figure 22:
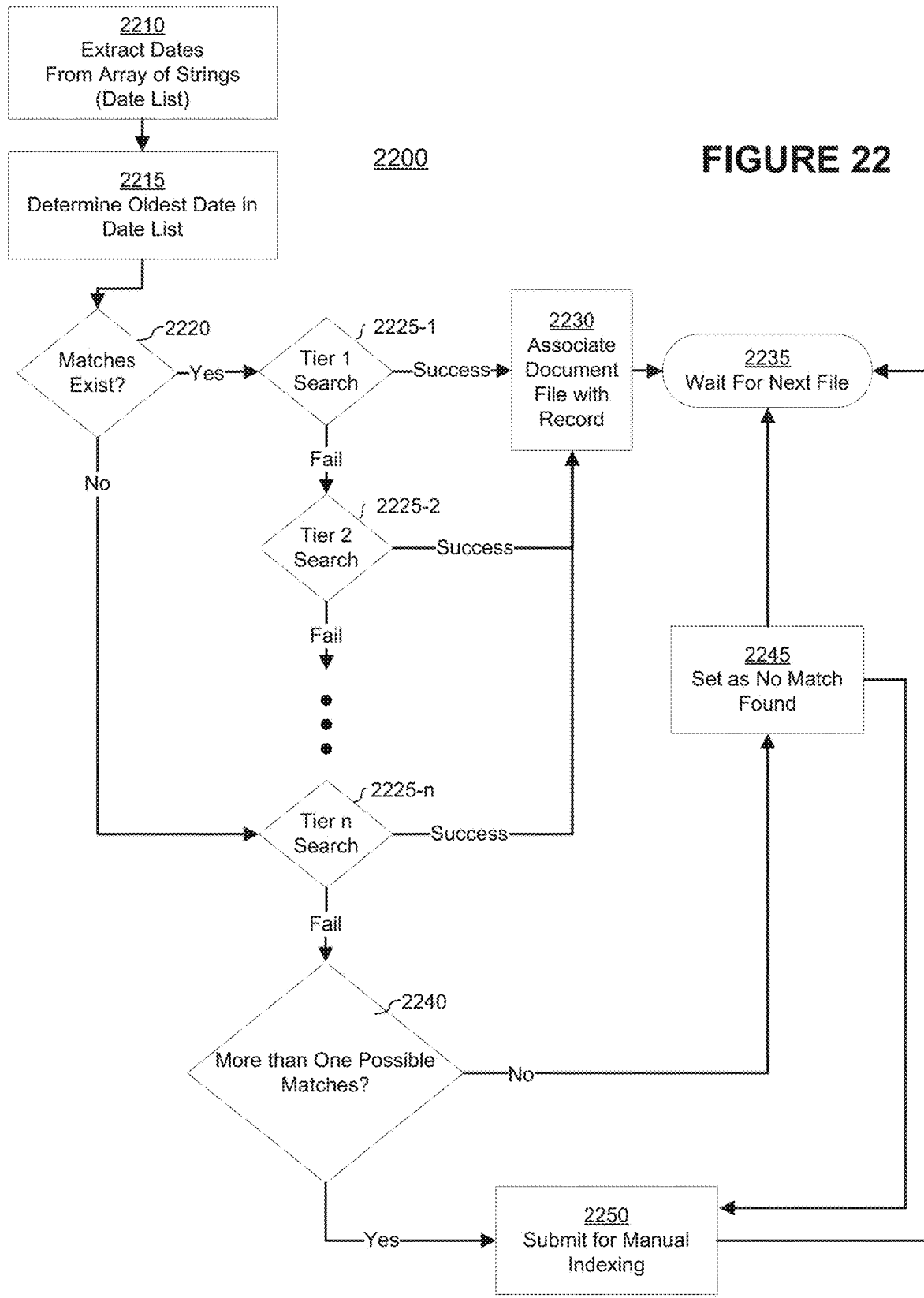
FIG. 22 depicts an alternative embodiment of a method for indexing a document file according to an embodiment of the present invention.

FIG. 22 depicts an alternative embodiment of a method for indexing a document file according to an embodiment of the present invention. In the embodiment depicted in FIG. 22, the array of strings may initially be filtered to extract (2210) strings conforming to a date format in determining (2215) the oldest date.

Assuming the oldest date corresponds to a birth date, that date may be compared against the date of birth field in a reference database. The comparison reference database obtained from this operation may contain one or more records. To provide additional assurance that a record is the correct match or to further reduce the comparison reference database, one or more matching/filtering operations 2225-1-2225-$n$ may be performed. In an embodiment, the matching/filtering operations may be tiered.

For purposes of illustration, consider the following tiered search embodiment. The search may begin by selecting the first name and last name from the date-of-birth filtered comparison reference database to look for those strings within 3 strings of each other (proximity value) in the array of strings. In an embodiment, the date of birth string may be used as an anchor point for reducing the array of strings. In an embodiment, the degree of match, herein referred to as fuzziness or the threshold match value, may be set to a specific value. In an embodiment, the fuzziness value may be set at a value that requires a close match.

A second tier matching/filtering operation may comprise the following matching/filtering process. If the comparison reference database comprises candidate records with matching date of birth but no matches were found during the first name and last name search, then in an embodiment, the threshold match value may be adjusted to allow for less exact matching and/or the proximity value may be increased.

A third tier matching/filtering operation may comprise the following matching/filtering process. Additional fields from records within the comparison reference database may be utilized. In an embodiment, account number, patient ID, social security number, and the like may be used in the matching/filtering. In an embodiment, the fuzziness/threshold match value may be set to require a close match.

A fourth tier matching/filtering operation may comprise searching for first name and/or last name within a proximate range of one or more of the foregoing identifiers, i.e., account number, patient ID, social security number, and the like.

An embodiment of a last tier matching/filtering operation may comprise the following. First, a capital list string filter may be applied to reduce the array of strings to a set of strings that comprise at least one capital letter in each string. The reference database may be filtered by identifying all candidate records that have the first three letters of the first name and the last name and the second three letters of the first name and the last name. In an embodiment, the comparison reference database may be reduced further by excluding all records that have not had any activity with a set number of dates, for example, 45 days.

If no record has a match that exceeds a threshold value, a search may be performed to identify all candidate records that have the first three letters of the first name and the last name or the second three letters of the first name and the last name. In an embodiment, the comparison reference database may be reduced further by excluding all records that have not had any activity with a set number of dates, for example, 45 days.

If a record is found to exceed a threshold match, the document file may be associated (2230) with that record, and the system may wait (2235) for the next document file or array of strings from a document file to be received for processing.

If, following the matching/filtering operations, the document file has not been successfully matched to a record, the final comparison reference database obtained from the matching/filtering operations may be examined (2240) to determine the number of records contained therein. If more than one record is a matching candidate, this information may be sent (2240) to a manual indexer for manual indexing by a user. If no records exist within the comparison reference database, it may be indicated (2245) that no record match was found. In an embodiment, the document file may be sent (2240) to a manual indexer for manual indexing. Alternatively, the document file may be put into a queue and may be reprocessed at a later date or following a specified event, such as for example, receiving an update to the reference database.

One skilled in the art shall recognize that filters/matching algorithms may be used in any orders, in any combination for any matching or tiering. In an embodiment, the application of a filtering operation or operations may be directed by processing times and/or match results. Filters may be applied to an unmatched array of strings or to a comparison reference database (which shall be construed to also include the reference database or a previously filtered comparison reference database). Examples of filters have been given herein and some are additionally given below, although one skilled in the art shall realize that other filters/matching algorithms not listed here may also be used.

Date of Service (DOS) Filter. The comparison reference database may be reduced by applying a DOS filter so that only candidates with activity (e.g. have been seen by a doctor) within or after a certain time period are used for matching algorithm(s).

Date of Indexing (DOI) Filter. The comparison reference database may be reduced by applying a DOI filter so that only candidates with activity (e.g. have been recently indexed) within or after a certain time period are used for matching algorithm(s).

INDXMATCH Filter. The comparison reference database may be reduced by applying a filter so that only candidates derived from the reference database that meet pattern matching criteria are used for matching algorithm(s). In an embodiment, the pattern match filter may be derived from the array of strings by identifying string candidates of n length, considered as the longest common substring.

Boolean Filter. The comparison reference database may be reduced by applying a Boolean filter so that only candidates derived from the array of strings that meet Boolean criteria (AND/OR) are used for matching algorithm(s). In embodiment, the complexity of the search criteria may be varied to include proximity searching, root expansion, wild card searching, conditional operators, string frequencies, string associations, match profiles, and the like, as well as Boolean operators.

CAPS Filter. The comparison reference database may be reduced by applying a set of strings that have been derived from the array of strings and wherein the strings in the set of strings have at least on capital letter. By applying such a filter, only reference database records that meet capital letter pattern matching criteria are used for matching algorithm(s).

Subtraction Filter. The comparison reference database or array of strings/set of strings may be reduced by applying a subtraction filter derived from the array of strings or from other source(s). An example of a subtraction filter may be removing common words from the array of strings. Another illustrative example may be attempting to process an array of strings from a document file that has multiple patient names. Once a patient name is identified, the identifiers for that patient (which may come from the matching record for that patient) may be subtracted from the array of strings and the array of strings may be reprocessed to look for other patients.

Fuzziness Filter. As noted previously, the threshold level of match identity may be varied. In an embodiment, a fuzziness of 1 may be an exact match, where a fuzziness of 10 may be a weak match. Adjusting the fuzziness can allow one to identify sequence candidates while allowing for the causes of mismatch, such as OCR error, misspellings, etc.

It shall be noted that filtering/matching algorithms may be adjusted based on match quality. One skilled in the art shall recognize that a number of matching/filtering operations may be performed as part of the embodiment depicted in FIG. 22, including without limitation all those described herein. It shall also be noted that the embodiment depicted in FIG. 22 is for purpose of illustration and that embodiments may be employed.

Figure 23:
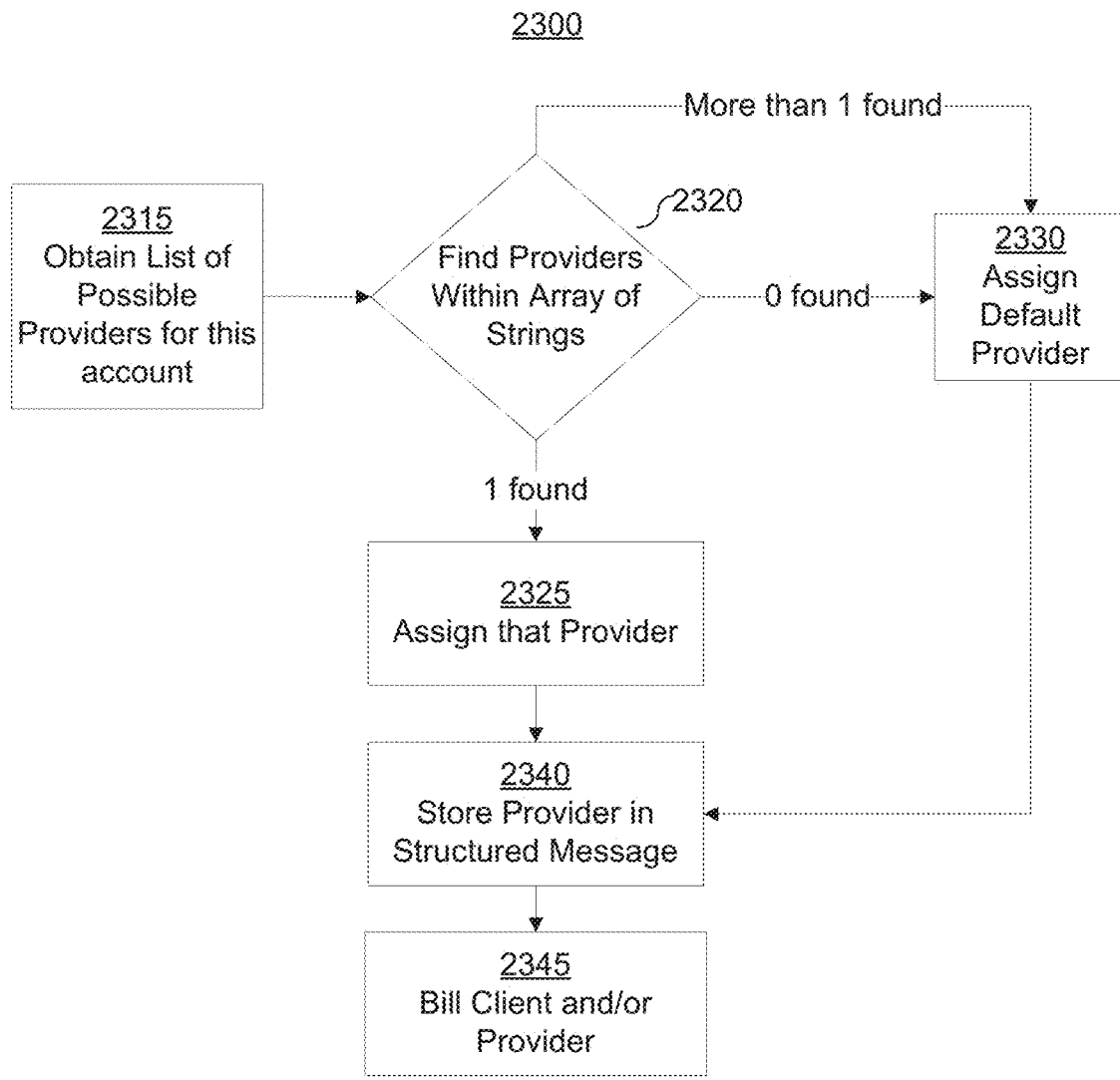
FIG. 23 depicts an exemplary method for determining a provider associated with a document file according to an embodiment of the present invention.

FIG. 23 depicts an exemplary method for determining a provider associated with a document file according to an embodiment of the present invention. The array of strings obtained from a document file may be searched to identify a provider. A provider may mean a recipient of the document file, an author of the document file, a patient, a subject of a document file, the owner of the document file, the user of a document file, and the like. In an embodiment, because the account information for the document file is known; that is, the indexing recipient information or account is known, a list of possible providers for this account may be accessed (2315). That list may be compared against the array of strings to identify (2320) providers.

In an embodiment, a provider may be determined based upon an association rather than from finding a direct match in the array of strings. In one embodiment, the list of providers may comprise more than just a listing of providers, but may also include associations with providers. For example, the list of providers may include key words or matching that, when found, results in an association with a provider. In an embodiment, the provider may be associated with a document file based upon the document file being matched to a record in a reference database. For example, the provider may be associated with a record in a reference database and this information may be associated with the document file when the document file is matched to the record. In an embodiment, a provider may be associated with a document file based upon information provided within a record in the reference database to which the document file has been matched.

If no providers or more than one provider is identified within the array of strings, a default provider for that account may be assigned (2330). If one provider is found, that provider may be assigned or associated (2325) with that document file. In an embodiment, the provider information may be associated with a document file by storing the provider data into a structured message for that document file. In an embodiment, the client or indexing recipient or the provider identified may be billed. For example, if the document file is lab results and a provider that performed the lab testing has been identified, and the patient for which this testing has been performed has also been matched within the database, one embodiment of the present invention may involve billing the patient for the services provided by the laboratory. In an embodiment, the indexing recipient may be billed for services provided by the indexing service provider.

Figure 24:
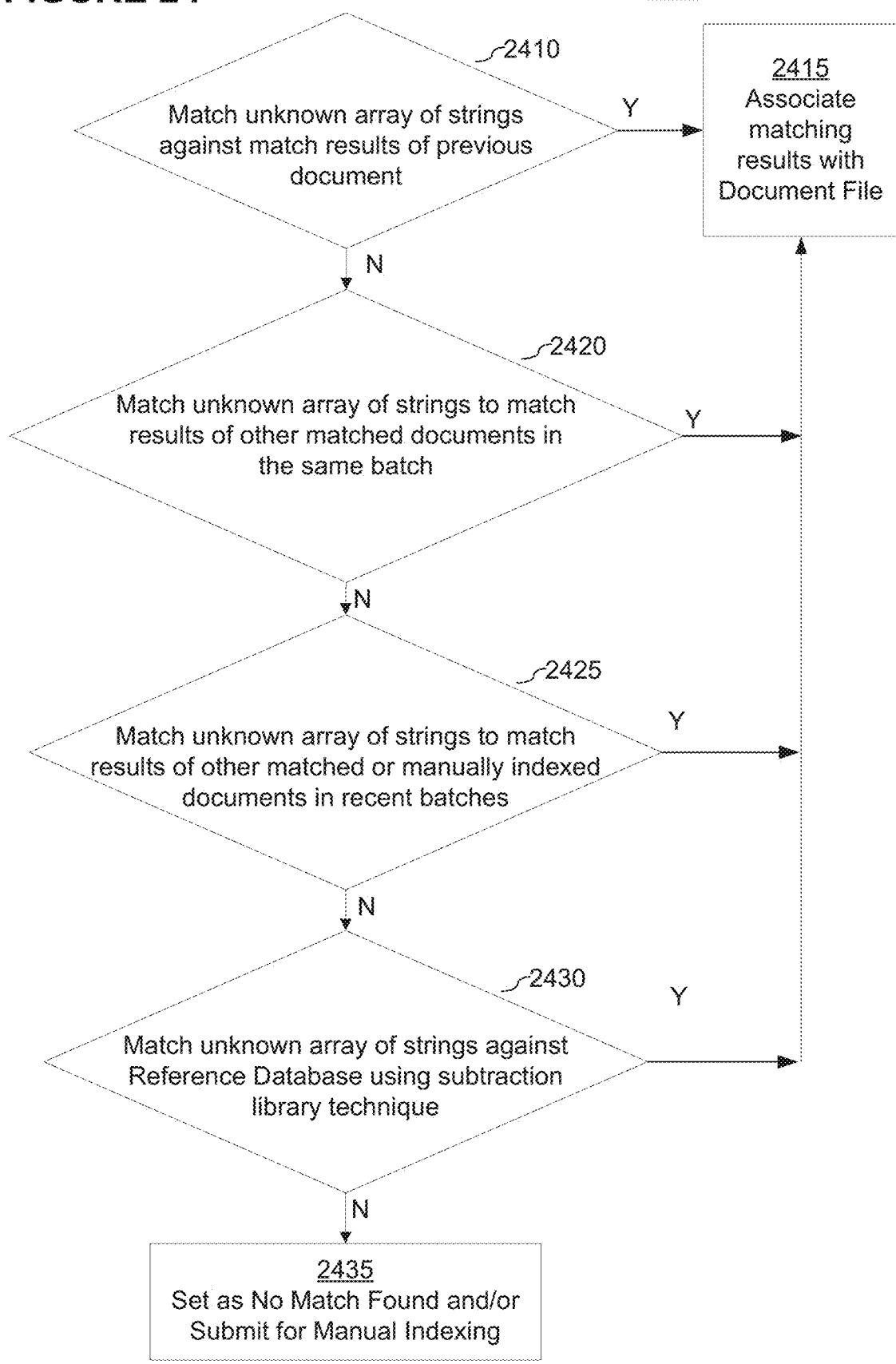
FIG. 24 depicts an exemplary method for indexing a document file according to an embodiment of the present invention.

Turning to FIG. 24, an exemplary method for indexing a document file according to an embodiment of the present invention is illustrated. In an embodiment, unmatched document file may be compared (2410) against the match results of the previously document in the batch. In an embodiment, a comparison reference database may comprise the records which have been successfully matched to other document files within a batch. An array of strings for a non-indexed/unmatched document file may be compared (2420) against this comparison reference database. In an embodiment, the comparison reference database may also include records that were manually indexed. The array of strings may also be compared (2425) against the results of other matched or manually index documents from the same or recent batches. In an embodiment, the unmatched document file may be compared (2430) against a comparison reference database using one are more subtraction library techniques.

If any of the foregoing comparison methods successfully identify matching information, this matching information may be associated (2415) with the document file. If the foregoing matching techniques were unable to identify a matching record, the document file may be indicated (2435) as having no match and may be sent to a manual indexer for indexing by a user.

Exemplary Embodiments of Additional Data

In an embodiment, additional data may be related to or associated with a document file. In an embodiment, this additional data may include additional text, such as one or more standard or predefined paragraphs. In an embodiment, the additional data may include, but is not limited to, predefined text, predefined video, web sites information, photographs, pictures or other images, letterhead, stationery, links to any of these items, pointer to the document file's location, a link to the document file, or the like. In an embodiment, the additional data may include the information contained within a reference database or databases. The additional data may also include, but is not limited to, corrected identifying indicia such as name, date of birth, social security number or the like. The additional data may also include, but is not limited to, structured data, array of strings/set of strings, document identifying indicia such as document type, event observations, document content, interpretation of document content, and the like.

As a result of matching, interpolation, and/or approximation processes, second computing device 201 may effectively define or identify one or more additional data elements. In one embodiment, once a match between a document file and a reference database record has been made, additional data may be added to or associated with the document file. In an embodiment, one or more of the fields 405 may provide additional information that may be associated with the document file. For example, the additional data may include an account number or other information. In an embodiment, corrected data may be additional data and may be added to the associated data, the document file, structured data, and/or referenced database.

By way of illustrative example, an account number may be additionally identified based upon associated data elements such as name, date of birth, or social security number. In an embodiment, if additional data is present in the reference database record associated with the document file but not in the document file, that data may be added to the structured message.

In yet another embodiment, the additional data may be data to include with the document file. For example, in an exemplary case, additional data such as, for example, notes from the physician, prior medical information, test results, or other data may be included with the document file.

In an embodiment, the additional data may include internal or external instructions for processing the document file. According to one aspect of the present invention, a user, client, or third party may provide first or second computing device 101/201 with instructions related to or associated with a document file, record, or account. These instructions may include additional data to be included with the document file. In an embodiment, the instructions may indicate that a message is to be generated and may also indicate the additional data that is to be provided in the message or messages to recipients and/or in certain types of messages. For example, the instructions may indicate that all messages to a particular indexing recipient should include a predefined letterhead or background image and should further include additional text that may have been previously stored. For example, Ms. Alamb may have set specific instructions that she wants a copy of all reports to be sent to her. The additional data may include instructions to first and/or second computing system 101/201 to transmit a copy of the document file 400 to her and may include an address, fax number, or email address for Ms. Alamb.

The first and/or second computing system 101/201 may be adapted to create a variety of different types of messages, including, but not limited to email messages, facsimiles, instant messages, and audio messages. In an embodiment, the type of message generated may depend upon either the instructions received by the first and/or second computing system 101/201 from a user or upon prior parameters that have been defined with respect to messages directed to the intended recipient.

Exemplary Embodiments of Packaging and Transmission Services

Figure 25:
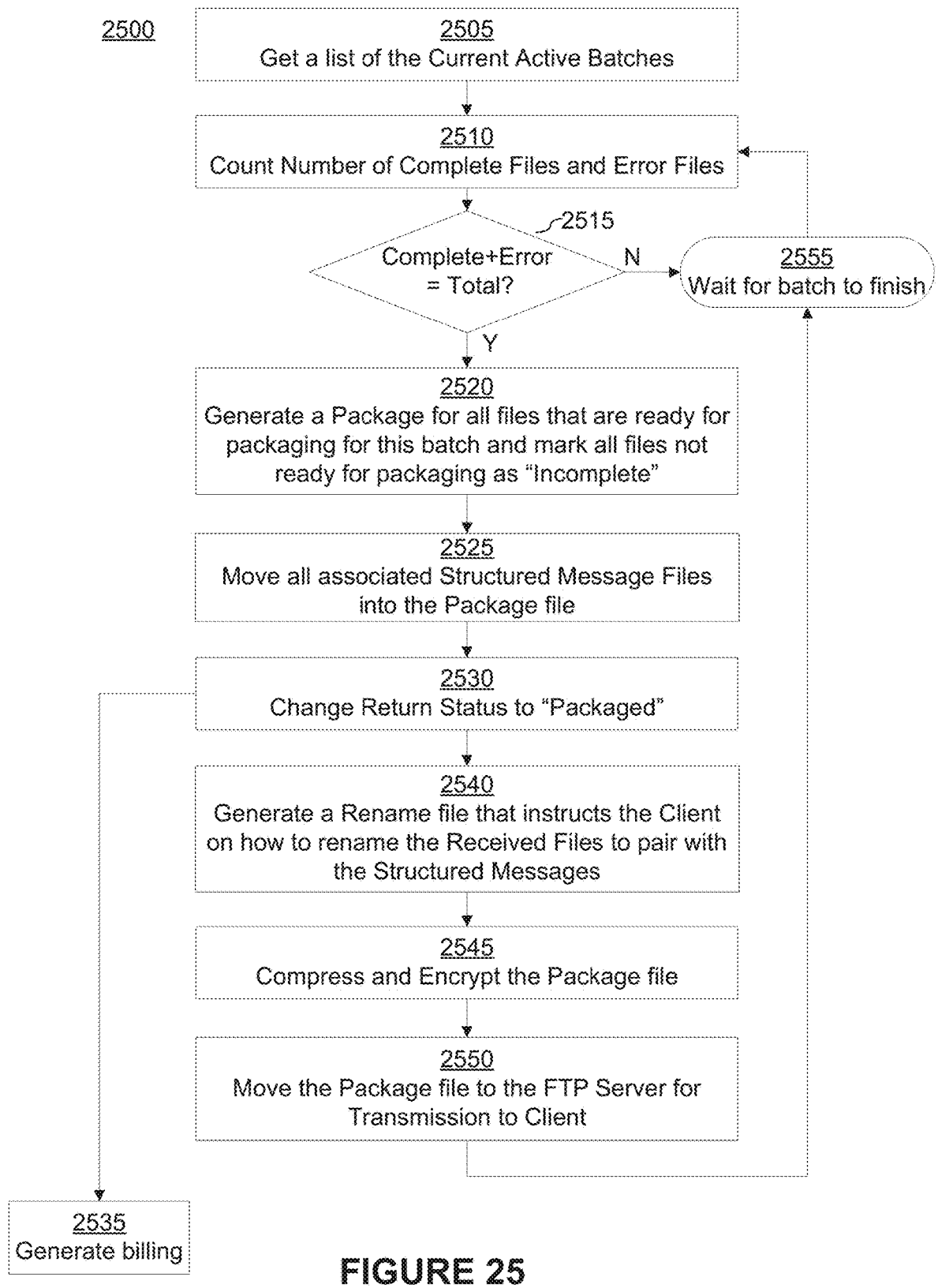
FIG. 25 depicts an exemplary method for returning information related to processed document files to a client system according to an embodiment of the present invention.

FIG. 25 depicts an exemplary method for returning information related to processed document files to a client system according to an embodiment of the present invention. In an embodiment, the method of FIG. 25 may be performed by the packaging and transmission services of indexing service provider 201. As depicted in FIG. 25, the indexing service provider system 201 may obtain (2505) a list of the current active batches, and count (2510) the number of complete document files and error document files. A check may be performed (2515) to verify that the batch has completed processing. That is, that the number of complete files plus error files equal the total number of files that batch contained. If the total number of files does not equal to the total number of files in that batch, the system 201 may wait for the batch to finish processing.

If the batch is completed, a package or folder for all files that are ready for packaging for this batch may be generated (2520) and all files not ready for packaging may be marked as incomplete. The files which may be ready for packaging may include, for example, a structured message file for each of the process document files. The structured message files, which may be an XML, HL-7, text, or other file type, may be moved (2525) into the package file. The return status for the package and/or the files within the package may be indicated (2530) as "packaged." In an embodiment, a bill for the client/indexing recipient may be generated (2535) and may be included with the package or sent separately. In an embodiment, a rename file may be generated that instructs the client system 101 how to rename the document file to pair/index it with the structured messages. In this way, the document files need not be retransmitted to the client system 101. In an embodiment, the structured message may also be the rename file. In an embodiment, the package file may be compressed and/or encrypted (2545) as part of the transmission. In an embodiment, the package file may be placed (2550) on a server, such as a file transfer protocol server, for transmission to the client system 101, wherein the client may initiate the transmission. In an alternative embodiment, the package may be transmitted to the client system 101.

Figure 26:
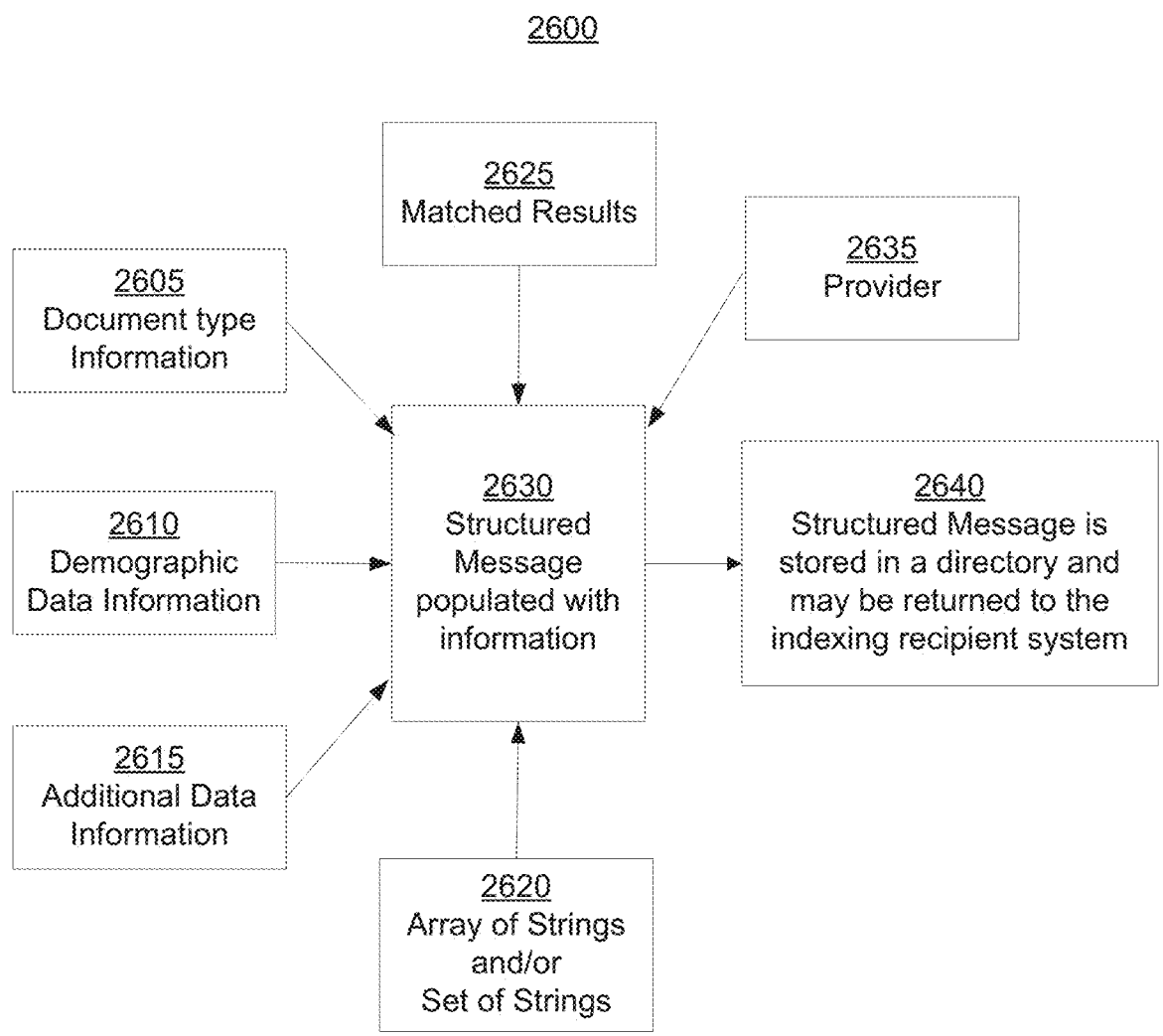
FIG. 26 depicts exemplary types of information that may be associated with a document file according to an embodiment of the present invention.

FIG. 26 depicts exemplary types of information that may be associated with a document file according to an embodiment of the present invention. As illustrated in FIG. 26, a plurality of types of information may be associated with a document file, including but not limited to, document type information 2605, demographic data 2610, additional information 2615, array of strings and/or one more sets of strings 2620, provider 2635, matched results 2625, and other matching information found through the process of matching or filtering. Additional information may mean the same as discussed previously, including, without limitation, information contained within one or more data fields of a matching record. In an embodiment, reference database 100A may also include one or more additional fields 405E-x for including additional indicia, additional data, links to files, notes, instructions for processing received files, and other data. Throughout the process of filtering or matching, a structured message may be populated with this information. This structure message may be stored in a directory (2640) by the indexing service provider 201 and returned to the client system 101 as part of the package. In an embodiment, the structured message may also include information about instructing a client on how to index the document file.

Exemplary Embodiments of Composite Messaging Services

FIG. 27 illustrates an exemplary composite message according to an embodiment of the present invention. In embodiments, it may be beneficial to create composites, such as, for example, when transmitting messages. A composite may comprise the combination of any additional data with one or more of the following: other additional data, a document file, the array of strings (or portion thereof), a reference database record, file location, image file, thumbnail, hyperlink, graphics, audio files, video files, and the like. One skilled in the art will recognize other items may be included in a composite.

In embodiments, first or second computing device 101/201 may create a composite, such as a composite image, message, record, or file, including both the document file and the additional composite items. In one embodiment, a composite message may be created that includes the image of the information contained within a document file and additional data included within the body of the same message. In embodiments, the document file may be superimposed upon the additional data, such as in instances in which the additional data is letterhead, stationery or some other background image. In these embodiments, first or second computing system can overlay the information contained within the document file upon the additional data in such a manner that in those locations at which the information contained within the document file properly overlaps the additional data. In an embodiment, the additional data may be treated as being transparent such that the information contained within the document file will appear to be overlaid upon the additional data. Composite messages are beneficial because, depending upon the embodiment, the intended recipient can receive a message that includes both the document file and any additional data that is related to or otherwise associated with the document file.

Consider, by way of illustration, the following example. Having identified that report 400 is a lab report for Mary Alamb by use of one or more of the methods discussed above, additional data may include instructions indicating that a composite message should be sent to Ms. Alamb. In one embodiment, Mary may have indicated that she desires to receive copies of all reports. In an alternative embodiment, one or more key words or phrases from the document file may indicate that a message should be generated and sent. For example, the indication in a "Notes" field that the results of the lab testing yielded a certain result, such as testing "positive," may trigger a message being sent to Mary. In an embodiment, additional data may be conditionally associated with data associated with the document file. For example, identification within the document file of testing a positive for gram-negative bacteria may be associated with a selected text, such as, indicating that a follow-up appointment should be scheduled. In an embodiment, first or second computing system 101/201 may interface with one or more programs, such as a calendaring system to suggest or schedule appointments, or to initiate an action.

Alternatively or additionally, first or second computing device may create a composite message that includes an image of the received data. In an embodiment, the received data to be incorporated into a message may be embedded as an image, such as a portable document format (.pdf), tagged image file format (.tif), or the like, into the hypertext mark-up language (html) of the email message or contained within an HL-7 message. For most current email clients, such as Lotus Notes or Outlook users, the image of the data will appear in the body of the email message itself. However, some devices may utilize older or different email clients, such as older versions of Lotus Notes, for example, that will place the image of the data in an attachment to the email message. In some embodiments, the email client will determine whether the image will appear in the body of the email message or as an attachment. In alternative embodiments, where the first or second computing system 101/201 has information about the characteristics of the email client regarding images, the system may decide whether to send the message with the image appearing in the body of the message or as an attachment. In an embodiment, while the first or second computing device may transmit the email message directly to a computer or other computing device having an email client of the intended recipient, the first or second computing system may transmit the email message to an email server (not shown) for subsequent delivery to the intended recipient. In any event, the recipient can receive an email message and view the data. It should be noted that data, such as maps, diagrams, drawings, reports, documents, and various language characters, may also be readily transmitted.

Alternatively or additionally, the first or second computing system 101/201 may create a message that includes a file location reference or link to the document file. Consider, by way of illustration, the message 2700 depicted in FIG. 27. Depicted in FIG. 27 is an email message which may be generated by first or second computing system 101/201. Included within email message 2700 is a link 2705 to the report 400. In an embodiment, security and encryption may be employed to restrict access to the linked file 400.

One skilled in the art will recognize that other forms of communication may likewise be employed. In an embodiment, an instant message containing the received data or a link to the data may be transmitted from the first or second computing system to one or more devices or networks having instant messaging capability.

In yet another embodiment, the document file may be included in the body of a facsimile. In this regard, a facsimile coversheet, generally identifying the intended recipient as well as the phone and facsimile numbers of the intended recipient and name and phone number of the user transmitting the facsimile, may be defined, either by the user at the time of transmitting the information or at some prior time. In either instance, a user may define a custom facsimile coversheet tailored to the user or an intended recipient.

In an embodiment, first or second computing system 101/201 may store one or more of the following: the document file, the array of strings (or portions thereof), the additional data, a composite, or a message. In one embodiment, first or second computing system may place the indexed information, or a link thereto, in a predefined location for import into an electronic record or other database software application. A user of the electronic record or other database software application may access and view the document file, the additional data, the composite, and/or the message while using the application. In an alternative embodiment, first or second computing device may transmit the indexed data, or a link thereto, to a second device, for storing in a predefined location for import into an electronic record or other database software application.

Exemplary Embodiments of Manual Indexing

Figure 28:
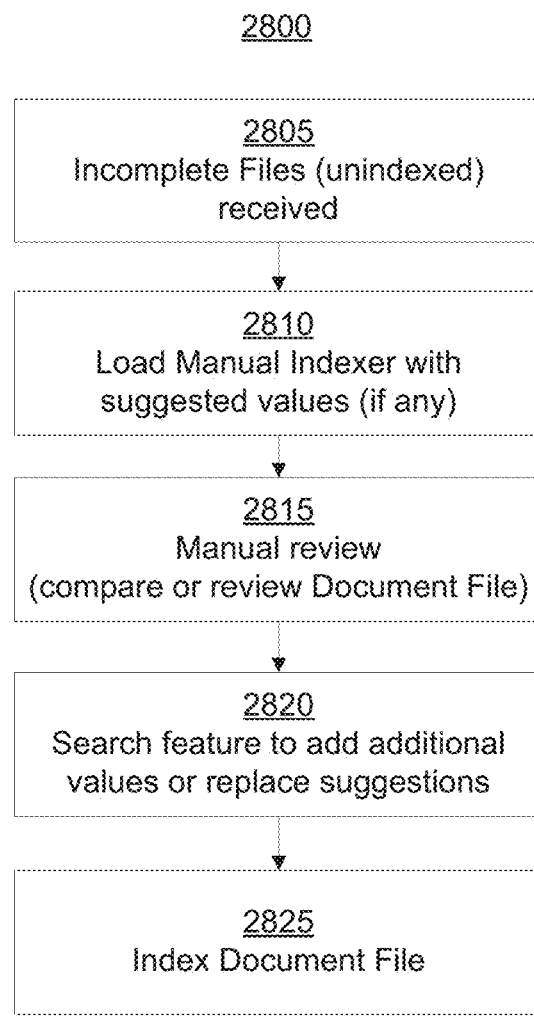
FIG. 28 depicts an exemplary method for presenting files for manual review according to an embodiment of the present invention.

FIG. 28 depicts an exemplary method for presenting files for manual review or indexing according to an embodiment of the present invention. In an embodiment, the manual indexer may be part of a database interface system at the indexing recipient system 101 or the indexing service provider system 201. Incomplete files or files that have been marked as "no match found" may be sent (2805) to a manual indexing utility or service. In an embodiment, the manual indexer may also load (2810) and display suggested matches. A user may review (2815) the document file and indicate to which record the document file should be matched. In an embodiment, the manual indexer may additionally include (2820) features such as a search features to search the array of strings for the document file and/or a reference database to obtain additional values or replace suggested match values. Following the manual review, the document file may be indexed (2825). In an embodiment, the index information may be processed in like manner as other index document files including being sent to the packaging services, an embodiment of which is depicted in FIG. 25.

In an embodiment, a manual indexer user interface may comprise a viewing section or sections for displaying match information. In an embodiment, the manual indexer user interface may comprise a viewing section for optionally viewing items such as, a document file, its associated array of strings or set of strings, the document file's associated structured message with the data that has been obtain through matching operations, and log information, which might contain system or processing information and additional information collected through the indexing/matching process. The manual indexer user interface may comprise a section to display and allow a user to review matched data fields for a document file and unmatched data fields, including any preloaded suggestions for the unmatched data fields obtained through the matching operations. In an embodiment, the user may review and approve or correct the matched data fields. Matching information, including possible matching candidates, rankings, structured data file, string matches, and any other of the data available for viewing as discussed above, may be displayed to the user. The user may provide other information that has not been identified in the document file. For example, the user may select and enter the document type or provider information. This information may be added to items such as phrases lists and the like and may be associated with matching profiles thereby allowing the system to adaptively improve for subsequent matching operations. The manual indexer user interface may also comprise additional features and inputs that may be specific to an indexing client or to a database system.

In an embodiment, the manual indexer may utilize user-derived associations and feedback to modify the indexing processes in an adaptive method by providing document indicia suggestions and receiving user-responsive feedback to modify the matching/filtering elements, including but not limited to threshold match values, dictionary/phrase lists, match associations, and the like. In an embodiment, the manual indexer may provide the ability to add information to dictionary/phrase lists, such as, exclusion list, document type lists, provider lists, client contact lists, and the like. In an embodiment, the manual indexer may associate information, such as document type or provider, to a word frequency value, a key word, or key phrase thereby enabling the indexer to suggest potential matches or values, and/or to improve subsequent matching operations.

Exemplary Embodiments of File Indexing and Processing Services

Figure 29:
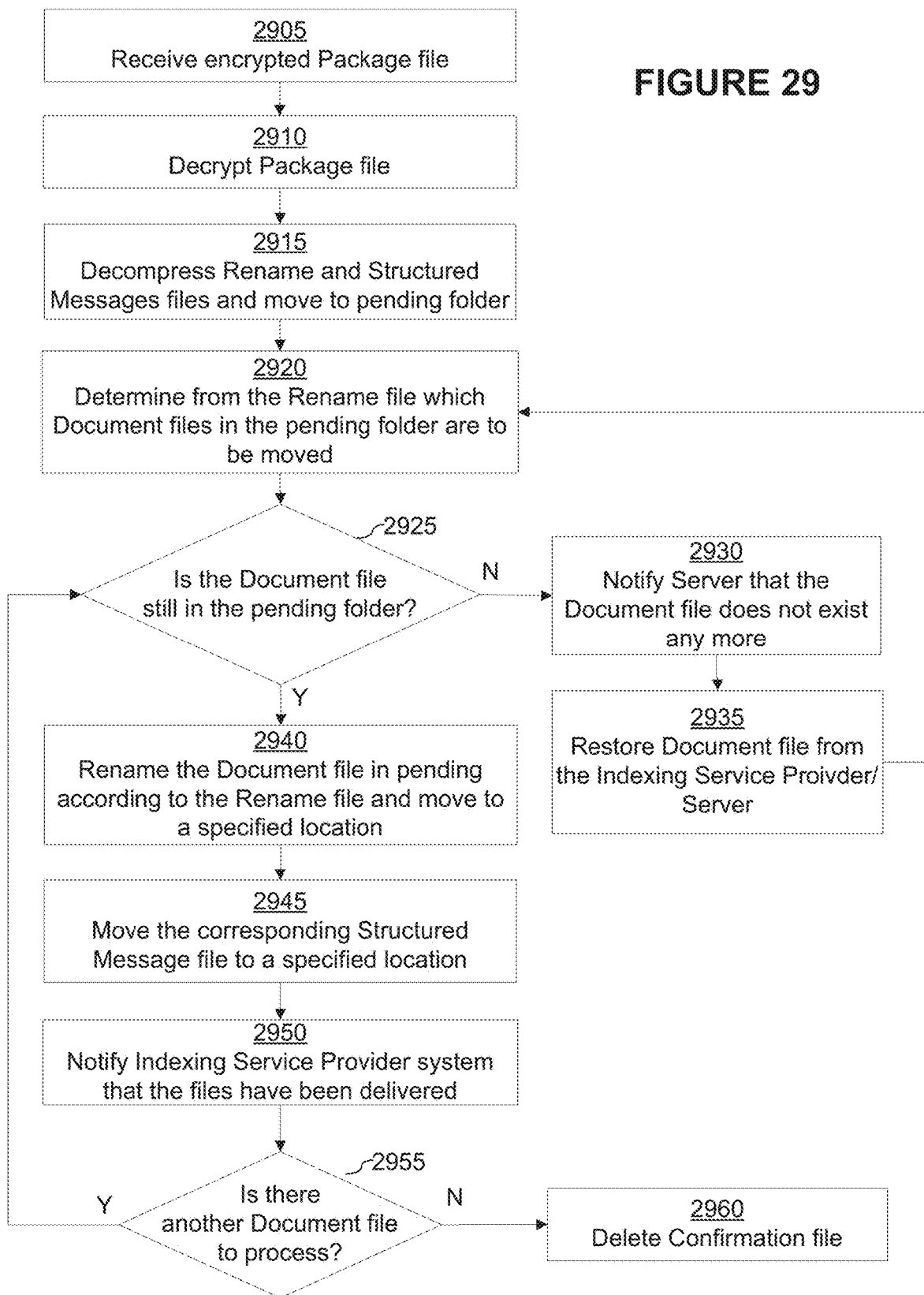
FIG. 29 depicts an exemplary method for receiving and processing document files received from an indexing service provider according to an embodiment of the present invention.

FIG. 29 depicts an exemplary method for receiving information related to processed document files from an indexing service provider according to an embodiment of the present invention. In an embodiment, indexing recipient system 101 receives (2905) an encrypted package file and decrypts the package (2910) from the indexing service provider 201. In an embodiment, indexing recipient system 101 decompresses (2915) the rename files and structured message files and moves them to a pending folder. In an embodiment, the rename files indicate (2920) which document files in the pending folder are to be moved and to where they should be moved. In an embodiment, the indexing recipient system may verify (2925) that the document file is still in its pending folder. If the document file is no longer in its pending folder, the indexing recipient system may notify (2930) the indexing service provider that the document file no longer exists, and the document file may be restored (2935) from the indexing service provider. If the document file is still in the pending folder, the document file is renamed (2940) according to the definition in the renamed file and may be move to a specified server location. In an embodiment, the structured message file may also be moved (2945) to a specified location. In one embodiment, one or more of the files may be moved to a database or database inbox. In an embodiment, the indexing recipient system may notify the indexing service provider that the files have been delivered and processed (2950). In the depicted embodiment, the indexing recipient system may repeat the process for all pending document files for that package. If there are no remaining files to be processed (2950), the indexing system recipient system may delete the confirmation file. In an embodiment, a confirmation file may be a zipped and encrypted package that contains structured messages, such as HL-7 messages, and a rename file, which may be an XML file, that explains how the original files on the client machine are to be renamed and where they are to be stored. In an embodiment, the document files, the structured message, or both may be stored so as to be accessed by a database client, such as Centricity EMR®.

In an embodiment, the array of strings of the document file, which may be construed to be a part of the document file, may also be indexed with the document file, such as in the case when the document file is an image or audio file and the associated data was created by converting the document file. In an embodiment, all document files obtained by the first computing system 101 may be stored into a common folder or location. The files may be stored locally, such as on storage device 304 on first computing system 101, or on a remote device or network, such as storage device 140, network 145, and/or remote network 150. In an embodiment, the document files may be stored within database system 110. In one embodiment, the document files may be indexed according to a unique identifier, which identifier may be one or more of the strings from the array or strings or one or more data field elements for the record matched to the document file.

Figure 30:
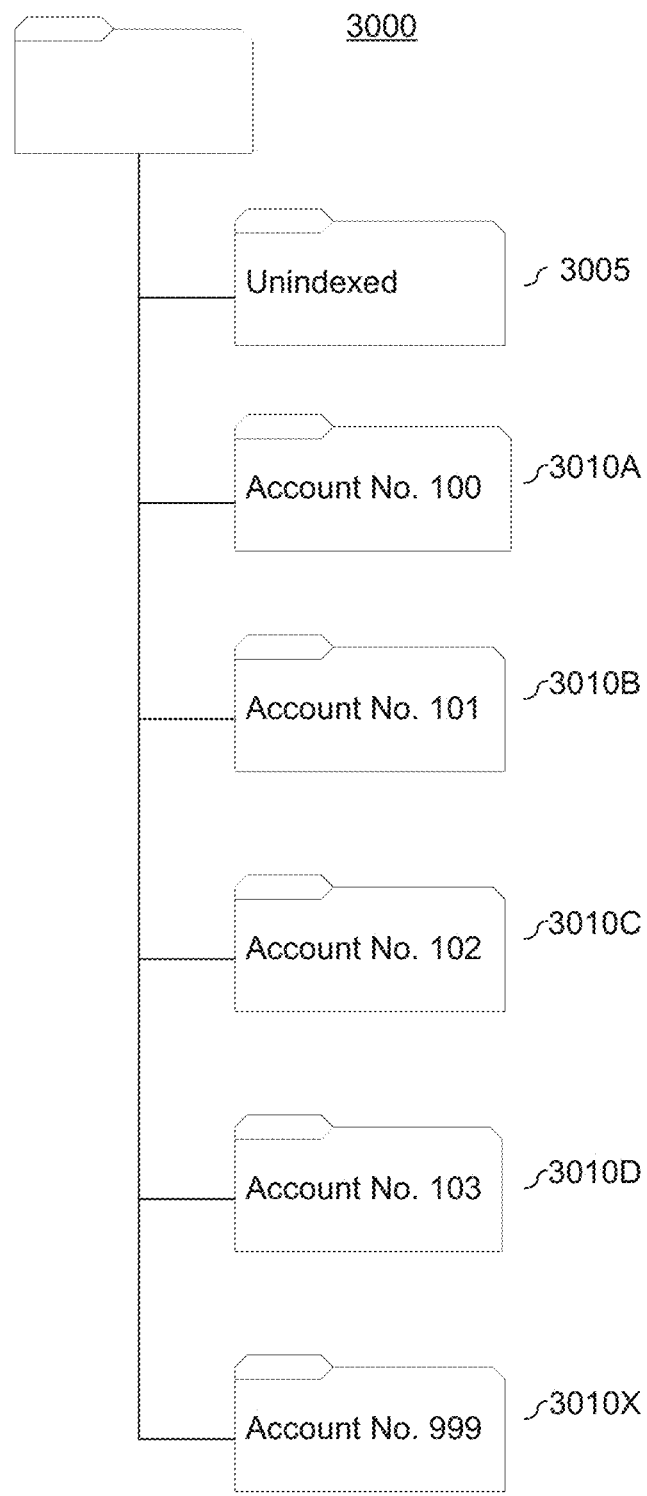
FIG. 30 graphically illustrates an exemplary file structure for indexing a plurality of files according to an embodiment of the present invention.

FIG. 30 graphically illustrates an exemplary file structure for indexing a plurality of files according to an embodiment of the present invention. As illustrated in FIG. 30, after a document file has been successfully identified, it may be moved from an unindexed folder 3005 to a folder associated with that individual or organization. For example, the received file 400 may be stored in a folder associated with Mary Alamb. In an embodiment, the folders 710x may be uniquely identified by an account number, patient name, or the like.

In an alternative embodiment, instead of or in addition to indexing the received files by storing them into specific folders or locations, the received file may be indexed by using of a pointer or link to the received data file. In an embodiment, a database indexes the file pointer or file link. In one embodiment, the database may be part of the reference database 100. For example, one of the fields of the reference database 100 may include file location information. Thus, the received file may be indexed by associating or linking its storage location to the matched record.

In an embodiment, first or second computing system 101/201 may place the document file and or associated data (such as structured message file, array of strings, etc.) in a predefined location for import into an electronic record or other database software application. Accordingly, a user of the electronic record or other database software application can access and view the data using the electronic record or other database software application. One skilled in the art of information management will recognize other ways for indexing and storing the files, which are within the scope of the present invention.

Exemplary Embodiments of Account Services and Billing

Embodiment of the present invention may include archiving and retrieval services for an indexing recipient. As noted above, embodiment of the present invention may include archiving services such as for cases of missing files during the indexing process (see, e.g., FIG. 29, steps 2930-2935). Indexing service provider may also maintain copies of all files related to the indexing for an indexing recipient, include but not limited to, document files, array of strings, reference databases, structured messages, rename files, additional data, composite messages, and may also maintained file space for other files for an indexing recipient. One of more of these files may be in the event of lost or corrupted data in the indexing recipient system.

Exemplary Embodiments of Account Services and Billing

As noted previously, embodiment of the present invention may include billing services for billing indexing recipients and third parties. Billing services may include billing for indexing services, archiving services, messaging services, account services, observational services, error correction services, other services described herein, and other costs and fees. Embodiments of the present invention may also include billing associated with financial events and/or marketing events.

Associate with a Financial Event

In embodiments, one or more of the steps performed according to the present invention may be associated with an individual and/or organization for the purposes of billing or financial event or events. The billing or financial event may be for the user or operator of first computing system 101, second computing system 201, or may be performed on behalf of another individual or organization. Consider, for example, the document file 400 from XYZ Laboratories, a medical diagnostics laboratory, and assume that the document file 400 has been successfully matched to a patient, Mary Alamb. In one embodiment, the matching of the document file 400 to a record (in this case a patient record), may trigger a message that an invoice needs to be sent to Ms. Alamb's insurance provider or a message that XYZ Laboratories needs to be paid for services performed. In one embodiment, an invoice may be automatically sent to Ms. Alamb's insurance carrier for the services performed. Additionally, in an embodiment, specific billing codes may provided to the insurance company. In an embodiment, each instance a file is received and indexed or processed according to the present invention, a user of the indexing or processing services may be billed for such usage. One skilled in the art will recognize that other configurations may beneficially employ or be linked to financial events and are within the scope of the present invention.

Associate with a Marketing or Advertising Event

In embodiments, one or more of the steps performed according to the present invention may be associated with an individual and/or organization for the purpose of marketing or advertising. In an embodiment, the correlation between content data in the document file and an individual or organization may be used for marketing and advertising purposes. Consider, for example, document files containing information related to goods or services utilized by an individual or organization. In an embodiment, that information may be used to provide advertising or marketing services to that individual or organization or may be provided to advertising or marketing organizations. In another embodiment, aggregate information may be provided to advertising or marketing organizations. One skilled in the art will recognize that other configurations may beneficially employ or be linked to advertising or marketing events and are within the scope of the present invention.

While the invention is susceptible to various modifications and alternative forms, specific examples thereof have been shown in the drawings and are herein described in detail. It should be understood, however, that the invention is not to be limited to the particular form disclosed, but to the contrary, the invention is to cover all modifications, equivalents, and alternatives falling within the scope of the appended claims.

In addition, embodiments of the present invention further relate to computer products with a computer-readable medium that have computer code thereon for performing various computer-implemented operations. The media and computer code may be those specially designed and constructed for the purposes of the present invention, or they may be of the kind well known and available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

We claim:

1. A processor-implemented method for identifying a document file comprising:
   receiving a document file to be identified;
   numbering strings of text in the document file in a set order;
   given a set of document types in which each document type has a document type model comprising a set of recognized associations and each association comprises one or more characters with a known meaning and a generalized location within a typical document file of that document type, using at least one processor and one or more of the document type models to search at least some of the numbered strings of the document file that fall within the generalized locations of a document type as indicated by its corresponding document type model to determine whether a set of the numbered strings in the generalized locations correspond to expected associations for the document type;
   responsive to the set of numbered strings in the generalized locations corresponding to associations for the document type, using at least one processor to assign the document type to the document file and to record the document type assignment in a computer-readable memory; and
   responsive to an insufficient number of numbered strings corresponding to associations for the document type, not assigning the document type to the document file.

2. The processor-implemented method of claim 1 further comprising the step of:
   responsive to the document file being an image file, extracting text from the document file using optical character recognition.

3. The processor-implemented method of claim 1 further comprising the step of:
   responsive to identifying an association within the document file, using the association as an anchor point and performing the steps comprising:
      selecting an examination set of characters from the document file, the examination set being selected based upon a proximity region relative to the anchor point; and
      searching the examination set for one or more indicators to assist in identifying the document file.

4. The processor-implemented method of claim 3 further comprising the step of:
   responsive to not finding any of the one or more indicators in the examination set, changing the proximity region and selecting an examination set of characters using the changed proximity region.

5. The processor-implemented method of claim 3 wherein the proximity region comprises selecting characters that are symmetrically positioned about the anchor point, asymmetrically positioned about the anchor point, or both.

6. The processor-implemented method of claim 3 further comprising the step of:
   excluding from the examination set a set of characters associated with the anchor point.

7. The processor-implemented method of claim 1 further comprising the step of:
   responsive to not assigning the document type to the document file:
      sending the document file to an indexer;
      having the indexer identify the document type and one or more associations for the document type; and
      recording the document type and one or more associations in a corresponding document type model for future matching tasks.

8. A system comprising:
   one or more processors; and
   a non-transitory computer-readable medium or media storing one or more sequences of instructions which, when executed by at least one of the one or more processors, causes steps to be performed comprising:
   receiving a document file to be identified;
   numbering strings of text in the document file in a set order;
   given a set of document types in which each document type has a document type model comprising a set of recognized associations and each association comprises one or more characters with a known meaning and a generalized location within a typical document file of that document type, using at least one processor and one or more of the document type models to search at least some of the numbered strings of the document file that fall within the generalized locations of a document type as indicated by its corresponding document type model to determine whether a set of the numbered strings in the generalized locations correspond to expected associations for the document type;
   responsive to the set of numbered strings in the generalized locations corresponding to associations for the document type, using at least one processor to assign the document type to the document file and to record the document type assignment in a computer-readable memory; and
   responsive to an insufficient number of numbered strings corresponding to associations for the document type, not assigning the document type to the document file.

9. The system of claim 8 wherein the non-transitory computer-readable medium or media further storing one or more sequences of instructions which, when executed by at least one of the one or more processors, causes steps to be performed comprising:
   responsive to the document file being an image file, extracting text from the document file using optical character recognition.

10. The system of claim 8 wherein the non-transitory computer-readable medium or media further storing one or more sequences of instructions which, when executed by at least one of the one or more processors, causes steps to be performed comprising:
    responsive to identifying an association within the document file, using the association as an anchor point and performing the steps comprising:
       selecting an examination set of characters from the document file, the examination set being selected based upon a proximity region relative to the anchor point; and
       searching the examination set for one or more indicators to assist in identifying the document file.

11. The system of claim 10 wherein the non-transitory computer-readable medium or media further storing one or more sequences of instructions which, when executed by at least one of the one or more processors, causes steps to be performed comprising:
    responsive to not finding any of the one or more indicators in the examination set, changing the proximity region and selecting an examination set of characters using the changed proximity region.

12. The system of claim 10 wherein the non-transitory computer-readable medium or media further storing one or more sequences of instructions which, when executed by at least one of the one or more processors, causes steps to be performed comprising:
   excluding from the examination set a set of characters associated with the anchor point.

13. The system of claim 8 wherein the non-transitory computer-readable medium or media further storing one or more sequences of instructions which, when executed by at least one of the one or more processors, causes steps to be performed comprising:
   responsive to not assigning the document type to the document file:
      sending the document file to an indexer;
      having the indexer identify the document type and one or more associations for the document type; and
      recording the document type and one or more associations in a corresponding document type model for future matching tasks.

14. A non-transitory computer-readable medium or media storing one or more sequences of instructions which, when executed by one or more processors, causes steps to be performed comprising:
   receiving a document file to be identified;
   numbering strings of text in the document file in a set order;
   given a set of document types in which each document type has a document type model comprising a set of recognized associations and each association comprises one or more characters with a known meaning and a generalized location within a typical document file of that document type, using at least one processor and one or more of the document type models to search at least some of the numbered strings of the document file that fall within the generalized locations of a document type as indicated by its corresponding document type model to determine whether a set of the numbered strings in the generalized locations correspond to expected associations for the document type;
   responsive to the set of numbered strings in the generalized locations corresponding to associations for the document type, using at least one processor to assign the document type to the document file and to record the document type assignment in a computer-readable memory; and
   responsive to an insufficient number of numbered strings corresponding to associations for the document type, not assigning the document type to the document file.

15. The non-transitory computer-readable medium or media of claim 14 further storing one or more sequences of instructions which, when executed by one or more processors, causes steps to be performed comprising:
   responsive to the document file being an image file, extracting text from the document file using optical character recognition.

16. The non-transitory computer-readable medium or media of claim 14 further storing one or more sequences of instructions which, when executed by one or more processors, causes steps to be performed comprising:
   responsive to identifying an association within the document file, using the association as an anchor point and performing the steps comprising:
      selecting an examination set of characters from the document file, the examination set being selected based upon a proximity region relative to the anchor point; and
      searching the examination set one or more indicators to assist in identifying the document file.

17. The non-transitory computer-readable medium or media of claim 16 further storing one or more sequences of instructions which, when executed by one or more processors, causes steps to be performed comprising:
   responsive to not finding any of the one or more indicators in the examination set, changing the proximity region and selecting an examination set of characters using the changed proximity region.

18. The non-transitory computer-readable medium or media of claim 16 further storing one or more sequences of instructions which, when executed by one or more processors, causes steps to be performed comprising:
   excluding from the examination set a set of characters associated with the anchor point.

19. The non-transitory computer-readable medium or media of claim 14 further storing one or more sequences of instructions which, when executed by one or more processors, causes steps to be performed comprising:
   responsive to not assigning the document type to the document file:
      sending the document file to an indexer;
      having the indexer identify the document type and one or more associations for the document type; and
      recording the document type and one or more associations in a corresponding document type model for future matching tasks.

20. The processor-implemented method of claim 1 further comprising the step of:
   using data from a comparison reference database comprising a plurality of records in searching at least some of the numbered strings of the document file that fall within the generalized locations of a document type as indicated by its corresponding document type model.

* * * * *